United States Patent
Mashio et al.

(10) Patent No.: US 7,026,617 B2
(45) Date of Patent: Apr. 11, 2006

(54) THERMAL INFRARED DETECTOR AND INFRARED IMAGE SENSOR USING THE SAME

(75) Inventors: Naoya Mashio, Yokohama (JP); Keitaro Shigenaka, Tokyo (JP); Hideyuki Funaki, Tokyo (JP); Yoshinori Iida, Tokyo (JP); Ikuo Fujiwara, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 225 days.

(21) Appl. No.: 10/647,345

(22) Filed: Aug. 26, 2003

(65) Prior Publication Data
US 2004/0129882 A1 Jul. 8, 2004

(30) Foreign Application Priority Data
Aug. 26, 2002 (JP) ............................ P2002-246006

(51) Int. Cl.
*G01J 5/00* (2006.01)

(52) U.S. Cl. ................................ 250/338.1

(58) Field of Classification Search .............. 250/338.1
See application file for complete search history.

(56) References Cited

U.S. PATENT DOCUMENTS

| 5,486,698 | A | * | 1/1996 | Hanson et al. ............... 250/332 |
| 6,031,231 | A | * | 2/2000 | Kimata et al. ............... 250/332 |
| 6,498,347 | B1 | | 12/2002 | Sauer et al. |
| 6,599,771 | B1 | | 7/2003 | Mashio et al. |

FOREIGN PATENT DOCUMENTS

JP 10009949 A * 1/1998

\* cited by examiner

*Primary Examiner*—Constantine Hannaher
(74) *Attorney, Agent, or Firm*—Oblon, Spivak, McClelland, Maier & Neustadt, P.C.

(57) ABSTRACT

An infrared image sensor encompasses (a) a base body, (b) a plurality of signal lines disposed on the base body, (c) a plurality of address lines intersecting the signal lines, (d) a plurality of detector portions provided in the cross region of the signal lines and the address lines, each of the detector portions being connected between the corresponding signal line and the address line, each of the detector portions is configured to detect infrared-ray, (e) a plurality of supporting beams supporting each of the detector portions above the base body, and (f) a plurality of contactors configured to contact each of the detector portions with the base body thermally so as to transport thermal energy to be accumulated in each of the detector portions toward the base body.

15 Claims, 32 Drawing Sheets

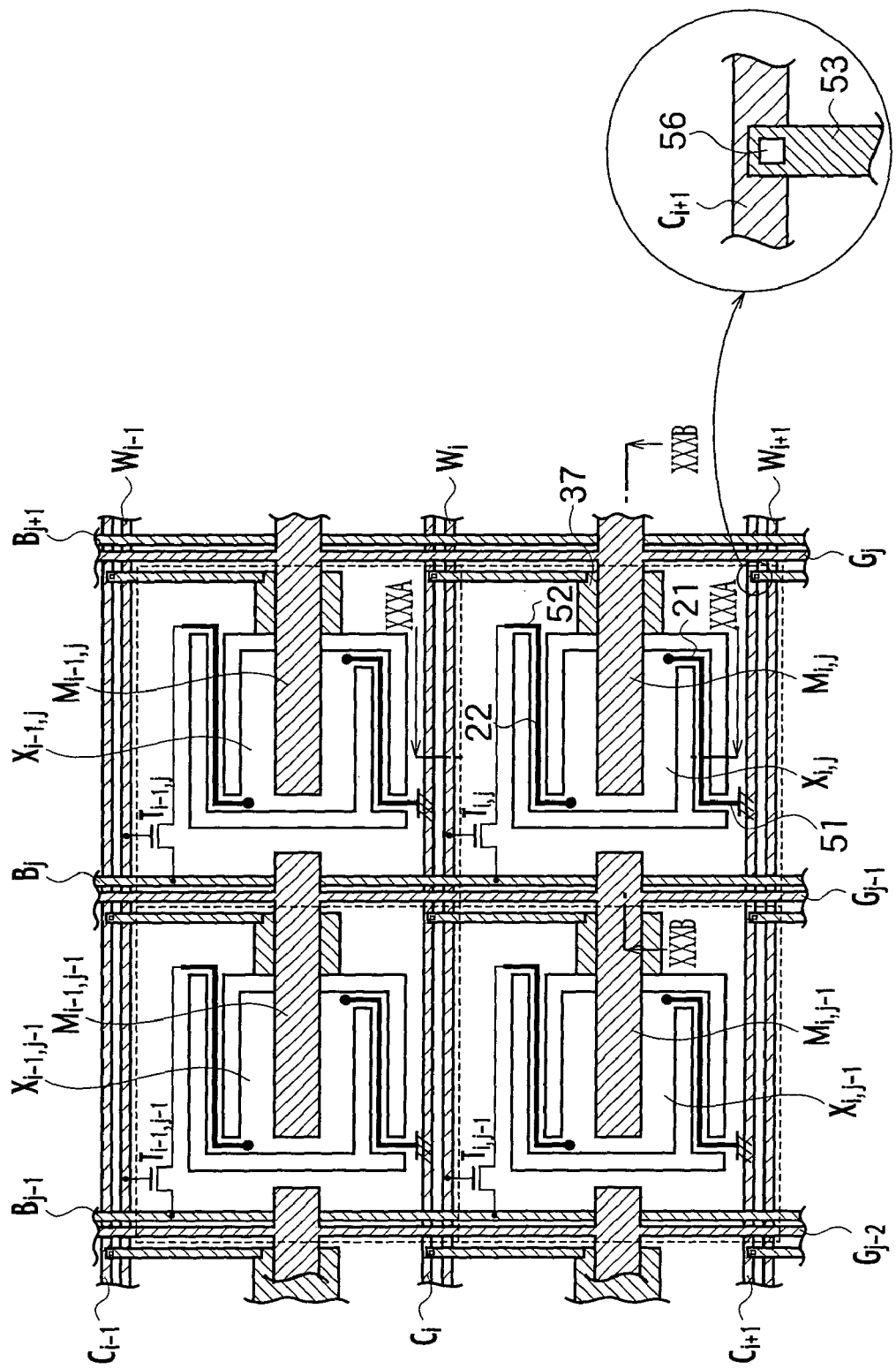

THERMAL INFRARED DETECTOR AND INFRARED IMAGE SENSOR USING THE SAME

CROSS REFERENCE TO RELATED APPLICATIONS

This application claims benefit of priority under 35 USC 119 based on Japanese Patent Application No. P2002-246006 filed Aug. 26, 2002, the entire contents of which are incorporated by reference herein.

BACKGROUND OF THE INVENTION

1. Field of the Invention

The present invention relates to a thermal infrared image sensor, in which the infrared-rays are detected as heat by detectors arranged in multiple pieces.

2. Description of the Related Art

In a thermal infrared image sensor sensing infrared-rays as heat, a plurality of infrared detectors serving as pixels are arranged in two dimensions. As an example of the thermal infrared image sensor, a configuration arranging a plurality of detector cells, each of which is implemented by a silicon p-n junction diode is proposed (cf. Japanese Patent Laid-Open No. 2001-281051).

The thermal infrared image sensor detects variations of the diffusion potential or the number of generated carriers, in which the temperature of p-n junction diode changes by infrared radiations irradiated from object body. The temperatures of respective infrared absorption bodies, which are disposed in each of the pixels, varies by the irradiation of infrared-rays in the thermal infrared image sensor, and the band structure of the p-n junction varies because the junction temperature of the p-n junction diode is changed. The irradiated intensity of infrared-rays can be measured, for example, by observing the voltage variation of the bit lines, and the surface temperature of the object can be detected. In a thermal infrared image sensor disclosed in Japanese Patent Laid-Open No. 2001-281051, plural cavities are arranged in a matrix-form at the surface of the substrate. Supporting beams are attached to each of the cavities so that the detector portion of each pixel can be supported in a hollow state. The detector portion is maintained in a quasi-thermal isolation state by a configuration in which the detector portion is bridged over the hollow state. The detector portion encompasses an infrared absorption layer, which converts an incident infrared ray into thermal energy by absorbing the infrared ray, and a thermoelectricity-converting portion, which converts the temperature change in the infrared absorption layer to an electrical signal. Horizontal address lines and vertical signal lines are connected to the thermoelectricity-converting portion of each pixel.

The horizontal address lines and the vertical signal lines are arranged in a grid shape such that the horizontal address lines and the vertical signal lines intersect perpendicularly each other. A pulse signal is applied to the horizontal address line in a signal read-out period. Because the detector portion is bridged above the hollow cavity at the surface of the substrate with the supporting beams so as to form the thermal insulation structure, it is hard to transport the heat outwardly, which is generated in the detector portion. In the earlier thermal infrared image sensors, the bias current value must be set such that the signal-to-noise ratio becomes large in order to raise sensitivity. In addition, the temperature sensitivity detecting the infrared-rays becomes larger as the thermal confinement effect becomes larger. As a result, "a self-heating phenomenon" is generated, in which the temperature of every detector portions rises as shown in FIG. 1B. The self-heating phenomenon is apt be generated when a bias pulse is applied to the detector portion so as to cause breakdown phenomenon. The breakdown phenomenon of the detector portion ascribable to the thermal runaway is not generated in a blanking period, because the temperature of the detector portion is low.

A nighttime front monitoring of vehicles using the thermal infrared image sensor has being tried recently, for detecting the information not provided by normal visible camera. For mounting the thermal infrared image sensor on vehicles, a high frame rate (FR) of several times of the present thermal type infrared camera is required.

However, in an earlier thermal infrared image sensor, when the frame rate rises, the thermal energy accumulated at the detector portion due to the self-heating phenomenon, cannot be dissipated sufficiently in the blanking period as shown in FIG. 1B, and as the thermal energy at the detector portion is accumulated further and further, the thermal breakdown phenomenon is caused. In order to prevent the thermal breakdown phenomenon, it is necessary to decrease the thermal resistance of the supporting beam or to decrease the heat capacity of the detector portion so as to reduce the thermal time constant. However, if the thermal time constant decreases, the sensitivity of the thermal infrared image sensor decreases simultaneously.

In view of these situations, it is an object of the present invention to provide an infrared detector and an infrared image sensor using the infrared detector as a pixel, in which the thermal breakdown due to the self-heating phenomenon is not generated, without decreasing the sensitivity

SUMMARY OF THE INVENTION

To achieve the above-mentioned object, an aspect of the present invention inheres in an infrared detector encompassing (a) a base body; (b) a detector portion disposed above the base body, configured to detect infrared-ray; (c) a supporting beam supporting the detector portion above the base body; and (d) a contactor configured to contact the detector portion with the base body thermally so as to transport thermal energy to be accumulated in the detector portion toward the base body.

Another aspect of the present invention inheres in an infrared image sensor encompassing (a) a base body; (b) a plurality of signal lines disposed on the base body; (c) a plurality of address lines intersecting the signal lines; (d) a plurality of detector portions provided in the cross region of the signal lines and the address lines, each of the detector potions being connected between the corresponding signal line and the address line, each of the detector portions is configured to detect infrared-ray; (e) a plurality of supporting beams supporting each of the detector portions above the base body; and (f) a plurality of contactors configured to contact each of the detector portions with the base body thermally so as to transport thermal energy to be accumulated in each of the detector portions toward the base body.

BRIEF DESCRIPTION OF THE DRAWINGS

FIGS. 21D-2 shows the succeeding process flow sectional view after the process stage shown in FIG. 21C corresponding to the cross-sectional view taken on line B—B in FIG. 2, explaining the manufacturing method of the infrared image sensor according to the first modification of the first embodiment of the present invention;

FIGS. 21E-1 shows a further succeeding process flow sectional view after the process stage shown in FIGS. 21D-1 corresponding to the cross-sectional view taken on line A—A in FIG. 2, explaining the manufacturing method of the infrared image sensor according to the first modification of the first embodiment of the present invention;

FIGS. 21E-2 shows a further succeeding process flow sectional view after the process stage shown in FIGS. 21D-2 corresponding to the cross-sectional view taken on line B—B in FIG. 2, explaining the manufacturing method of the infrared image sensor according to the first modification of the first embodiment of the present invention;

FIGS. 21F-1 shows a still further succeeding process flow sectional view after the process stage shown in FIGS. 21E-1 corresponding to the cross-sectional view taken on line A—A in FIG. 2, explaining the manufacturing method of the infrared image sensor according to the first modification of the first embodiment of the present invention;

FIGS. 21F-2 shows a still further succeeding process flow sectional view after the process stage shown in FIGS. 21E-2 corresponding to the cross-sectional view taken on line B—B in FIG. 2, explaining the manufacturing method of the infrared image sensor according to the first modification of the first embodiment of the present invention;

FIG. 29 is a plan view showing a part of the arrangement of pixels of an infrared image sensor according to a fifth embodiment of the present invention, the part of the arrangement corresponds to a 2×2 arrangement;

DETAILED DESCRIPTION OF THE EMBODIMENTS

Figure 1A:
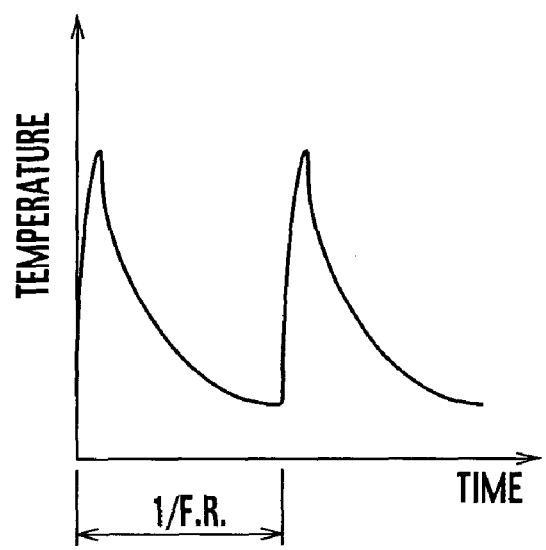
FIG. 1A is a diagram showing the change of temperature of a detector portion in an earlier infrared image sensor when the frame rate is low.
Figure 1B:
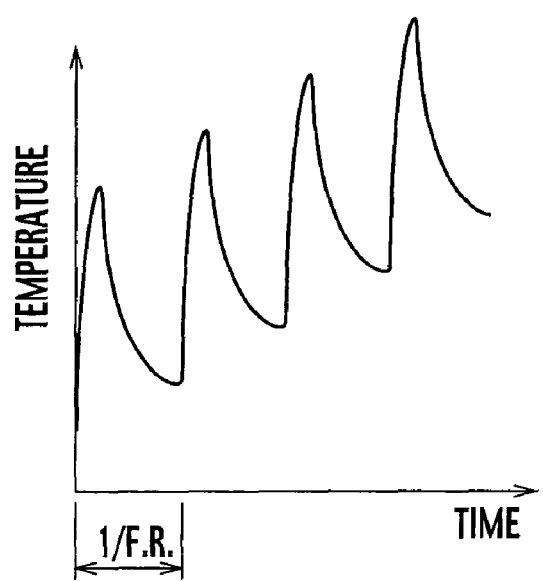
FIG. 1B is a diagram showing the change of temperature of the detector portion by the self-heating phenomenon in the earlier infrared image sensor, when the frame rate is high.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified. Generally and as it is conventional in the representation of semiconductor devices, it will be appreciated that the various drawings are not drawn to scale from one figure to another nor inside a given figure, and in particular that the layer thicknesses are arbitrarily drawn for facilitating the reading of the drawings. In the following description specific details are set forth, such as specific materials, process and equipment in order to provide thorough understanding of the present invention. It will be apparent, however, to one skilled in the art that the present invention may be practiced without these specific details. In other instances, well-known manufacturing materials, process and equipment are not set forth in detail in order not unnecessary obscure the present invention.

Prepositions, such as "on", "over", "under", and "beneath" are defined with respect to a planar surface of the substrate, regardless of the orientation the substrate is actually held. A layer is on another layer even if there are intervening layers. As it will be appreciated, in the above structure, the terms drain and source can be exchanged without modifying the structure it self.

1. First Embodiment

1.1 Configuration of Infrared Image Sensor

Figure 2:
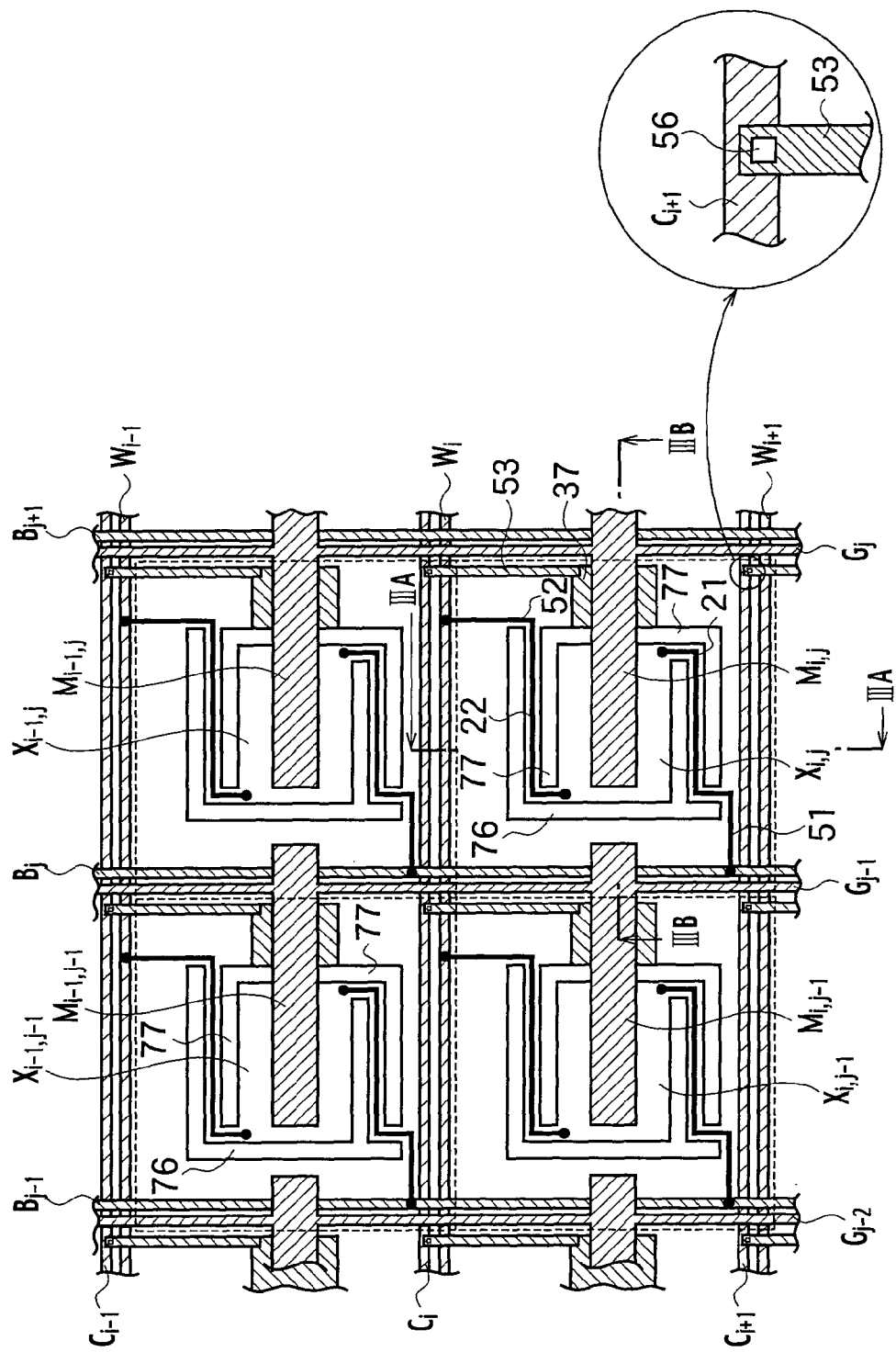
FIG. 2 is a plan view showing a part of the arrangement of pixels of the infrared image sensor according to the first embodiment of the present invention, the part of the arrangement corresponds to a 2×2 arrangement.

An infrared image sensor according to the first embodiment of the present invention embraces a matrix composed by a plurality of vertical signal lines $B_{j-1}$, $B_j$, $B_{j+1}$, ... and a plurality of horizontal address lines $W_{i-1}$, $W_i$, $W_{i+1}$, ... intersecting perpendicularly to the vertical signal lines $B_{j-1}$, $B_j$, $B_{j+1}$, ... and a plurality of detector portions $X_{i-1,j-1}$, $X_{i-1,j}$ ..., $X_{i,j-1}$, $X_{i,j}$, ... each implementing a pixel, such that the detector portions $X_{i-1,j-1}$, $X_{i-1,j}$ ... $X_{i,j-1}$, $X_{i,j}$, ... are arranged in a two-dimensional configuration, as shown in FIG. 2. Furthermore, in parallel with the vertical signal lines $B_{j-1}$, $B_j$, $B_{j+1}$, ... a plurality of contactor wirings $G_{j-2}$, $G_{j-1}$, $G_j$, ... extend straightforwardly. In addition, in parallel with the horizontal address lines $W_{i-1}$, $W_i$, $W_{i+1}$, ..., a plurality of control electrode wirings $C_{i-1}$, $C_i$, $C_{i+1}$, ... extend straightforwardly.

Figure 3A:
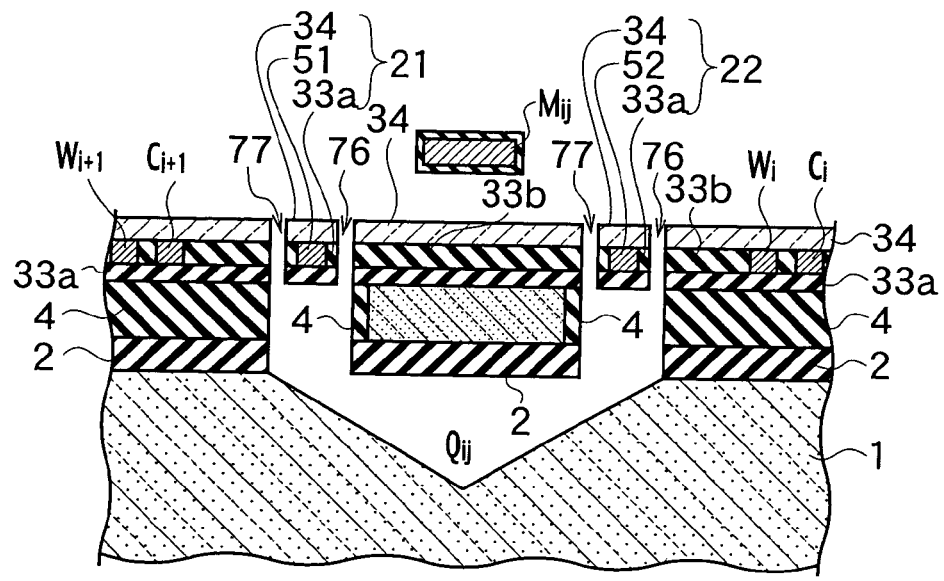
FIG. 3A is a cross-sectional view taken on line IIIA—IIIA in FIG. 2.
Figure 3B:
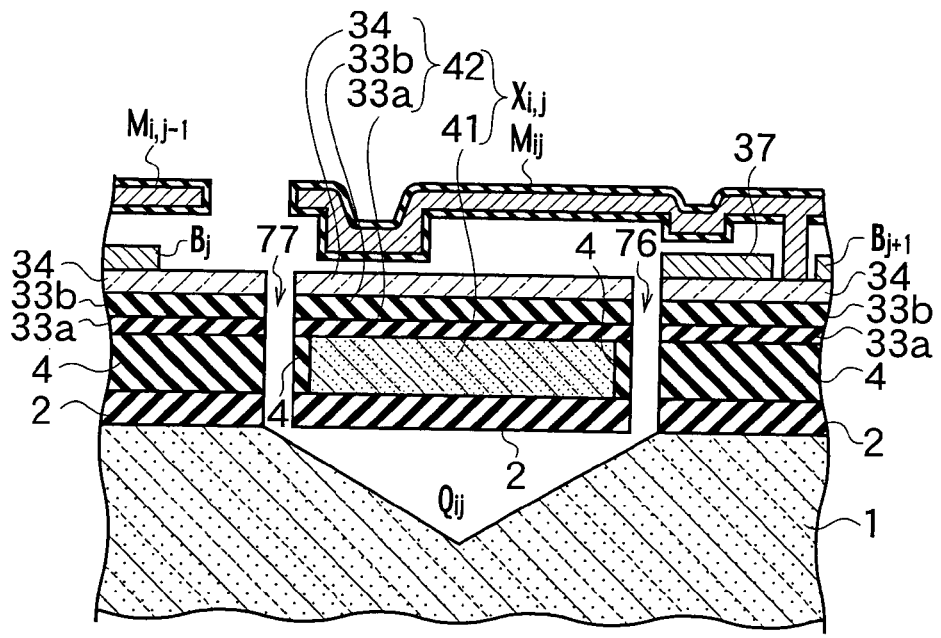
FIG. 3B is a cross-sectional view taken on line IIIB—IIIB in FIG. 2.

FIG. 3A is a cross-sectional view taken on line IIIA—IIIA in FIG. 2, and FIG. 3B is a cross-sectional view taken on line IIIB—IIIB in FIG. 2. The configuration shown in FIGS. 3A and 3B encompasses a base body (1, 2, 4) arranging a cavity $Q_{i,j}$ at a top surface, and a detector portion $X_{i,j}$ supported in a quasi-thermal isolation state above the cavity $Q_{i,j}$ disposed at the surface of the base body (1, 2, 4). The base body (1, 2, 4) is established by an SOI architecture, which encompasses a supporting substrate (a single crystalline silicon) 1, a buried oxide film ($SiO_2$ film) 2 on the supporting substrate 1 and an element isolation oxide film 4 on the buried silicon oxide film. The element isolation oxide film 4 takes the place of the single crystalline silicon layer (SOI film) implementing the SOI architecture (cf. FIGS. 7A–7D.), but a part of the single crystalline silicon layer may remain there. As shown in FIG. 2, the detector portion $X_{i,j}$ can be thermally isolated from the base body (1, 2, 4), by bridging the detector portion $X_{i,j}$ over the hollow cavity $Q_{i,j}$. As shown in FIG. 2 and FIG. 3A, a detector portion $X_{i,j}$ implementing each pixel is supported in air-bridge configuration above the base body (1, 2, 4) by the first supporting beam 21 and the second supporting beam 22. The thermal resistance of the first supporting beam 21 and the second supporting beam 22 is designed to have high resistance so that the detector portion $X_{i,j}$ can be "supported in a quasi-thermal isolation state", and the thermal conduction is suppressed so as to suppress the heat flow to the base body (1, 2, 4) at selecting period for accumulating thermal energy. The cavity $Q_{i,j}$ is implemented by a bottom surface of the concavity, which is established by removing a part of the base body (1, 2, 4) selectively, in a reverse pyramid geometry.

A detector portion $X_{i,j}$ shown in FIG. 2 embraces an infrared absorption layer 42 configured to absorb an incident infrared ray and to convert the infrared ray into heat, and a thermoelectric conversion portion 41 configured to convert a temperature change by the heat generated in the infrared absorption layer 42 to an electrical signal as shown in FIGS. 3A and 3B. The thermoelectric conversion portion 41 is implemented by a structure in which a p-n junction diode is merged in the surface of the single crystalline silicon layer 41, and the p-n junction diode is fabricated by selective doping of impurities at the surface of the single crystalline silicon layer 41. On the bottom surface and the side surface of the single crystalline silicon layer 41, the buried oxide film 2 and the element isolation oxide film 4 are laminated so as to encapsulate the single crystalline silicon layer 41 respectively. Instead of the p-n junction diode, bolometers such as doped polysilicon, vanadium oxide ($VO_2$), titanium (Ti), and amorphous silicon can be adopted. On a thermoelectric conversion portion 41 made of a single crystalline silicon layer, silicon oxide films serving as a first inter-layer insulation film 33a and a second inter-layer insulation film 33b are disposed. A silicon nitride film ($Si_3N_4$ film) 34 is stacked on the silicon oxide film (33a, 33b). By the composite film made of silicon oxide film (33a, 33b) and the silicon nitride film 34 implements the infrared absorption layer 42. The infrared absorption layer 42 is delineated in substantially the same geometry as the thermoelectric conversion portion 41. For example, the total thickness of the silicon oxide film can be chosen approximately 0.8 µm to 2.0 µm, and the thickness of the silicon nitride film 34 can be chosen approximately 0.3 µm to 0.8 µm. Preferably, the total thickness of the silicon oxide film may be chosen so as to be approximately 1.5 µm, and the thickness of the silicon nitride film 34 as approximately 0.5 µm.

As shown in FIG. 2 and FIG. 3A, the first supporting beam 21 and the second supporting beam 22 mechanically support the detector portion $X_{i,j}$ against the supporting substrate 1 and the buried oxide film 2 and element isolation oxide film 4 disposed on the supporting substrate 1. A first detector wiring 51 configured to connect the thermoelectric conversion portion 41 to the vertical signal line $B_j$ is embedded in the inside of the first supporting beam 21. A second detector wiring 52 configured to connect the thermoelectric conversion portion 41 to the horizontal address line $W_i$ is embedded in the inside of the second supporting beam 22. The first detector wiring 51 and the second detector wiring 52 can be made of refractory metal such as tungsten (W), titanium (Ti), cobalt (Co), molybdenum (Mo), or they may be made of the silicide ($WSi_2$, $TiSi_2$, $CoSi_2$, $MoSi_2$) implemented by these refractory metals, or polycide using these silicides. The signals produced in the thermoelectric conversion portion 41 are fed to a peripheral processing circuit by the first detector wiring 51 and the second detector wiring 52.

Furthermore, as shown in FIG. 2 and FIG. 3B, a control electrode 37 is established in each pixels. The control electrode 37 of each pixel, is connected through an auxiliary control electrode wiring 53 to the control electrode wiring $C_i$, and voltage is applied through the control electrode wiring $C_i$. For example, as shown in FIG. 2, the control electrode 37 and the auxiliary control electrode wiring 53 can be implemented by an upper level metallic wiring layer above the wiring level of the control electrode wiring $C_i$ so that the control electrode 37 can be connected electrically to the corresponding control electrode wiring C, through a via-hole.

As shown in FIG. 2 and FIG. 3B, facing the control electrode 37 of each pixel, contactor M in a cantilever configuration is established so that the contactor $M_{i,j}$ can be connected electrically to the contactor wiring $G_j$. A pillar of the contactor $M_{i,j}$ is fixed at the surface of the layered structure implemented by the buried oxide film 2, the element isolation oxide film 4, the silicon oxide film (33a, 33b), and the silicon nitride film 34 which are disposed on the supporting substrate 1, and the free edge extends from the pillar's side above the detector portion $X_{i,j}$. Then, the control electrode 37 and the contactor $M_{i,j}$ implement a mechanical switch. Electrically conductive material, or the metallic material such as aluminum (Al), copper (Cu), titanium (Ti), titanium nitride (Ti N), tungsten (W) are suitable materials for the contactor $M_{i,j}$.

As shown in FIGS. 3A and 3B, the contactor $M_{i,j}$ is encapsulated by a lower contactor sheath film 11 and an upper contactor sheath film 12. The lower contactor sheath film 11 and the upper contactor sheath film 12 may be made of a silicon oxide film or a silicon nitride film having a thickness of approximately 0.03 µm to 0.2 µm, for example, and protect the contactor $M_{i,j}$ from being etched in the fabrication process of the infrared image sensor, which will be explained later. The lower contactor sheath film 11 and the upper contactor sheath film 12 play an important role, when the contactor $M_{i,j}$ is made of metallic material such as Al-based metal, which has a possibility of being etched by the etching solution for the silicon etching. The lower contactor sheath film 11 also serves as a protection film configured to protect against short-circuit failure when the contactor $M_{i,j}$ mechanically contacts the surface of control electrode 37. If the contactor $M_{i,j}$ is made of material which is hard to be etched by the etching solution for silicon etching, the lower contactor sheath film 11 and the upper contactor sheath film 12 can be omitted, under the condition that there is some means for protecting the short-circuit failure between the contactor $M_{i,j}$ and the control electrode 37.

And, if there is some means for protecting the short-circuit failure between the contactor $M_{i,j}$ and the control electrode 37, the lower contactor sheath film 11 and the upper contactor sheath film 12 can be made of metallic material such as titanium nitride (TiN), which is not easily etched by the etching solution for silicon etching.

FIGS. 3A and 3B show a selected state of the detector portion $X_{i,j}$, in which a row-select pulse is applied to the horizontal address line $W_i$. In the blanking state, just before the row-select pulse is applied to the horizontal address line $W_i$, by applying bending voltage to the controlling electrode wiring $C_i$ so as to bend the contactor $M_{i,j}$ of the cantilever configuration, the free edge of the contactor $M_{i,j}$ and the detector portion $X_{i,j}$; are turned into a thermal contact condition, and heat accumulated in the detector portion $X_{i,j}$ is transported by thermal conduction. When the free edge of the contactor $M_{i,j}$ and the detector portion $X_{i,j}$ are turned into the thermal contact condition, the heat accumulated in the detector portion $X_{i,j}$ flows instantly to the supporting substrate (single crystalline silicon) 1 by thermal conduction through the free edge of the contactor $M_{i,j}$ and the temperature of the detector portion $X_{i,j}$ is initialized to the temperature before self-heating starts. In the selected state in which the thermal contact condition between the free edge of the contactor $M_{i,j}$ and the detector portion $X_{i,j}$ is released, when infrared radiation is irradiated on the infrared absorption layer 42, the temperature of the infrared absorption layer 42 rises in correspondence with the infrared-rays intensity, accompanied by the self-heating phenomenon.

Figure 4:
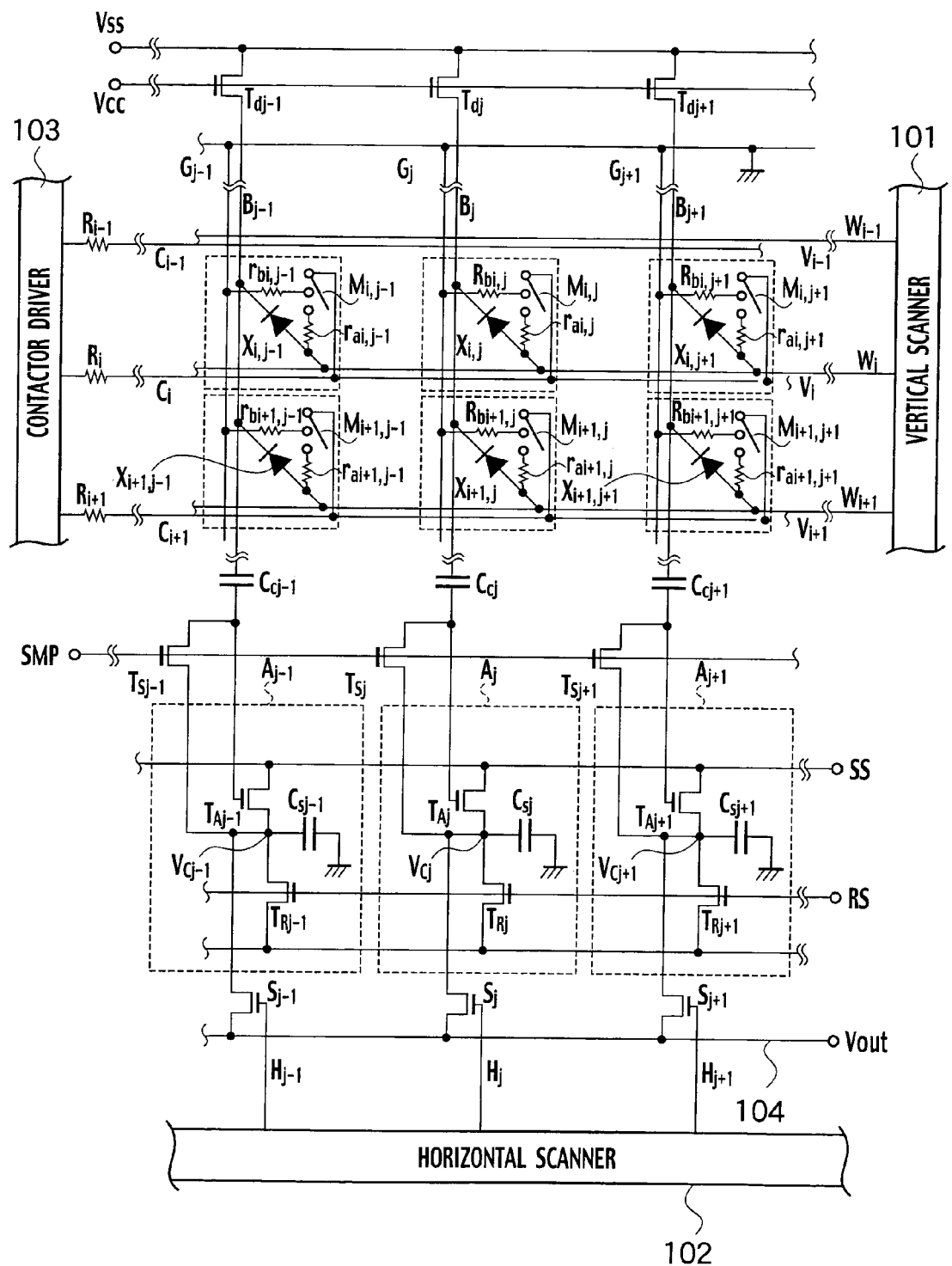
FIG. 4 is a simplified equivalent circuit including peripheral circuitry of the infrared image sensor according to the first embodiment of the present invention.

As shown in an equivalent circuit of FIG. 4, in the infrared image sensor according to the first embodiment, a vertical scanner 101 and a contactor driver 103 are disposed in the perimeter of an imaging area, along the row direction. And a horizontal scanner 102 is disposed in the perimeter of the imaging area, along the column direction. The horizontal address lines $Wi_{-1}$, $W_i$, $W_{i+1}$, . . . are connected to the vertical scanner 101, and the vertical signal lines $B_{j-1}$, $B_j$, $B_{j+1}$, . . . are connected to the horizontal scanner 102. A plurality of controlling electrode wiring $C_{i-1}$, $C_i$, $C_{i+1}$, . . . are connected to the contactor driver 103 through protective resistors $R_{i-1}$, $R_i$, $R_{i+1}$, . . . respectively. Each of the protective resistors $R_{i-1}$, $R_i$, $R_{i+1}$, . . . serves as a protective element for limiting the flow of the overcurrent, when short-circuit failure between the contactor $M_{i-1,j-1}$, $M_{i-1,j}$ . . . , $M_{i,j-1}$, $M_{i,j}$, . . . and the control electrode 37 occurs.

The detector portions $X_{i-1,j-1}, X_{i-1,j} \ldots, X_{i,j-1}, X_{i,j}, \ldots$ of the infrared image sensors are connected to the corresponding vertical signal lines $B_{j-1}, B_j, B_{j+1}, \ldots$ and the corresponding horizontal address lines $W_{i-1}, W_i, W_{i+1}, \ldots$. As the constant current supply configured to obtain output voltages from pixels, load MOS transistors $T_{dj-1}, T_{dj}, T_{dj+1}, \ldots$ are connected to the vertical signal lines $B_{j-1}, B_j, B_{j+1}, \ldots$ respectively. Substrate voltage is applied to each of the sources of the load MOS transistors $T_{dj-1}, T_{dj}, T_{dj+1}$. In FIG. 4, the contactors $M_{i-1,j-1}, M_{i-1,j} \ldots M_{i,j-1}, M_{i,j}, \ldots$ are shown as an example of the mechanical switch to be employed in the infrared image sensor according to the first embodiment. Each of the resistors $r_{ai-1,j-1}, r_{ai-1,j} \ldots, r_{ai,j-1}, r_{ai,j}, \ldots$ shown in FIG. 4 represent the total thermal resistance summing up the thermal resistance of the infrared absorption layer 42 itself shown in FIGS. 3A and 3B and the thermal contact resistance when the contactor $M_{i,j}$ is in contact with the infrared absorption layer 42. And, the resistors $r_{bi-1,j-1}, r_{bi-1,j} \ldots, r_{bi,j-1}, r_{bi,j}, \ldots$ shown in FIG. 4 represents the electrical resistance of the lower contactor sheath film 11 shown in FIG. 3B, when the contactors $M_{i-1,j-1}, M_{i-1,j} \ldots, M_{i,j-1}, M_{i,j}, \ldots$ are in contact with the control electrode 37. When the contactor $M_{i,j}$ comes into contact with the infrared absorption layer 42, as shown in FIGS. 3A and 3B, most of the heat is transported away through the silicon nitride film (the third inter-layer insulation film) 34, the silicon oxide film (the second inter-layer insulation film) 33b, and the silicon oxide film (the first inter-layer insulation film) 33a to the base body (1, 2, 4), but, the illustration of the heat flow is omitted in the equivalent circuit shown in FIG. 4.

Supply voltage Vd is applied to the horizontal address lines $W_{i-1}, W_i, W_{i+1}, \ldots$ chosen by vertical scanner 101, and substrate voltage Vss is applied to the horizontal address line $W_i$ that is not chosen by the vertical scanner 101. As a result, an internal p-n junction of the detector portion $X_{i,j}$ on the chosen row becomes forward-biased so as to conduct the bias current, and the operating point is determined by the temperature of the p-n junction in the inside of the detector portion $X_{i,j}$ and by the forward-bias current. Then, the signal output voltages of the detector portions $X_{i-1,j-1}, X_{i-1,j} \ldots, X_{i,j-1}, X_{i,j}, \ldots$ are supplied to the corresponding vertical signal lines $B_{j-1}, B_j, B_{j+1}, \ldots$ of each column. At this time, the p-n junction of the detector portions $X_{i-1,j-1}, X_{i-1,j} \ldots, X_{i,j-1}, X_{i,j}, \ldots$ which are not chosen by the vertical scanner 101, are reverse biased. Namely, the p-n junction in each of the detector portions $X_{i-1,j-1}, X_{i-1,j} \ldots, X_{i,j-1}, X_{i,j}, \ldots$ has a function for selecting the detector portions $X_{i-1,j-1}, X_{i-1,j} \ldots X_{i,j-1}, X_{i,j}, \ldots$ respectively.

Because the voltages transferred to the vertical signal lines $B_{j-1}, B_j, B_{j+1}, \ldots$ are extremely low, it is necessary to suppress the noise voltages equal to or less than the voltage (for example, 5 μV) at the vertical signal lines $B_{j-1}, B_j, B_{j+1}, \ldots$. For example, the value of the noise is about 1/80 of the noise of the CMOS sensor, which is the MOS type visible image sensor. Amplifying read-out circuits $A_{j-1}, A_j, A_{j+1}, \ldots$ are connected to each column in order to amplify the signal voltage at low voltages, the vertical signal lines $B_{j-1}, B_j, B_{j+1}, \ldots$ and the gates of the amplification transistors $T_{Aj-1}, T_{Aj}, T_{Aj+1}, \ldots$ in each column are capacitively coupled respectively through the coupling capacitors $C_{cj-1}, C_{cj}, C_{cj+1}$. The vertical signal lines $B_{j-1}, B_j, B_{j+1}, \ldots$ and the amplifying read-out circuit $A_{j-1}, A_j, A_{j+1}, \ldots$ are mutually isolated in a DC mode by the coupling capacitors $C_{cj-1}, C_{cj}, C_{cj+1}, \ldots$.

The storage capacitors $C_{sj-1}, C_{sj}, C_{sj+1}, \ldots$ configured to integrate and to accumulate the signal current, which are current-amplified, are connected to drain sides of the amplification transistors $T_{Aj-1}, T_{Aj}, T_{Aj+1}, \ldots$ respectively. The integration time for integrating the signal current is determined by a row-select pulse applied to the horizontal address lines $W_{i-1}, W_i, W_{i+1}, \ldots$ by the vertical scanner 101. Reset transistors $T_{Rj-1}, T_{Rj}, T_{Rj+1}, \ldots$ configured to reset the voltage of each of the storage capacitors $C_{sj-1}, C_{sj}, C_{sj+1}, \ldots$ are connected to the storage capacitors $C_{sj-1}, C_{sj}, C_{sj+1}, \ldots$ and reset operation starts after the read-out of the signal voltage with the horizontal select transistors $S_{j-1}, S_j, S_{j+1}, \ldots$ is completed.

The drain of each of the amplification transistors $T_{Aj-1}, T_{Aj}, T_{Aj+1}, \ldots$ is connected to the gate of the amplification transistors $T_{Aj-1}, T_{Aj}, T_{Aj+1}, \ldots$ through sample transistors $T_{sj-1}, T_{sj}, T_{sj+1}, \ldots$ and the potential of the gate and the drain of the amplification transistors $T_{Aj-1}, T_{Aj}, T_{Aj+1}, \ldots$ become the same by turning on the sample transistors $T_{sj-1}, T_{sj}, T_{sj+1}, \ldots$.

1.2 Operation of Infrared Image Sensor

Figure 5:
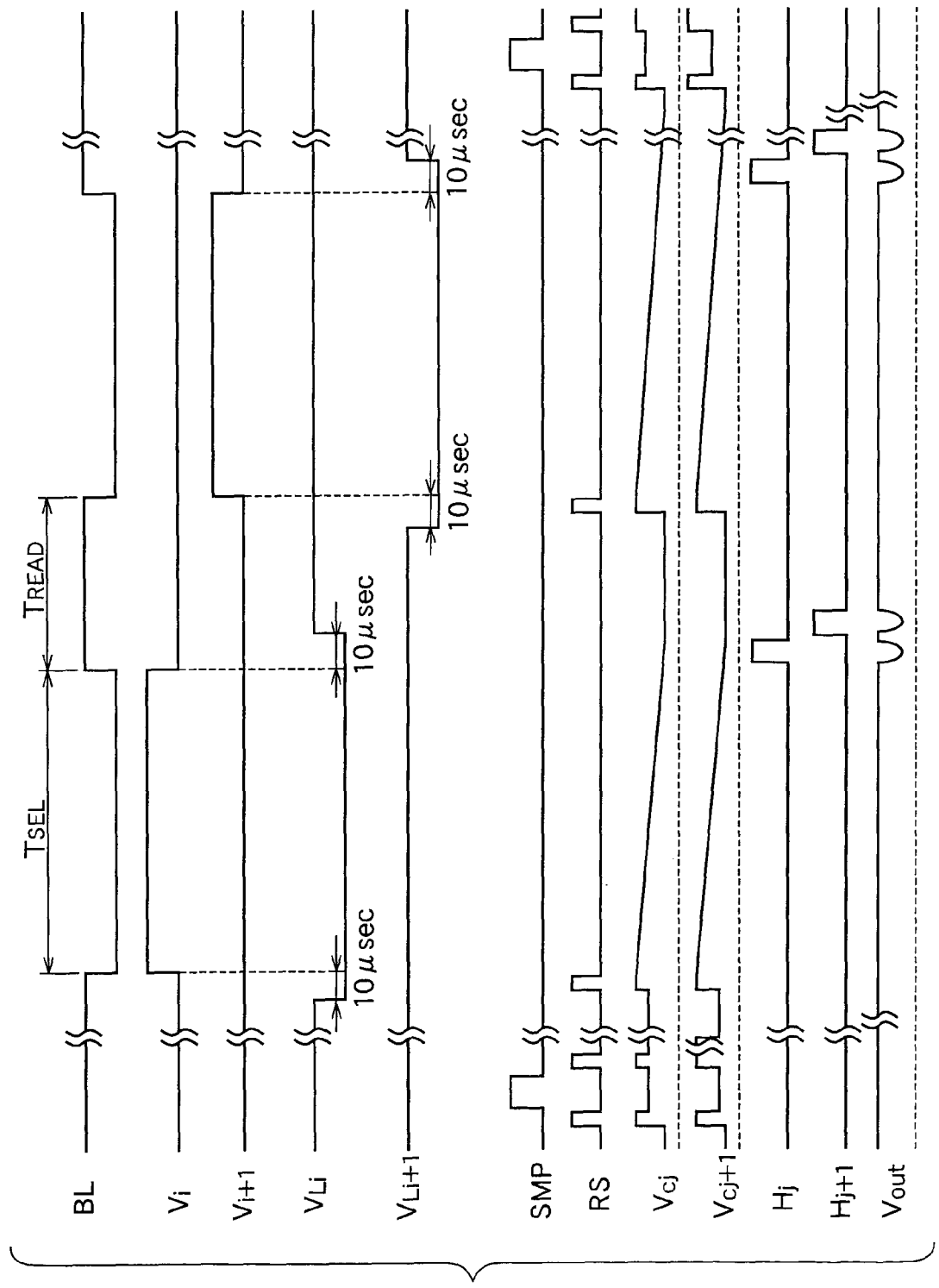
FIG. 5 shows a relationship of timing between the variation of the control voltage applied to a control electrode wiring and the variation of the read-out voltage applied to a vertical signal line in the infrared image sensor according to the first embodiment of the present invention.

FIG. 5 shows a timing chart for explaining operation of the infrared image sensor according to the first embodiment. The source potential of the load MOS transistors $T_{dj-1}, T_{dj}, T_{dj+1}, \ldots$ and the source potential of the amplification transistors $T_{Aj-1}, T_{Aj}, T_{Aj+1}, \ldots$, which are not illustrated in the timing chart, . . . are supplied with the substrate voltage Vss, and the supply voltage is applied to the drain voltage of the reset transistors $T_{Rj-1}, T_{Rj}, T_{Rj+1}, \ldots$.

On the left side in FIG. 5, there is a non-selecting period. That is to say, in the left side of the selecting period $T_{SEL}$ in which a horizontal address line $W_1$ of the first row is selected, there is a non-selecting period, in which the vertical scanner 101 does not select rows, although the illustration of the first row is omitted in FIG. 4. The threshold information of the amplification transistors $T_{Aj-1}, T_{Aj}, T_{Aj+1}, \ldots$ is acquired and stored in the non-selecting period. In the non-selecting period, the voltage of the vertical signal lines $B_{j-1}, B_j, B_{j+1}, \ldots$ becomes the substrate voltage Vss, because the voltage of the vertical signal lines $B_{j-1}, B_j, B_{j+1}, \ldots$ becomes equal to the supply voltage Vd of the load MOS transistors $T_{dj-1}, T_{dj}, T_{dj+1}$. At first, the reset transistors $T_{Rj-1}, T_{Rj}, T_{Rj+1}, \ldots$ are turned on in the non-selecting period so as to reset the voltage of the storage capacitors $C_{sj-1}, C_{sj}, C_{sj+1}, \ldots$. Next, the sample transistors $T_{sj-1}, T_{sj}, T_{sj+1}, \ldots$, are turned on so that the drain voltage $V_{cj-1}, V_{cj}, V_{cj+1}, \ldots$ of the amplification transistors $T_{Aj-1}, T_{Aj}, T_{Aj+1}, \ldots$, being reset to the supply voltage, can be applied to the gate of the amplification transistors $T_{Aj-1}, T_{Aj}, T_{Aj+1}, \ldots$. Therefore, the amplification transistors $T_{Aj-1}, T_{Aj}, T_{Aj+1}, \ldots$ are turned on, and drain current flows. Drain voltage decreases by the drain current so as to reduce the electrical conductance of the amplification transistors $T_{Aj-1}, T_{Aj}, T_{Aj+1}, \ldots$, and the gate voltage in the state in which the drain current does not flow, is acquired by the drain voltage $V_{cj-1}, V_{cj}, V_{cj+1}, \ldots$. The voltage is "the threshold voltage" of the amplification transistors $T_{Aj-1}, T_{Aj}, T_{Aj+1}, \ldots$ in each row. After the threshold information of the amplification transistors $T_{Aj-1}, T_{Aj}, T_{Aj+1}, \ldots$ is read by drain voltage $V_{cj-1}, V_{cj}, V_{cj+1}, \ldots$, by turning off the sample transistors $T_{sj-1}, T_{sj}, T_{sj+1}, \ldots$ the threshold information is stored in the coupling capacitors $C_{cj-1}, C_{cj}, C_{cj+1}, \ldots$. Since the read-out operation of the threshold information is executed once in a frame period, the read-out operation before the row-select operation in the succeeding rows, which have a larger row number than the second row, is not executed, and the stored threshold information obtained ahead of the first row-select is employed in the succeeding operations. Next, the reset transistors $T_{Rj-1}$, $T_{Rj}$, $T_{Rj+1}$, ... are turned on so as to reset the drain voltage $V_{cj-1}$, $V_{cj}$, $V_{cj+1}$, ....

In selecting period $T_{SEL}$ of the first row following the non-selecting period, a row-select pulse $V_1$ is applied to the first horizontal address line $W_1$.

In FIG. 5, it is assumed that the row-select pulses $V_1$, $V_2$, ..., $V_{i-1}$, $V_i$, $V_{i+1}$, ... are applied for 20µ second to the horizontal address lines $W_1$, $W_2$, ..., $W_{i-1}$, $W_i$, $W_{i+1}$, ... at intervals of 1/60 second. Until the 10µ second before the row-select pulse $V_1$ is applied to the first horizontal address line $W_1$, bending voltage $V_{L1}$ is applied to the controlling electrode wiring $C_1$ of the first row so that the contactors $M_{1j-1}$, $M_{1j}$, $M_{1j+1}$, ... and the detector portions $X_{1j-1}$, $X_{1j}$, $X_{1j+1}$, ... are turned into a thermal contact condition, and the temperature of the detector portions $X_{1j-1}$, $X_{1j}$, $X_{ij+1}$, ... of the first row are set to be the value before the self-overheat occurs. And, ahead of 10µ second, before the row-select pulse $V_1$ is applied to the first horizontal address line $W_1$, the thermal contact condition between the contactors $M_{1j-1}$, $M_{1j}$, $M_{1j+1}$, ... and the detector portions $X_{1j-1}$, $X_{1j}$, $X_{1j+1}$, ... is released by applying 0V to the controlling electrode wiring $C_1$ of the first row, connecting with the control electrode 37. A constant voltage of 0V is applied to the contactor wirings $G_{j-1}$, $G_j$, $G_{j+1}$, ... connected to the contactors $M_{1j-1}$, $M_{1j}$, $M_{1j+1}$, .... And, by irradiation of infrared-rays to the detector portions $X_{1j-1}$, $X_{1j}$, $X_{1j+1}$, ..., the temperature of the detector portions $X_{1j-1}$, $X_{1j}$, $X_{1j+1}$, ... is raised. In this state, when the row-select pulse $V_1$ is applied to the first horizontal address line $W_1$, via a current path leading from the load MOS transistors $T_{dj-1}$, $T_{dj}$, $T_{dj+1}$, ..., through the vertical signal lines $B_{j-1}$, $B_j$, $B_{j+1}$, ..., the detector portions $X_{1j-1}$, $X_{1j}$, $X_{1j+1}$, ... on the first row, the first horizontal address line $W_1$, and to the vertical scanner 101, the bias current determined by the load MOS transistors $T_{dj-1}$, $T_{dj}$, $T_{dj+1}$, ... flows. Operating points of the detector portions $X_{1j-1}$, $X_{1j}$, $X_{1j+1}$, ... are determined by the bias currents and the temperatures of the p-n junctions, that serves as the thermoelectric conversion means in the detector portions $X_{1j-1}$, $X_{1j}$, $X_{1j+1}$, .... And, the output voltages of the detector portions $X_{1j-1}$, $X_{1j}$, $X_{1j+1}$, ..., varying with the temperature of the detector portions $X_{1j-1}$, $X_{1j}$, $X_{1j+1}$, ..., are supplied to the vertical signal lines $B_{j-1}$, $B_j$, $B_{j+1}$, ... in each column. And, the respective voltages of the vertical signal lines $B_{j-1}$, $B_j$, $B_{j+1}$, ... change from the substrate voltage Vss to the output voltages of the detector portions $X_{1j-1}$, $X_{1j}$, $X_{1j+1}$, ....

The voltage variations of the respective vertical signal lines $B_{j-1}$, $B_j$, $B_{j+1}$, ... change the gate voltage of the amplification transistors $T_{Aj-1}$, $T_{Aj}$, $T_{Aj+1}$, ... by the coupling due to the coupling capacitors $C_{cj-1}$, $C_{cj}$, $C_{cj+1}$, .... Therefore, the gate voltages of the amplification transistors $T_{Aj-1}$, $T_{Aj}$, $T_{A+1}$, ... become the sum of the output voltage change information of the detector portions $X_{1j-1}$, $X_{1j}$, $X_{1j+1}$, ... and the threshold information of the amplification transistors $T_{Aj-1}$, $T_{Aj}$, $T_{Aj+1}$, ... stored in the non-selecting period. As a result, the amplification transistors $T_{Aj-1}$, $T_{Aj}$, $T_{Aj+1}$, ... are turned on so that the drain current $V_{cj-1}$, $V_{cj}$, $V_{cj+1}$, ... depending on the voltages in the vertical signal lines $B_{j-1}$, $B_j$, $B_{j+1}$, ... can flow, and the currents are integrated for the duration of the selecting period $T_{SEL}$ of the first row by the storage capacitors $C_{sj-1}$, $C_{sj}$, $C_{sj+1}$, ... and the drain voltage $V_{cj-1}$, $V_{cj}$, $V_{cj+1}$, ... varies. Because the gate voltages configured to control the drain current of the amplification transistors $T_{Aj-1}$, $T_{Aj}$, $T_{Aj+1}$, ... are determined by the shift amount from the stored threshold voltage, the influence of the threshold varying in each column is not received. And lagging 10µ sec after the completion of the first row-selecting period $T_{SEL}$, when the control voltage is applied to the control electrode wiring $C_1$ of the first row again so that the contactors $M_{1j-1}$, $M_{1j}$, $M_{1j+1}$, ... and the detector portions $X_{ij-1}$, $X_{1j}$, $X_{1j+1}$, ... are turned into the thermal contact condition, the thermal energy accumulated in the detector portions $X_{1j-1}$, $X_{1j}$, $X_{1j+1}$, ... can be transported away.

In the horizontal read-out period $T_{READ}$ of the first row following the first row-selecting period $T_{SEL}$, the horizontal select transistors $S_{j-1}$, $S_j$, $S_{j+1}$, ... are selected sequentially by the horizontal scanner 102, and drain voltage $V_{cj-1}$, $V_{cj}$, $V_{cj+1}$, ... are read sequentially to a horizontal signal line 104.

As for the operations succeeding the second row operation, excepting the operation of the sample transistors $T_{sj-1}$, $T_{sj}$, $T_{sj+1}$, ... it is similar to the operation in the first row.

For example, in an i-th row, as shown in FIG. 5, the drain current is integrated and read sequentially in the selecting period $T_{SEL}$ of the i-th row. Until the 10µ second before the row-select pulse is applied to the horizontal address line $W_i$ of the i-th row, the control voltage $V_{Li}$ is applied to the control electrode wiring $C_i$ so that the contactors $M_{i,j-1}$, $M_{i,j}$, $M_{i,j+1}$, ... and the detector portions $X_{i,j-1}$, $X_{i,j}$, $X_{i,j+1}$, ... turn into the thermal contact condition, and the temperature is settled to the value before the self-heating. And ahead of 10µ second before the row-select pulse $V_i$ is applied to the horizontal address line Wi, the contacts between the contactors $M_{i,j-1}$, $M_{i,j}$, $M_{i,j+1}$, ... and the detector portions $X_{i,j-1}$, $X_{i,j}$, $X_{i,j+1}$, ... are released, by applying 0V to the control electrode wiring $C_i$ connecting with control electrode 37. A constant voltage of 0V is applied to the contactor wiring $G_{j-1}$, $G_j$, $G_{j+1}$, ... connected to the contactors $M_{i,j-1}$, $M_{i,j}$, $M_{i,j+1}$, .... And, by irradiation of the infrared-rays to the detector portions $X_{i,j-1}$, $X_{i,j}$, $X_{i,j+1}$, ... the temperatures of the detector portions $X_{i,j-1}$, $X_{i,j}$, $X_{i,j+1}$, ... are raised. In this state, a row-select pulse $V_i$ is applied to the horizontal address line $W_i$ of the i-th row, and the selecting period $T_{SEL}$ of the i-th row is started. In the selecting period $T_{SEL}$ of the i-th row, via the current path leading from the load MOS transistors $T_{dj-1}$, $T_{dj}$, $T_{dj+1}$, ..., through the vertical signal lines $B_{j-1}$, Bj, $B_{j+1}$, ..., the detector portions $X_{i,j-1}$, $X_{i,j}$, $X_{i,j+1}$, ... of the i-th row, the horizontal address line $W_i$ of the i-th row, to the vertical scanner 101, the bias current determined by the load MOS transistors $T_{dj-1}$, $T_{dj}$, $T_{dj+1}$, ... flows. Operating points of the detector portions $X_{i,j-1}$, $X_{i,j}$, $X_{i,j+1}$, ... are determined by the bias currents and the temperatures of the p-n junctions that serves as the thermoelectric conversion means in the detector portions $X_{i,j-1}$, $X_{i,j}$, $X_{i,j+1}$, ..., the output voltages of the detector portions $X_{ij-1}$, $X_{i,j}$, $X_{i,j+1}$, ... varying with the temperatures of the detector portions $X_{i,j-1}$, $X_{i,j}$, $X_{i,j+1}$, ... are supplied to the vertical signal lines $B_{j-1}$, $B_j$, $B_{j+1}$, ... respectively. And, voltages of the vertical signal lines $B_{j-1}$, $B_j$, $B_{j+1}$, ... change from the substrate voltage Vss to give the output voltage of the detector portions $X_{i,j-1}$, $X_{i,j}$, $X_{i,j+1}$, .... Voltage variations of the vertical signal lines $B_{j-1}$, $B_j$, $B_{j+1}$, ... change the gate voltage of the amplification transistors $T_{Aj-1}$, $T_{Aj}$, $T_{Aj+1}$, ... by the coupling effect through the coupling capacitors $C_{cj-1}$, $C_{cj}$, $C_{cj+1}$, .... Therefore, the respective gate voltages of the amplification transistors $T_{Aj-1}$, $T_{Aj}$, $T_{Aj+1}$, ... become the sum of the output voltage change information of the detector portions $X_{i,j-1}$, $X_{i,j}$, $X_{i,j+1}$, ... and the threshold information of the amplification transistors $T_{Aj-1}$, $T_{Aj}$, $T_{Aj+1}$, ... stored in the non-selecting period. As a result, the amplification transistors $T_{Aj-1}$, $T_{Aj}$, $T_{Aj+1}$, ... are turned on so that the drain current flows, depending on the vertical signal line voltages, and the current is integrated for the duration of the i-th row selecting period $T_{SEL}$ by the storage capacitors $C_{sj-1}$, $C_{sj}$, $C_{sj+1}$, . . . , and the drain voltage $V_{cj-1}$, $V_{cj}$, $V_{cj+1}$, . . . varies. Because the gate voltages configured to control the respective drain current of the amplification transistors $T_{Aj-1}$, $T_{Aj}$, $T_{Aj+1}$, . . . are determined by the shift amount from the stored threshold voltage, the influence of the threshold variation in each column is not received. And, lagging 10μ sec after the completion of i-th row selecting period $T_{SEL}$, the control voltage is applied to the control electrode wiring $C_i$ again so that the contactors $M_{i,j-1}$, $M_{i,j}$, $M_{i,j+1}$, . . . and the detector portions $X_{i,j-1}$, $X_{i,j}$, $X_{i,j+1}$, . . . are turned into thermal contact condition, and the heat accumulated in the detector portions $X_{i,j-1}$, $X_{i,j}$, $X_{i,j+1}$, . . . can be transported away.

In the i-th row horizontal read-out period following the i-th row selecting period $T_{SEL}$, the horizontal scanner 102 elects horizontal select transistors $S_{j-1}$, $S_j$, $S_{j+1}$, . . . sequentially, and the horizontal signal line 104 reads the drain voltages $V_{cj-1}$, $V_{cj}$, $V_{cj+1}$, . . . sequentially.

Operations following after the i-th row operation, as shown in FIG. 5, are similar to the operation of the i-th row, and the drain currents in the i-th row selecting period $T_{SEL}$ are integrated and read sequentially.

Figure 6A:
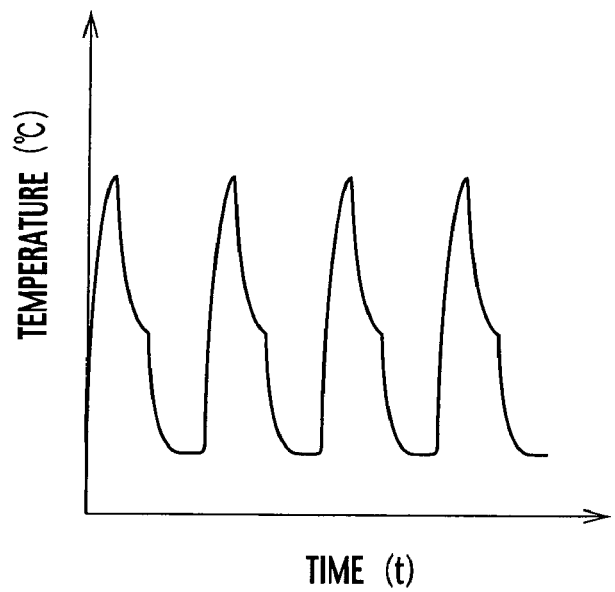
FIG. 6A is a diagram showing the change of temperature of a detector portion in the infrared image sensor according to the first embodiment of the present invention.
Figure 6B:
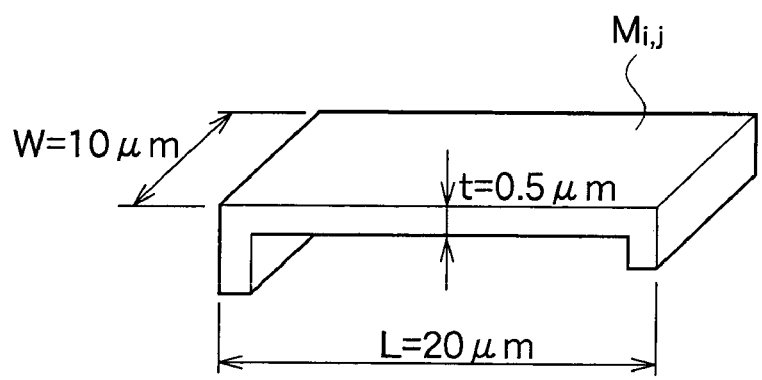
FIG. 6B illustrates the geometry and the size of a contactor having a cantilever configuration in the infrared image sensor according to the first embodiment of the present invention.

The change of temperature of the detector portion $X_{i,j}$ with time is shown in FIG. 6A. Here, heat flow by a contactor $M_{i,j}$ implemented by a cantilever configuration as shown in FIG. 6A, having Width W=10 μm, length L=20 μm, and thickness t=0.5 μm is speculated. In this case, the cross-section S perpendicular to the heat flow becomes:

$$S = 10\ \mu m \times 0.5\ \mu m = 5\ \mu m^2 \quad (1)$$

When material of the contactor $M_{i,j}$ is supposed to be made of Al, because heat capacity C=1.6×10$^{-9}$ J/K, heat conduction coefficient G=237W/(m/K), the thermal time constant becomes:

$$\tau = C \cdot (L/G) \cdot S = 59\ \mu sec \quad (2)$$

When the frame rate=120 fps is assumed, because the vertical scanning cycle T is 1/120=8.3 m s, it is understood that the thermal time constant τ is faster by two figures than the vertical scanning cycle T.

In this way, according to the infrared image sensor of the first embodiment, using the mechanical switch, when pulse voltage is applied to the thermoelectric conversion portion 41, the temperature rise in the detector portions $X_{i,j-1}$, $X_{i,j}$, $X_{i,j+1}$, . . . by self-heating can be reset in each frame as shown in FIG. 6A. Therefore, it is possible to increase the frame rate more, and the infrared image sensor having a high sensitivity and a high response can be achieved. In addition, even if the frame rate is raised, because the temperature rise in the detector portions $X_{i,j-1}$, $X_{i,j}$, $X_{i,j+1}$, . . . generated by the self-heating phenomenon can be decreased enough in the blanking period, the thermal breakdown phenomenon can be suppressed, too. As a result, because the infrared image sensor operating with high frame rate can be achieved, i.e. the frame rate is approximately 5–10 times of the earlier thermal type infrared camera, it becomes suitable for nighttime front monitoring of vehicles.

1.3 Fabrication Method of Infrared Image Sensor

Focusing on a pixel suspended in a cavity $Q_{i,j}$, a manufacturing method of the infrared image sensor according to the first embodiment is explained, referring to drawings shown in FIGS. 7A to 19B. In FIGS. 8A/8B to FIGS. 19/19B, the drawings labeled with A, or-FIGS. 7A, 8A, 9A, . . . , 19A, are respectively cross-sectional views taken on line IIIA—IIIA in FIG. 2, and the drawings labeled with B, or FIGS. 7B, 8B, 9B, . . . , 19B, are respectively cross-sectional views taken on line IIIB—IIIB in FIG. 2. The manufacturing method of the infrared image sensor described in the following is a mere example, and can be realized by miscellaneous manufacturing methods aside from the present disclosure, of course.

Figure 7A:
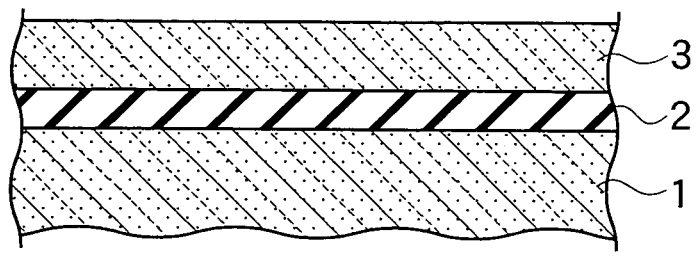
FIGS. 7A–7D are process flow sectional views explaining a manufacturing method of the infrared image sensor according to the first embodiment of the present invention;.
Figure 7B:
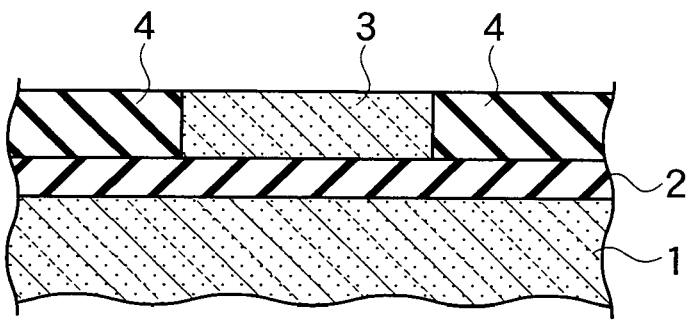
Figure 8A:
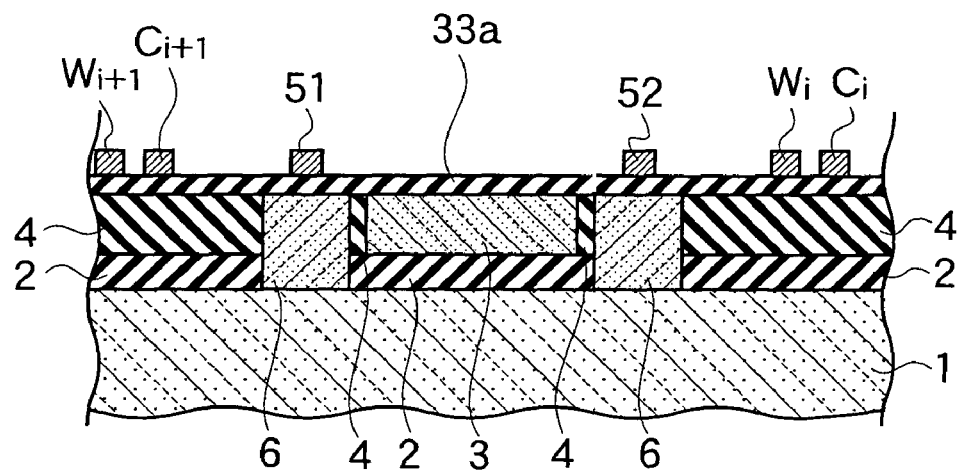
FIGS. 8A and 8B are succeeding process flow sectional views after the process stage shown in FIGS. 7A–7D, explaining the manufacturing method of the infrared image sensor according to the first embodiment of the present invention.

(a) At first, a so-called SOI substrate, a laminated structure encompassing a top buried oxide film 2, a middle single crystalline silicon layer 3 and a bottom single crystalline silicon supporting substrate 1 as shown in FIG. 7A is prepared. Next, an element isolation region is defined by means of a technique of photolithography, and a part of the single crystalline silicon layer 3, disposed at the planned portion for forming the element isolation region, is removed selectively by a technique of reactive ion etching (RIE) method, for example so as to form an element isolation groove. And, the element isolation groove is buried with an element isolation oxide film 4, which is deposited by a technique of chemical vapor deposition (CVD) method, and the surface of the element isolation oxide film 4 is planarized by a technique such as chemical mechanical polishing (CMP) method, as shown in FIG. 7B.

Figure 7C:
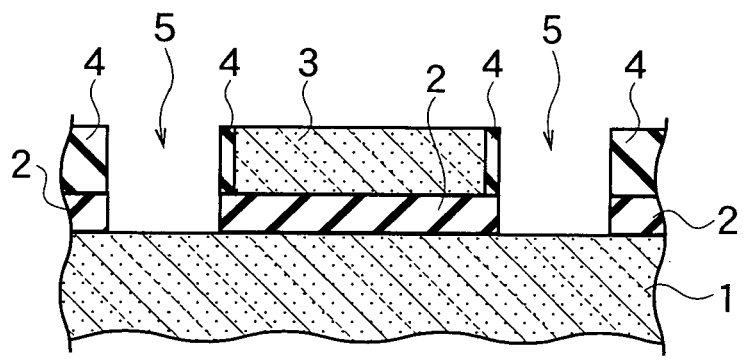
Figure 7D:
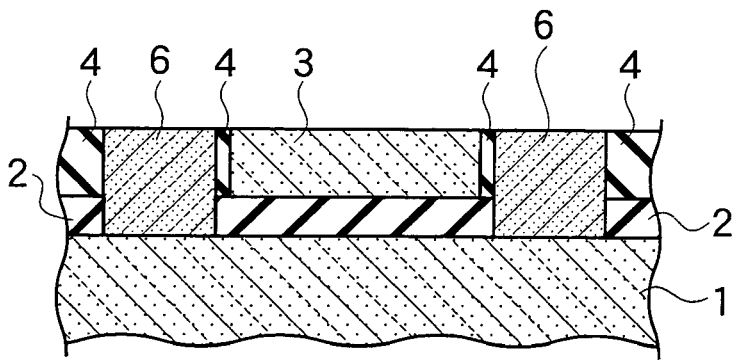

(b) Next, a part of the element isolation oxide film 4 and a part of the buried oxide film 2 disposed at the scheduled area of the first supporting beam 21 and the second supporting beam 22, which are shown in FIG. 3A are removed selectively by RIE method, for example so as to form grooves as shown in FIG. 7C. FIG. 7C is a cross-sectional view taken on line IIIA—IIIA in FIG. 2. But, in a cross-sectional view taken on line IIIB—IIIB in FIG. 2, grooves having a Width narrower than the Width shown in FIG. 7C is formed simultaneously. Then, a first sacrificial silicon film is deposited so as to bury the grooves by CVD method, and the surface of the first sacrificial silicon film is planarized as shown in FIG. 7D by CMP method. The first sacrificial silicon film may be made of monocrystalline, polycrystalline, or amorphous silicon. In the planarization process shown in FIG. 7D, in order to protect the top surface of the single crystalline silicon layer 3, which is scheduled to become the so-called 'active area', before the formation process of the grooves, it is desirable to execute a protection process for covering the top surface of the single crystalline silicon layer 3 with a silicon oxide film. Next, n-type impurity doped regions and p-type impurity doped regions for implementing the p-n junction diodes in the detector portions $X_{i,j-1}$, $X_{i,j}$, $X_{i,j+1}$, . . . are formed by a selective doping technique such as a selective ion implantation with photolithography technique, sequentially. With this sequential selective doping process, the source/drain regions of the transistors for implementing circumscription circuitry, which include the vertical scanner 101, the horizontal scanner 102, the contactor driver 103, and constant current supply, shown in FIG. 6A, are simultaneously doped. Peripheral circuitry can be formed by a manufacturing method such as a standard MOS integrated circuit fabrication technique. Although the description of the detailed fabrication process is omitted, after forming the regions required in a standard MOS integrated circuit, such as an inversion protection layer (channel-stop region) and an element isolation region, the top surface of the single crystalline silicon layer 3 is thermally oxidized so as to form a gate oxide film having a thickness of 50 nm–100 nm. At the time of this process stage, the Vth control ion implantation can be executed additionally. Next, on the entire surface of the gate oxide film, a polysilicon film is deposited with the thickness of approximately 300 nm–600 nm, for example 400 nm, by CVD method. Next, a photo resist film (hereinafter merely called "photo resist") is spin-coated on the surface of the polysilicon film. The photo resist is delineated by the photolithography technique, and the polysilicon film is etched by RIE method, using the etching mask of the delineated photo resist so as to form the gate electrode and the polysilicon wiring (not illustrated in the drawings). Thereafter, the photo resist is removed, and a new photo resist is spin-coated on the surface of gate electrode. Next, ion implantation Windows are formed in the new photo resist on the MOS transistor scheduled area by photolithography technique so as to expose a part of the polysilicon gate electrode. And, employing the exposed polysilicon gate electrode and the new photo resist as an implantation mask, in a self-alignment manner, arsenic ions ($^{75}As^+$) are implanted with a dose quantity of $3 \times 10^{15}$ cm$^{-2}$ to $2 \times 10^{16}$ cm$^{-2}$. Arsenic ions are also implanted into the polysilicon gate electrode of the n-channel MOS transistors, simultaneously. Similarly, employing the exposed polysilicon gate electrode and another new photo resist as an implantation mask, in a self-alignment manner, boron ions ($^{13}B^+$) are implanted with a dose quantity of $3 \times 10^{15}$ cm$^{-2}$ to $1 \times 10^{16}$ cm$^{-2}$. Boron ions are also implanted into the polysilicon gate electrode of the p-channel MOS transistors, simultaneously. After removing the other new photo resist, the single crystalline silicon layer 3 is annealed so that the implanted impurity ions can be activated and diffused into the single crystalline silicon layer 3, and the n-type source/drain regions, p-type source/drain regions are formed in the single crystalline silicon layer 3, simultaneously with the n-type impurity doped regions and the p-type impurity doped regions for the p-n junction diodes in the detector portion $X_{i,j}$. But, illustration of the n-type source/drain region p-type source/drain regions and illustration of the n-type and p-type impurity doped regions for the p-n junction diodes in the single crystalline silicon layer 3 are omitted.

Figure 8B:
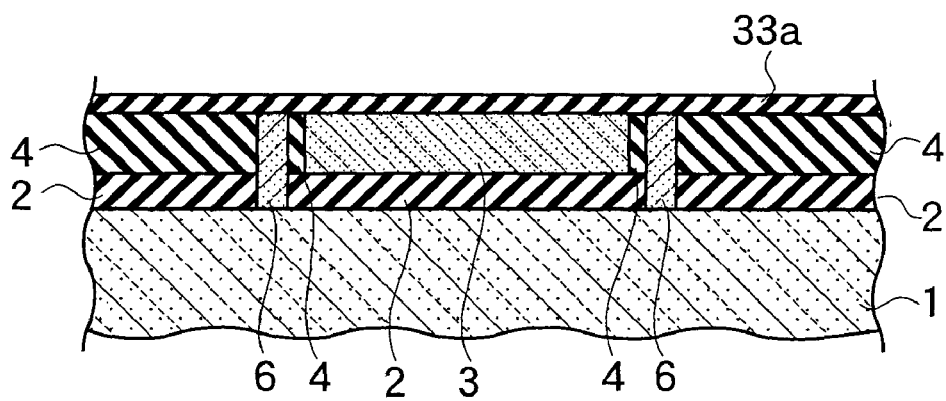

(c) Next, as shown in FIGS. 8A and 8B, using a thermal oxidation method or CVD method, on the surface of the single crystalline silicon layer 3, a silicon oxide film serving as the first inter-layer insulation film 33a is deposited with an approximate thickness of 0.5 µm to 1.0 µm. Furthermore, although the illustration is omitted, for facilitating the metallization to the source/drain regions of the transistors scheduled to be disposed in the peripheral circuitry, and for facilitating the metallization to the n-type and p-type impurity doped regions for the p-n junction diodes in the detector portion $X_{i,j}$ a plurality of contact holes are opened at predetermined portions of the first inter-layer insulation film 33a. Furthermore, using the sputtering technique or the electron beam vacuum evaporation technique, the metallic film such as titanium (Ti) film, tungsten (W) film etc. is deposited. Subsequently, by the metallization technique accompanied by photolithography techniques so as to delineate the metallic film, the first detector wiring 51, the second detector wiring 52, the horizontal address line $W_{i+1}$, $W_i$, . . . and the control electrode wiring $C_{i,+1}$, $C_1$, . . . are formed as the first level metallic interconnection, as shown in FIG. 8A. Although the illustration is omitted, in adjacent pixels, the first detector wiring 51, the second detector wiring 52, neighboring horizontal address line $W_{i-1}$, $W_{i-2}$, . . . and neighboring control electrode wiring $C_{i-1}$, $C_{i-2}$, . . . are also delineated of course. Because the second detector wirings 52 of each pixel lies in the same level (metallization level) as the horizontal address line $W_{i+1}$, $W_i$, . . . , in a single continues piece of metallic pattern, they can be connected to each other electrically. In addition to the metallization of the first detector wiring 51, the second detector wiring 52, the horizontal address line $W_{i+1}$, $W_i$, . . . and the control electrode wiring $C_{i-1}$, $C_i$, . . . the first level metallic interconnection for the peripheral circuitry and the p-n junction diodes for the detector portion $X_{i,j}$ are also formed simultaneously, but these illustrations are omitted.

Figure 9A:
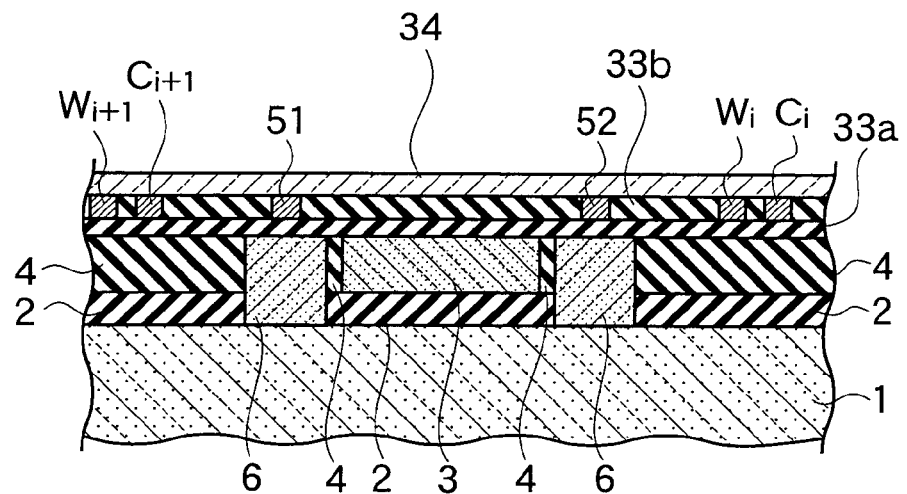
FIGS. 9A and 9B show further succeeding process flow sectional views after the process stage shown in FIGS. 7A–7D, explaining the manufacturing method of the infrared image sensor according to the first embodiment of the present invention.
Figure 9B:
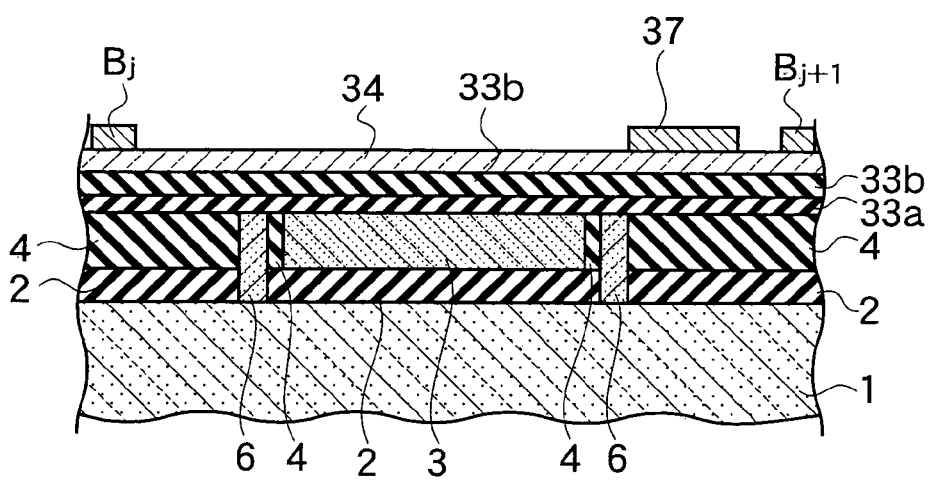

(d) Next, employing the CVD method, on the first inter-layer insulation film 33a, a silicon oxide film serving as the second inter-layer insulation film 33b of thickness 1.0 µm level is stacked. As the second inter-layer insulation film 33b, phosphosilicate glass (PSG) film, boron glass (BSG) film, or boro-phosphate-silicate glass (BPSG) film may be employed. And after being planarized by CMP method, as shown in FIGS. 9A and 9B, a silicon nitride film serving as the third inter-layer insulation film 34 of thickness 0.5 µm level is stacked. Furthermore, using the photolithography technique and the RIE method, via-holes are opened at predetermined locations in the third inter-layer insulation film (the silicon nitride film) 34. For example, on the control electrode wiring $C_{i+1}$, $C_i$, . . . shown in FIG. 2, via-holes are opened. In addition, on the edge of each the first detector wirings 51, via-holes are opened. Thereafter, as shown in FIG. 9B, a control electrode 37 and vertical signal lines $B_{j-1}$, $B_j$, $B_{j+1}$, . . . are formed as the second level metallic interconnection on the third inter-layer insulation film 34. As shown in FIG. 2, from the control electrode 37, auxiliary control electrode wirings 53 extend to the via-holes formed on the control electrode wirings $C_{i+1}$, $C_i$, . . . . Therefore, through the via-holes the control electrode wiring $C_{i+1}$, $C_i$, . . . are connected to the corresponding control electrodes 37. Although the illustration is omitted, in adjacent pixels, the control electrodes 37 and the vertical signal lines $B_{j-1}$, $B_{i-2}$, . . . are formed similarly, of course. Therefore, through respective via-holes, the first detector wiring 51 of each pixel is connected to the vertical signal lines $B_{j-1}$, $B_j$, $B_{j+1}$, . . . on the edge of the first detector wiring 51. With the control electrode 37 and the vertical signal lines $B_{j-1}$, $B_j$, $B_{j+1}$, . . . the second level metallic interconnection for the peripheral circuitry is simultaneously formed, too, but these illustrations are also omitted. The first inter-layer insulation film 33a, the second inter-layer insulation film 33b and the third inter-layer insulation film 34, as shown in FIGS. 3A and 3B, serve as the infrared absorption layer 42, as well as serving as the inter-layer insulation film and the passivation film.

Figure 10A:
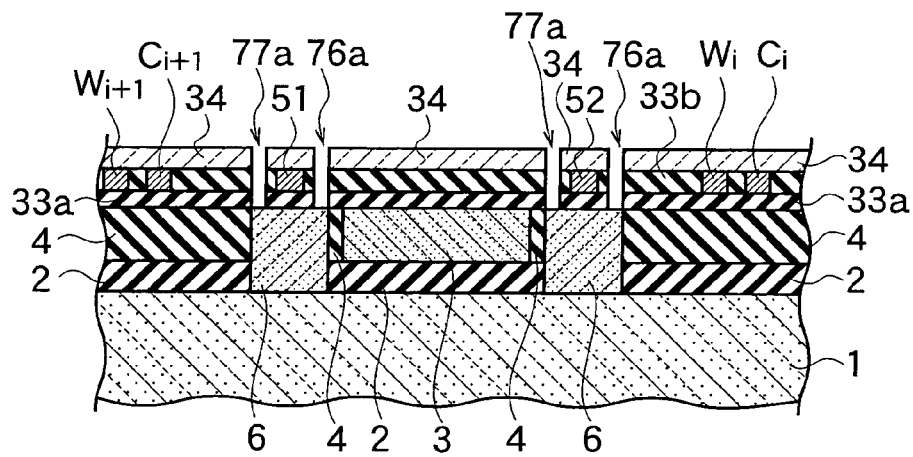
FIGS. 10A and 10B show still further succeeding process flow sectional views after the process stage shown in FIGS. 9A and 9B, explaining the manufacturing method of the infrared image sensor according to the first embodiment of the present invention.
Figure 10B:
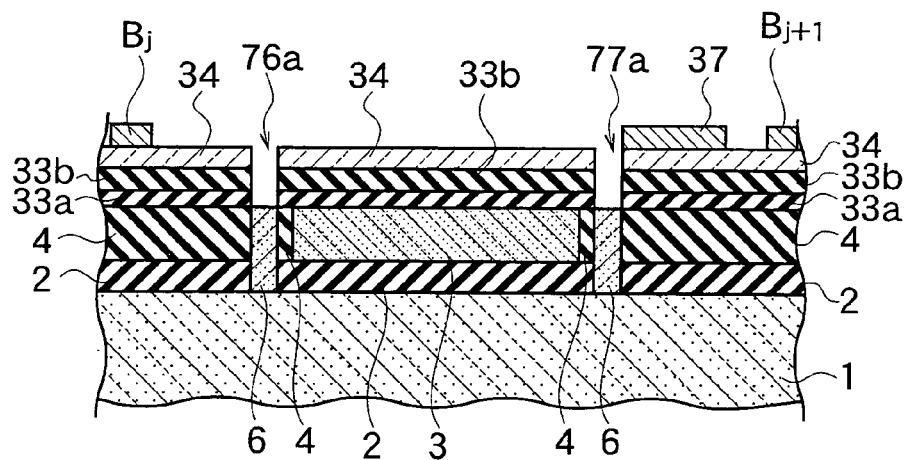
Figure 11A:
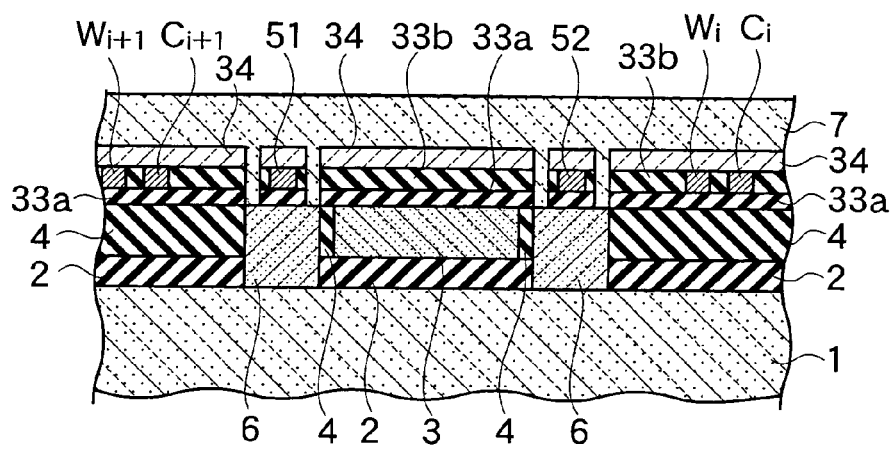
FIGS. 11A and 11B show still further succeeding process flow sectional views after the process stage shown in FIGS. 10A and 10B, explaining the manufacturing method of the infrared image sensor according to the first embodiment of the present invention.
Figure 11B:
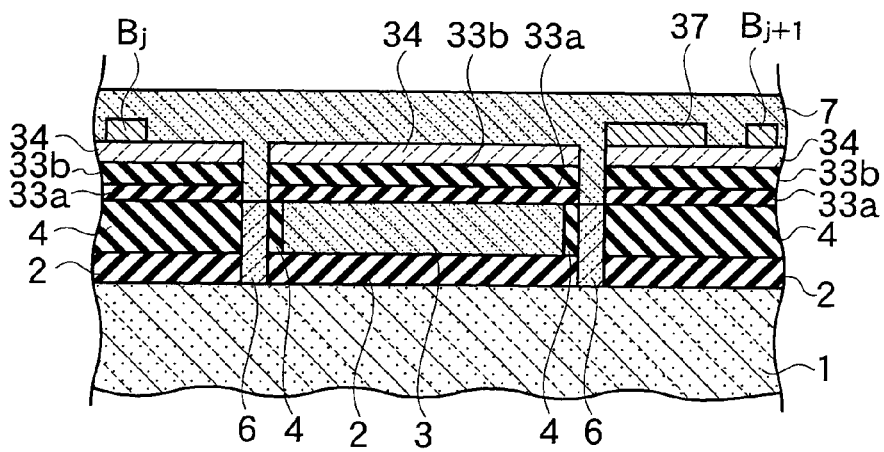

(e) Next, at locations in the neighborhood of the scheduled areas of the first supporting beam 21 and the second supporting beam 22, grooves are dug by an RIE method or an ECR ion etching method as shown in FIGS. 10A and 10B. Furthermore, the second sacrificial silicon film 7 having a thickness of 1.5–3.0 µm is deposited so as to bury the grooves. Furthermore, by CMP method, the top surface of the second sacrificial silicon film 7 is planarized as shown in FIGS. 11A and 11B.

Figure 12A:
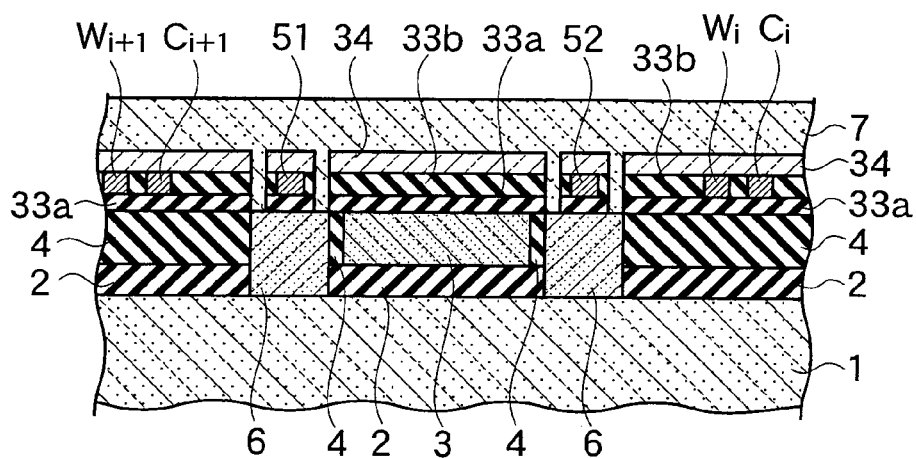
FIGS. 12A and 12B show still further succeeding process flow sectional views after the process stage shown in FIGS. 11A and 11B, explaining the manufacturing method of the infrared image sensor according to the first embodiment of the present invention.
Figure 12B:
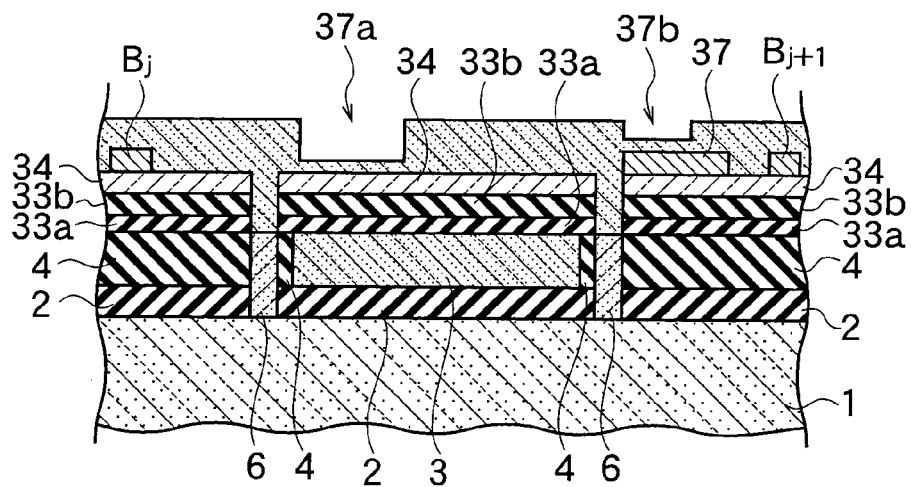
Figure 13A:
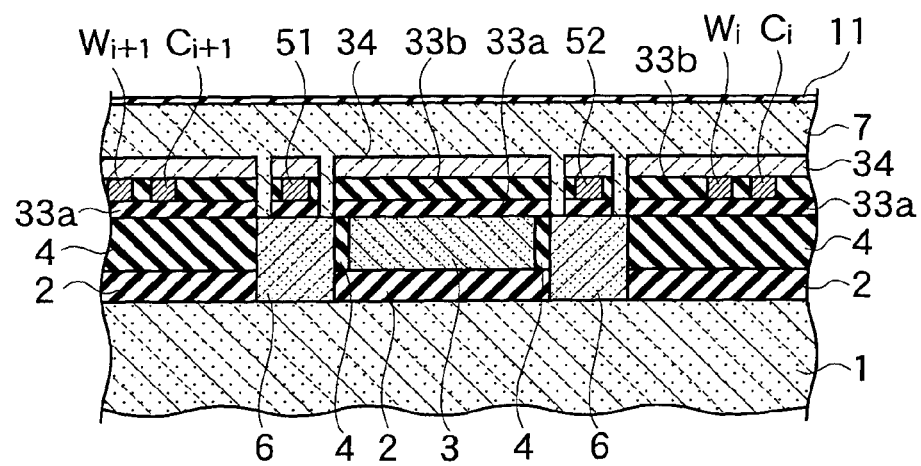
FIGS. 13A and 13B show still further succeeding process flow sectional views after the process stage shown in FIGS. 12A and 12B, explaining the manufacturing method of the infrared image sensor according to the first embodiment of the present invention.
Figure 13B:
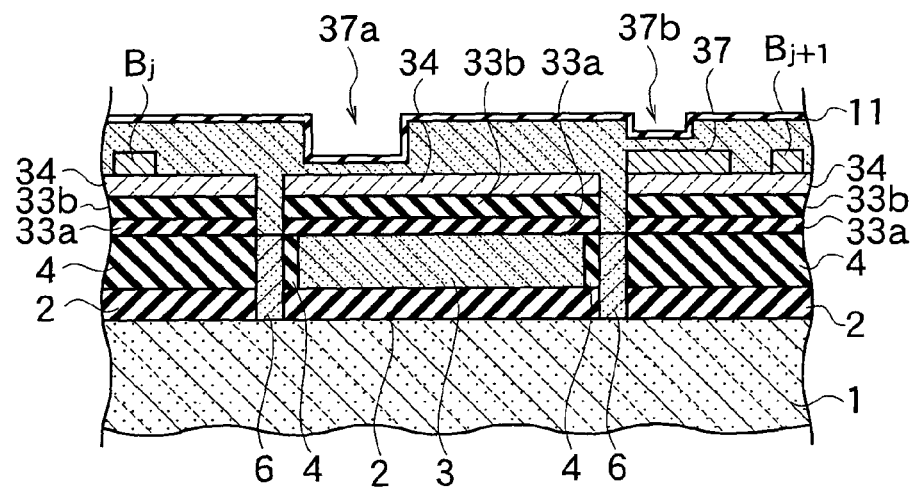
Figure 14A:
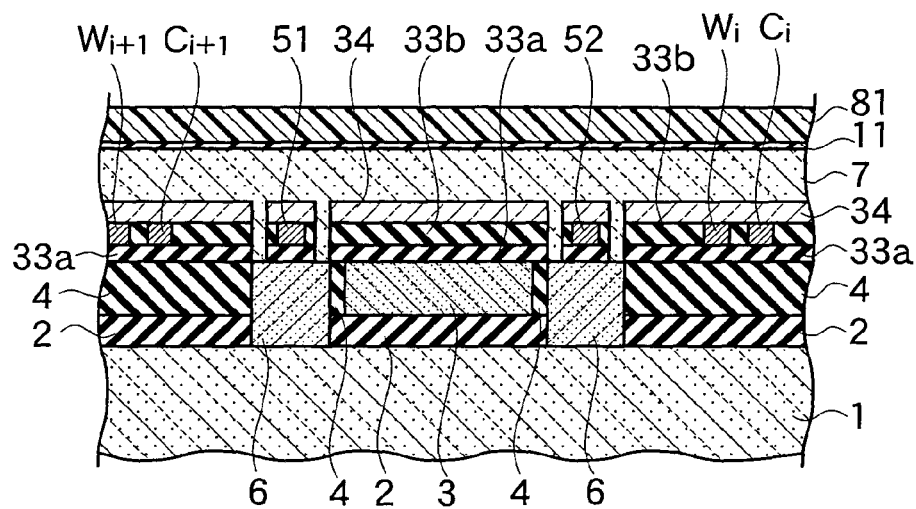
FIGS. 14A and 14B show still further succeeding process flow sectional views after the process stage shown in FIGS. 13A and 13B, explaining the manufacturing method of the infrared image sensor according to the first embodiment of the present invention.
Figure 14B:
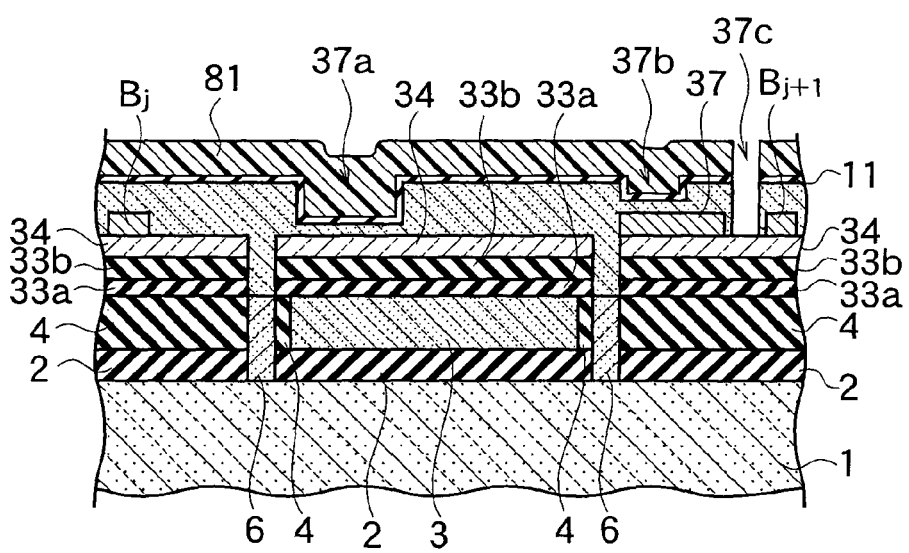
Figure 15A:
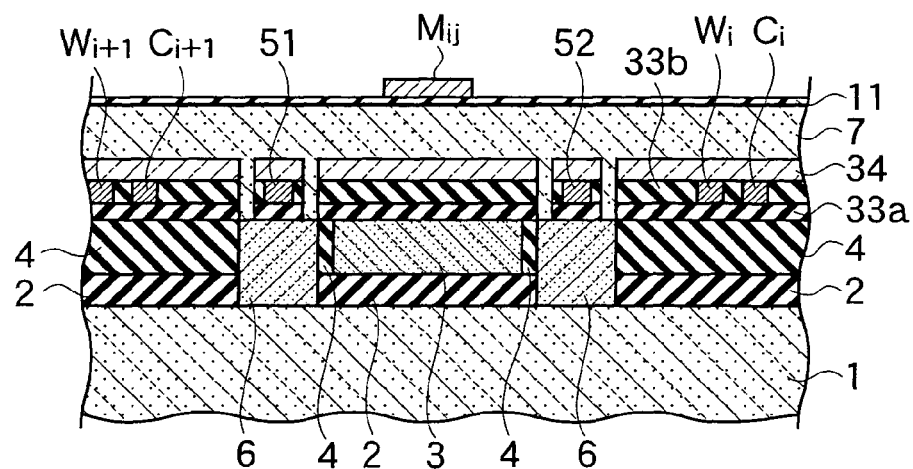
FIGS. 15A and 15B show still further succeeding process flow sectional views after the process stage shown in FIGS. 14A and 14B, explaining the manufacturing method of the infrared image sensor according to the first embodiment of the present invention.
Figure 15B:
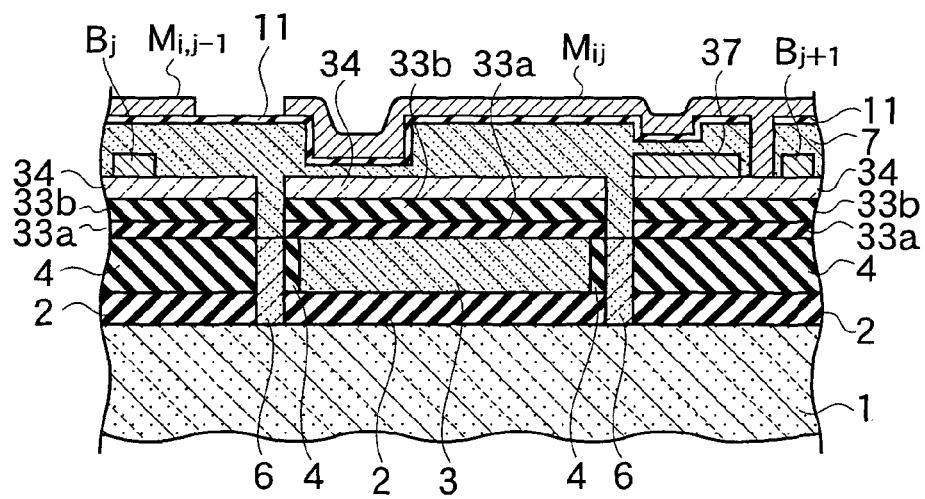

(f) Thereafter, by repeating selective etchings for digging grooves 37a and 37b of different depths, using photolithography technique and RIE method, grooves having different depths are formed at the surface of the second sacrificial silicon film 7 as shown in FIG. 12B. Next, as shown in FIGS. 13A and 13B, using the CVD method, on the surface of the second sacrificial silicon film 7, a silicon oxide film 11 serving as the lower contactor sheath film is deposited with an approximate thickness of 0.05 µm to 0.15 µm. Next, a photo resist 81 is spin-coated on the surface of the silicon oxide film 11. The photo resist 81 is delineated by the photolithography technique, and the silicon oxide film 11 and the second sacrificial silicon film 7 are etched by RIE method, using the etching mask of the delineated photo resist 81 so as to form a groove 37c, until the silicon nitride film 34 is exposed at the bottom of the groove 37c as shown in FIGS. 14A and 14B. Next, as the third level metallic interconnection, a metallic film such as aluminum alloy film (Al—Si, Al—Cu—Si) is deposited to approximate thickness of 0.5 μm to 1 μm by sputtering technique or an electron beam vacuum evaporation technique. Next, a new photo resist is spin-coated on the surface of the metallic film. And, the new photo resist is delineated by the photolithography technique. And the metallic film is etched by RIE method, using the etching mask of the delineated photo resist so as to form the pattern of the contactors $M_{i,j-1}$, $M_{i,j}$, $M_{i,j+1}$, . . . as shown in FIGS. 15A and 15B.

Figure 16A:
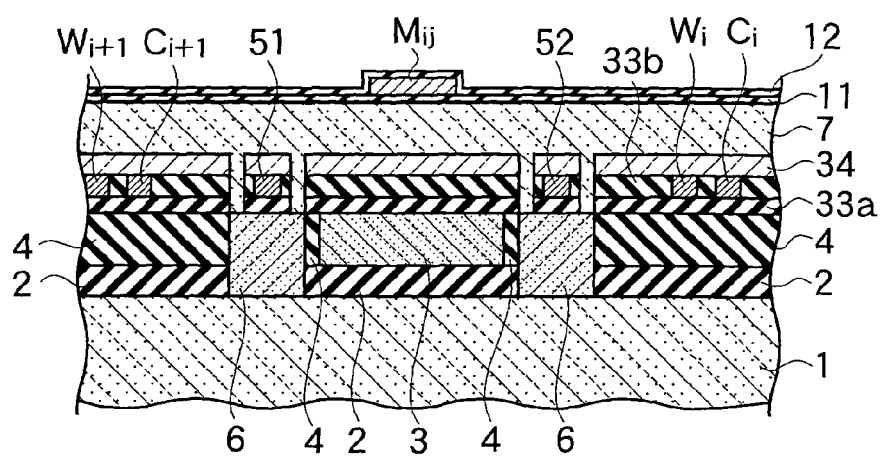
FIGS. 16A and 16B show still further succeeding process flow sectional views after the process stage shown in FIGS. 15A and 15B, explaining the manufacturing method of the infrared image sensor according to the first embodiment of the present invention.
Figure 16B:
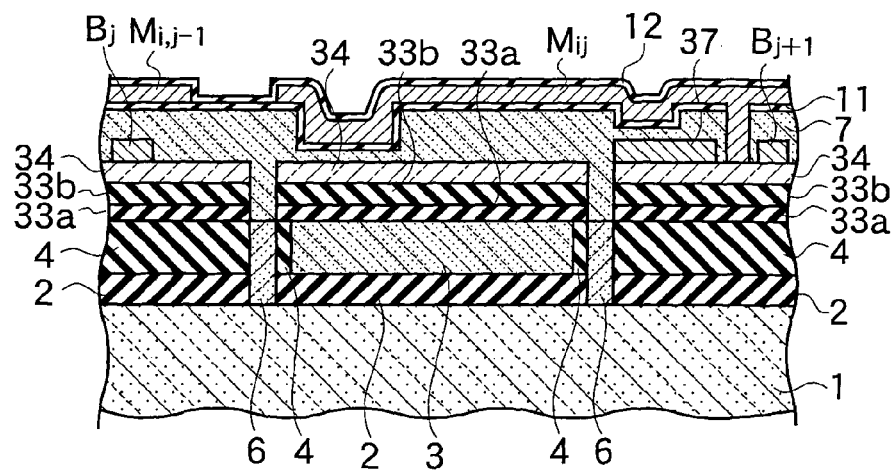
Figure 17A:
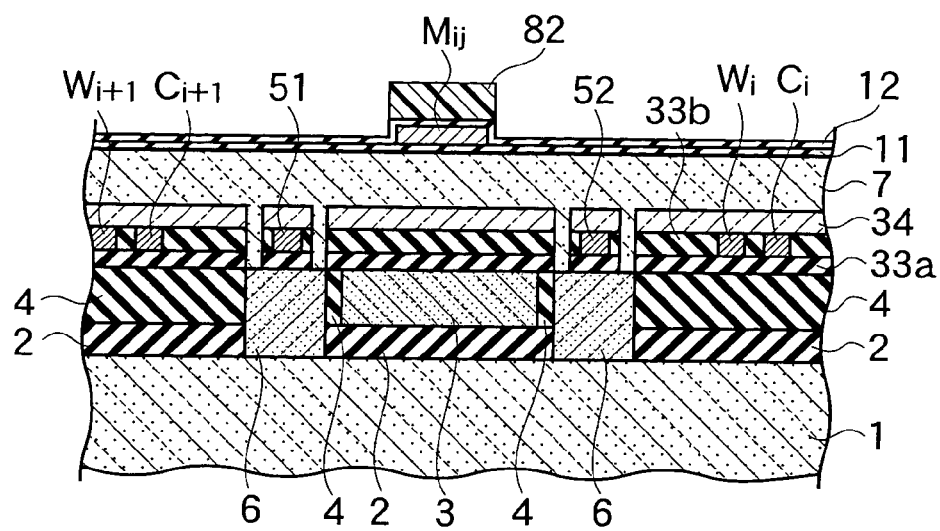
FIGS. 17A and 17B show still further succeeding process flow sectional views after the process stage shown in FIGS. 16A and 16B, explaining the manufacturing method of the infrared image sensor according to the first embodiment of the present invention.
Figure 17B:
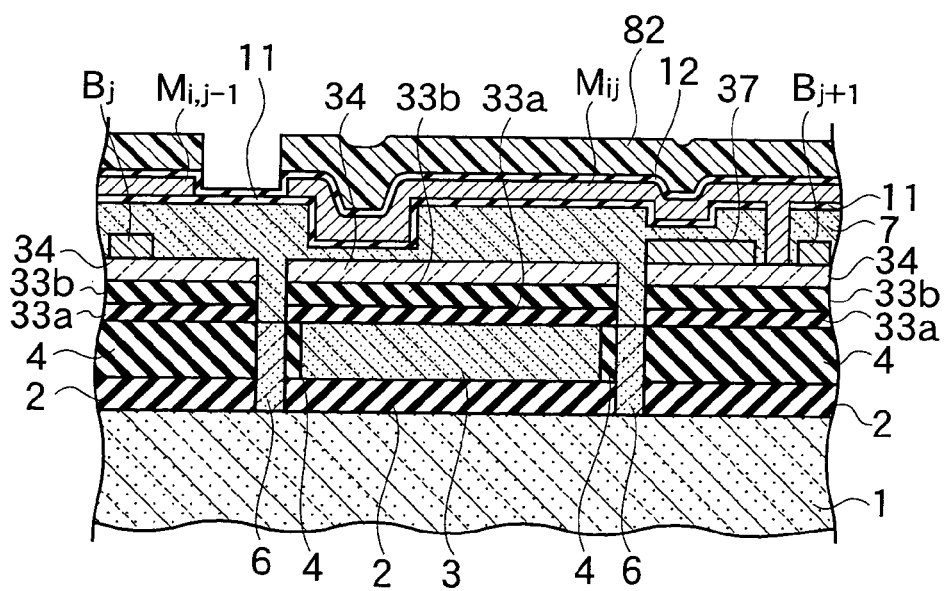
Figure 18A:
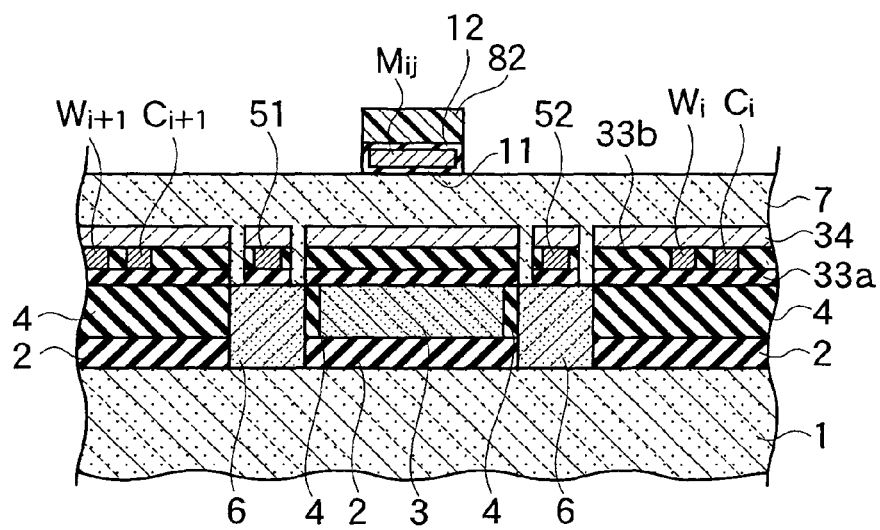
FIGS. 18A and 18B show still further succeeding process flow sectional views after the process stage shown in FIGS. l7A and 17B, explaining the manufacturing method of the infrared image sensor according to the first embodiment of the present invention.
Figure 18B:
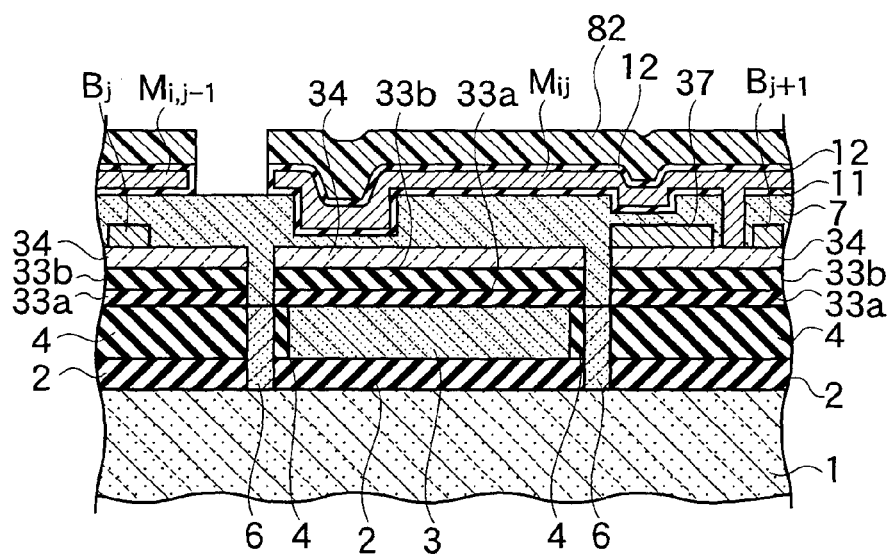
Figure 19A:
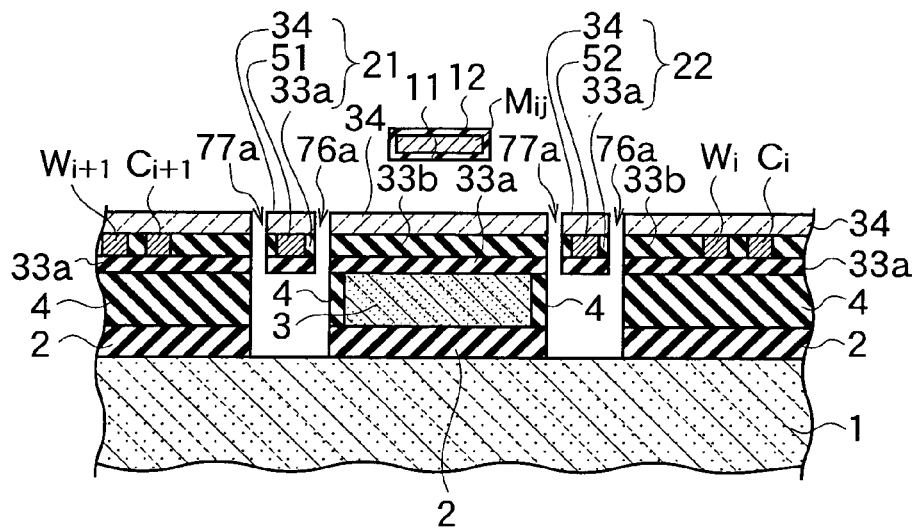
FIGS. 19A and 19B show still further succeeding process flow sectional views after the process stage shown in FIGS. 18A and 18B, explaining the manufacturing method of the infrared image sensor according to the first embodiment of the present invention.
Figure 19B:
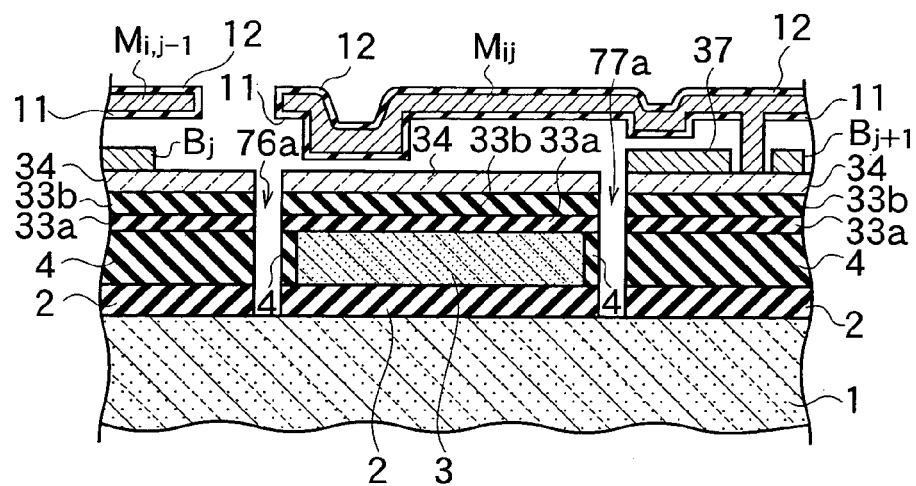

(g) Next, as shown in FIGS. 16A and 16B, using the CVD method, on the surface of the pattern of the contactors $M_{i,j-1}$, $M_{i,j}$, $M_{i,j+1}$, . . . a silicon oxide film 12 serving as the upper contactor sheath film is deposited with an approximate thickness of 0.05 μm to 0.15 μm. Next, a photo resist 82 is spin-coated on the surface of the silicon oxide film 12. The photo resist 82 is delineated by the photolithography technique as shown in FIGS. 17A and 17B, and the silicon oxide film 12 and the silicon oxide film 11 are etched by RIE method, using the etching mask of the delineated photo resist 82 so as to expose a part of the surface of the second sacrificial silicon film 7 as shown in FIGS. 18A and 18B. Thereafter, as shown in FIGS. 19A and 19B, the first sacrificial silicon film 6 and the second sacrificial silicon film 7 are removed by silicon etching solution so as to make the geometry of the contactors $M_{i,j-1}$, $M_{i,j}$, $M_{i,j+1}$, . . . manifest a cantilever configuration. The cantilever configuration has a support portion (a fulcrum) disposed between the patterns of the vertical signal lines $B_{j-1}$, $B_j$, $B_{j+1}$, . . . and the control electrode 37. Further, as shown in FIG. 19A, the first supporting beam 21 and the second supporting beam 22 configured to support the detector portion $X_{i,j}$ are simultaneously formed.

(h) Furthermore, adding an anisotropic etching to the part of the surface of the supporting substrate 1 exposed by the etching of the first sacrificial silicon film 6 and the second sacrificial silicon film 7, the cavity $Q_{i,j}$ is formed as shown in FIGS. 3A and 3B, and the infrared image sensor according to the first embodiment of the present invention is completed. The anisotropic etchant for anisotropically removing the single crystalline silicon so as to form the cavity $Q_{i,j}$, the etching solution such as tetra methyl ammonium hydroxide (TMAH) can be employed, for example, In the above description, the process for removing the first sacrificial silicon film 6 and the second sacrificial silicon film 7 and the subsequent process for the anisotropic etching of the supporting substrate 1 were explained as independent processes. But, because the etching solutions for these etchings are the basically same, in a practical fabrication process, after obtaining the geometry shown in FIGS. 18A and 18B, by the etching employing TMAH, for example, the finally completed configuration shown in FIGS. 3A and 3B can be obtained nearly simultaneously as the geometry shown in FIGS. 19A and 19B is formed.

1.4 First Modification of First Embodiment

Figure 20A:
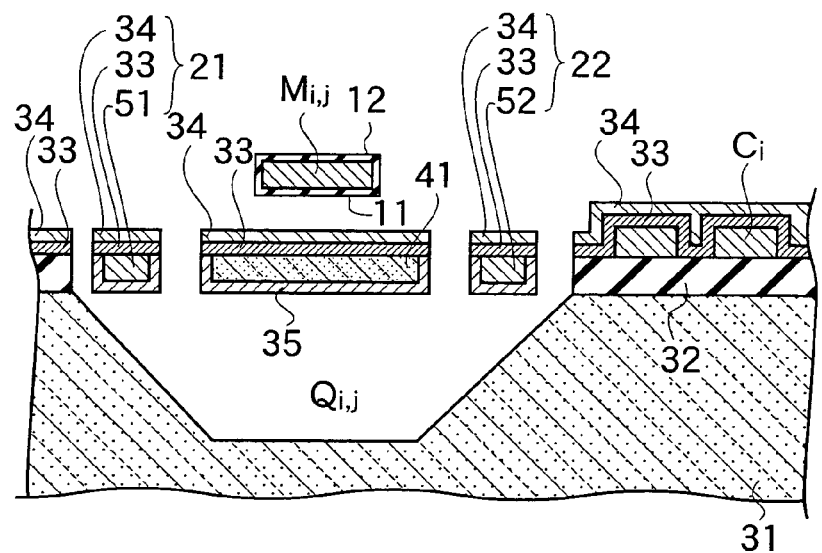
FIG. 20A shows a pixel of the infrared image sensor according to a modification (a first modification) of the first embodiment of the present invention corresponding to the cross-sectional view taken on line IIIA—IIIA in FIG. 2.
Figure 20B:
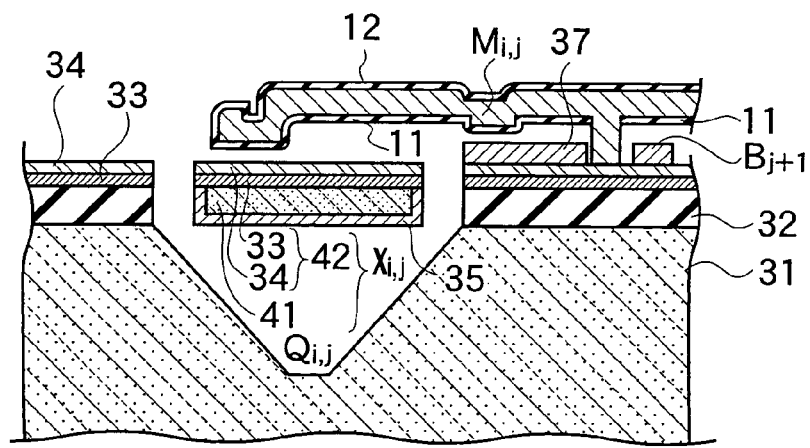
FIG. 20B shows the pixel of the infrared image sensor according to the first modification of the first embodiment of the present invention corresponding to the cross-sectional view taken on line IIIB—IIIB in FIG. 2.

In the above explanation, an infrared image sensor based upon the SOI architecture was explained, but, the infrared image sensor can be provided without employing the SOI architecture as shown in FIGS. 20A and 20B. FIG. 20A corresponds to a cross-sectional view taken on line IIIA—IIIA in FIG. 2, and FIG. 20B corresponds to a cross-sectional view taken on line IIIB—IIIB in FIG. 2. That is, it will be understood that the infrared image sensor according to the first modification of the present invention encompasses a base body (31, 32) arranging a cavity $Q_{i,j}$ at a top surface, and a detector portion $X_{i,j}$ supported in a quasi-thermal isolation state above the cavity $Q_{i,j}$ disposed at the surface of the base body (31,32). Contrary to the base body (1, 2, 4) shown in FIGS. 3A and 3B, the base body (31,32) is established by silicon substrate 31 and the pad oxide film 32 disposed on the silicon substrate 31. The pad oxide film 32 is made of a silicon oxide film ($SiO_2$ film) and has a thickness of 0.8 μm to 1.5 μm, for example.

As shown in FIGS. 20A and 20B, the detector portion $X_{i,j}$ embraces an infrared absorption layer 42 configured to absorb an incident infrared ray and to convert the infrared ray into heat, and a thermoelectric conversion portion 41 configured to convert a temperature change by the heat generated in the infrared absorption layer 42. The thermoelectric conversion portion 41 can be implemented by a bolometer polysilicon or a p-n junction diode, for example. On the bottom surface and the side surface of the bolometer polysilicon 41, the sheath layer 35 made of a silicon oxide film ($SiO_2$ film) is laminated so as to encapsulate the bolometer polysilicon 41. On a thermoelectric conversion portion 41 made of single crystalline silicon layer, silicon oxide film 33 serving as an inter-layer insulation film 33 is disposed. A silicon nitride film 34 is stacked on the silicon oxide film 33. The composite film made of silicon oxide film 33 and the silicon nitride film 34 implements the infrared absorption layer 42. The infrared absorption layer 42 is delineated in substantially the same geometry as the thermoelectric conversion portion 41.

As shown in FIG. 2 and FIG. 3A, the first supporting beam 21 and the second supporting beam 22 mechanically support the detector portion $X_{i,j}$ against the supporting substrate 1 and the buried oxide film 2 and element isolation oxide film 4 disposed on the supporting substrate 1. And a first detector wiring 51 configured to connect the thermoelectric conversion portion 41 to the vertical signal line $B_j$ is embedded in the inside of the first supporting beam 21. Namely, on the bottom surface and the side surface of the first detector wiring 51, the sheath layer 35 is laminated. On the first detector wiring 51, the silicon oxide film 33 and the silicon nitride film 34 are stacked. Similarly, a second detector wiring 52 configured to connect the thermoelectric conversion portion 41 to the horizontal address line $W_i$ is embedded in the inside of the second supporting beam 22, covered by the sheath layer 35 disposed at the bottom surface and the side surface, and the silicon oxide film 33 and the silicon nitride film 34 disposed on the top surface.

Other structures and materials are similar to the structure and materials already explained in the infrared image sensor according to the first embodiment, and overlapped or redundant description may be omitted in the second embodiment, but by means of FIGS. 21A to 21F-1/21F-2, a manufacturing method of the infrared image sensor according to the first modification of the first embodiment is explained.

Figure 21A:
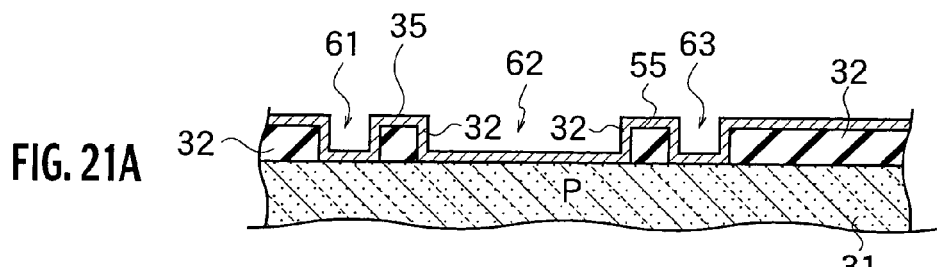
FIGS. 21A to 21C are process flow sectional views explaining the manufacturing method of the infrared image sensor according to the first modification of the first embodiment of the present invention.

(a) At first, peripheral circuitry embracing a vertical scanner 101, a horizontal scanner 102, a contactor driver 103 and a constant current supply is formed on a principal face of silicon substrate 31. Next, a pad oxide film 32 serving as an inter-layer insulation film is deposited to an approximate thickness of 1 μm for the MOS integrated circuit of the peripheral circuitry. For example, the pad oxide film 32 may be a two-level composite film implemented by a silicon oxide film having a thickness of 0.5 μm level and a PSG film having a thickness of 0.5 μm level laminated on the silicon oxide film. Or, the pad oxide film 32 may be a two-level composite film encompassing the silicon oxide film having a thickness of 0.5 μm level and a BPSG film having a thickness of 0.5 μm level stacked on the silicon oxide film. The top surface of the BPSG film of the two-level composite film is planarized to obtain the flat pad oxide film 32 by a reflow process. Next, in the pad oxide film 32, using a photolithography technique and RIE method, grooves are dug selectively so as to expose parts of the surface of the silicon substrate 31. These grooves 61, 62, 63 include a first detector wiring formation groove 61, a thermoelectric conversion portion formation groove 62 and a second detector wiring formation groove 63 configured to facilitate the establishment of the first detector wiring 51, the thermoelectric conversion portion 41, and the second detector wiring 52, respectively. And, on the surface of the pad oxide film 32 having grooves 61, 62, 63, the sheath layer ($SiO_2$ film) 35 is deposited by CVD method as shown in FIG. 21A.

Figure 21B:
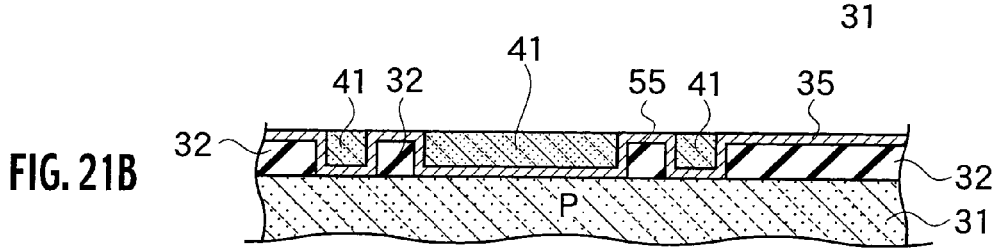

(b) And, a bolometer polysilicon 41 having a thickness of 1.0–1.5 μm is deposited to bury the grooves 61, 62, 63 covered by the sheath layer 35. Furthermore, by planarizing the top of the surface of bolometer polysilicon 41 using CMP method, until the top surface of the sheath layer 35 is exposed as shown in FIG. 21B, the bolometer polysilicon 41 is buried in each of grooves 61, 62, 63. Although the illustration is omitted, a $p^+$ type doped polysilicon may be prepared thereafter so as to implant $n^+$type impurity ions in the surface of the $p^+$ type doped polysilicon selectively, forming the cathode region so that the p-n junction diode can be established. It is understood the indicator "+" in the disclosure indicates relatively heavy doping.

Figure 21C:
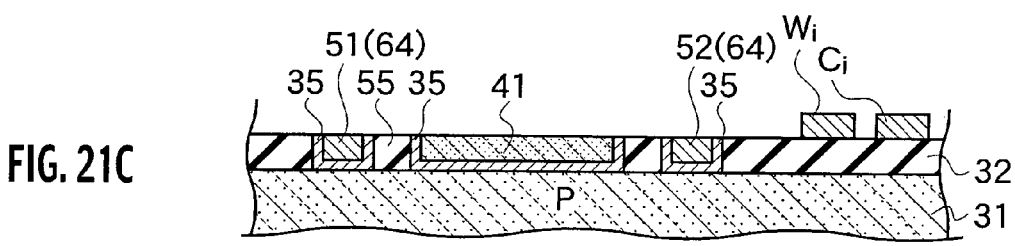

(c) Next, using an etching-mask made of photo resist, the bolometer polysilicon 41 buried in the first detector wiring formation groove 61 and in the second detector wiring formation groove 63 is selectively removed. Furthermore, the photo resist once used as the etching-mask is used as the lift-off-mask again, a metallic film made of Ti is deposited by sputtering technique or electron beam vacuum evaporation technique. Thereafter, by removing the photo resist used as the lift-off-mask, the metallic film made of Ti is buried in the first detector wiring formation groove 61 and in the second detector wiring formation groove 63, respectively. Furthermore, using CMP method, the top surface of the metallic film is planarized, as shown in FIG. 21C, until the top surface of the pad oxide film 32 is exposed so that the level of the top surface of the metallic film made of Ti can coincide with the level of the top surface of the bolometer polysilicon 41 as well as the top surface of the pad oxide film 32. As a result, the first detector wiring 51 and the second detector wiring 52 made of Ti are buried in the first detector wiring formation groove 61 and in the second detector wiring formation groove 63 through the pad oxide film 32 and the sheath layer 35. Furthermore, using photo resist delineated by photolithography technique as an etching-mask, the pad oxide film 32 is selectively etched by RIE method or ECR ion etching method so as to open contact holes for the transistors, which implement the peripheral circuitry of the infrared image sensor shown in FIG. 2. The photo resist being used for the contact hole formation is removed. Then, a W film is deposited to an approximate thickness of 0.5 μm by sputtering technique or electron beam vacuum evaporation technique. On the W film, using photolithography technique, an etching-mask of photo resist is delineated, and by using the etching-mask, the W film is delineated by RIE method so that contact plugs for each transistor implementing the peripheral circuitry can be buried in the contact holes. At the same time, the pattern of the horizontal address line $W_i$ and the control electrode wiring $C_i$ are delineated as shown in FIG. 21C. Although the illustration is omitted, in adjacent pixels, the horizontal address line $W_{i-1}$, $W_{i+1}$, $W_{i+2}$, . . . and the control electrode wiring $C_{i-1}$, $C_{i+1}$, $C_{i+2}$, . . . are formed similarly. Metallic interconnections for peripheral circuitry are formed simultaneously with the formation of the horizontal address line $W_{i-1}$, $W_i$, $W_{i+1}$, $W_{i+2}$, . . . and the control electrode wiring $C_{i-1}$, $C_i$, $C_{i+1}$, $C_{i+2}$, . . . but these illustrations are omitted. The first detector wiring 51 and the second detector wiring 52 both buried in the supporting beam grooves 61, 63 are connected to the bolometer polysilicon 41 through the W film. In addition, the second detector wiring 52 and the horizontal address line $W_i$ of each pixel are connected each other.

Figures 1, 21D:
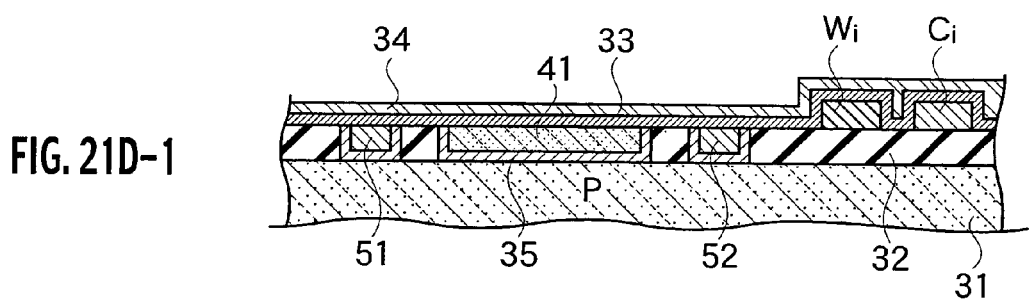
FIGS. 21D-1 shows a succeeding process flow sectional view after the process stage shown in FIG. 21C corresponding to the cross-sectional view taken on line A—A in FIG. 2, explaining the manufacturing method of the infrared image sensor according to the first modification of the first embodiment of the present invention.
Figures 2, 21D:
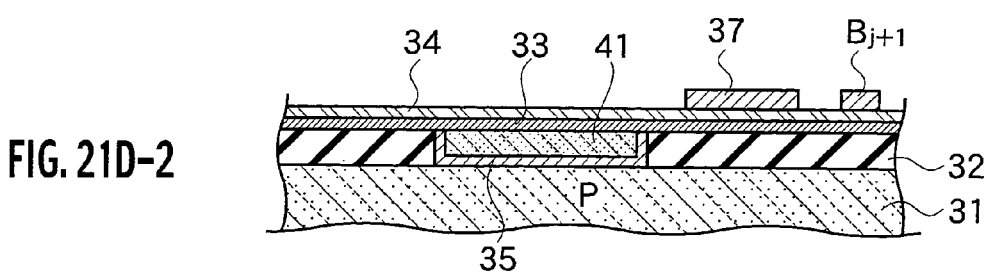

(d) Thereafter, as shown in FIGS. 21D-1, on the entire surface, a silicon oxide film 33 having a thickness of 0.5 μm to 1.5 μm level and a silicon nitride film 34 having a thickness of 0.5 μm are deposited by CVD method. FIG. 21D-1 corresponds to a cross-sectional view taken on line IIIA—IIIA in FIG. 2. A composite film made of the silicon oxide film 33 and the silicon nitride film 34 serves as an infrared absorption layer 42 in the detector portions $X_{i,j-1}$, $X_{i,j}$, $X_{i,j+1}$, . . . , but in peripheral circuitry, it serves as the inter-layer insulation film. And, using the photo resist delineated by photolithography technique as etching-mask, the inter-layer insulation film is selectively etched by RIE method or ECR ion etching method so that via-holes for facilitating the establishment of the joint metals (or the plugs) configured to connect the first level metallic interconnection of the peripheral circuitry of the infrared image sensor, the first detector wiring 51 and the pattern of vertical signal lines $B_{j-1}$, $B_j$, $B_{j+1}$, . . . can be formed. Next, as the second level metallic interconnection, by sputtering technique or by electron beam vacuum evaporation technique, an aluminum alloy (Al—Si, Al—Cu—Si) film containing silicon is deposited to an approximate thickness of 0.5 μm. On the second level metallic interconnection, using photolithography technique, the etching-mask of photo resist is formed. And by RIE method using the etching-mask, the aluminum alloy film is delineated so that vertical signal lines $B_{j-1}$, $B_j$, $B_{j+1}$, . . . and a pattern of control electrode 37 are formed as the second level metallic interconnection, as shown in FIG. 21D-2, simultaneously with the formation of the via-plugs for each transistor implementing the peripheral circuitry. FIG. 21D-2 corresponds to a cross-sectional view taken on line IIIB—IIIB in FIG. 2, and is perpendicular to the cross-sectional view of FIG. 21D-1. Although the illustration is omitted, in FIG. 21D-2, in the adjacent pixels, the control electrode 37 and the vertical signal lines $B_{j-1}$, $B_j$, $B_{j+1}$, . . . are formed similarly, of course. Therefore, through via-holes the edge of the first detector wiring 51 of each pixel is connected to the corresponding vertical signal lines $B_{j-1}$, $B_j$, $B_{j+1}$, . . . on the edge of the first detector wiring 51. Metallic interconnections for the peripheral circuitry are formed simultaneously with the control electrode 37 and the vertical signal lines $B_{j-1}$, $B_j$, $B_{j+1}$, . . . but these illustrations are omitted, too. The photo resist used for delineating the second level metallic interconnections and the vertical signal lines $B_{j-1}$, $B_j$, $B_{j+1}$, . . . is removed thereafter.

(e) New photo resist is coated on the silicon nitride film 34, the control electrode wiring $C_i$ and the second level metallic interconnection. Furthermore, the photo resist is delineated by photolithography technique. With the delineated photo resist, by using RIE method or ECR ion etching method, parts of the silicon nitride film 34 and the silicon oxide film 33 are selectively removed so as to form grooves. Furthermore, sacrificial polysilicon film 36 having a thickness of 1.5–3.0 μm is deposited so as to bury the grooves.

Figures 1, 21E:
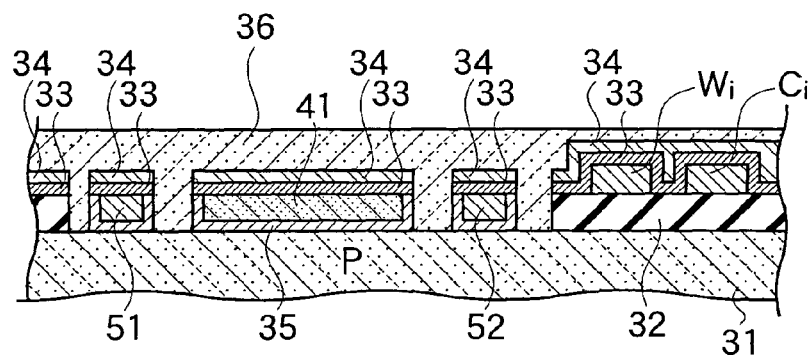
Figures 2, 21E:
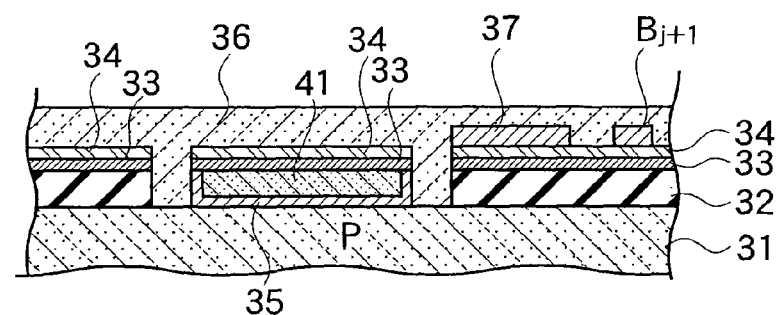

Furthermore, by means of CMP method, the top surface of the sacrificial polysilicon film 36 is planarized as shown in FIGS. 21E-1 and 21E-2. Here, FIGS. 21E-1 corresponds to a cross-sectional view taken on line IIIA—IIIA in FIG. 2, and FIGS. 21E-2 corresponds to a cross-sectional view taken on line IIIB—IIIB in FIG. 2.

Figures 1, 21F:
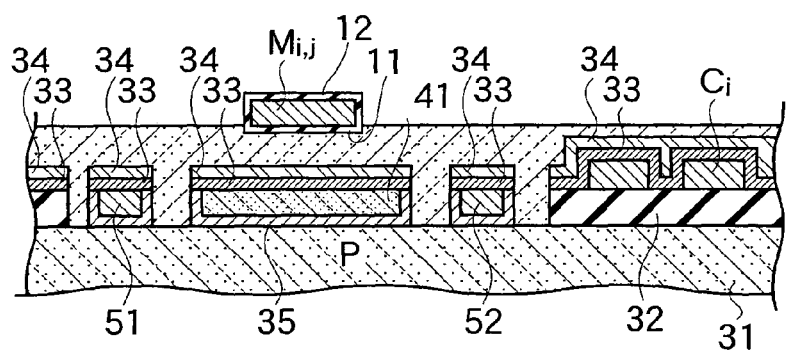
Figures 2, 21F:
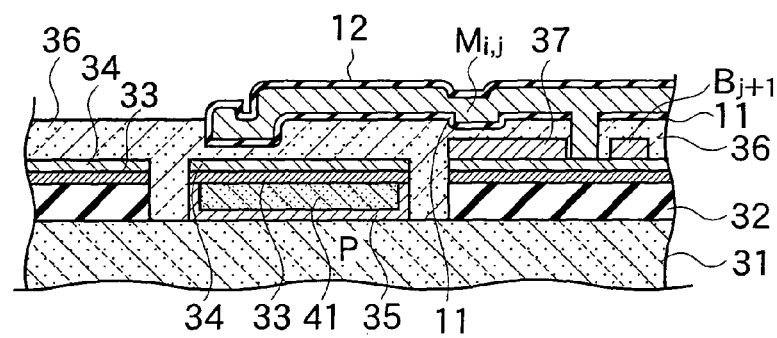

(f) Thereafter, using photolithography technique and RIE method, by repeating the selective etching, grooves having different depths are dug in the surface of sacrificial polysilicon film 36. And, using CVD method, on the surface of the sacrificial polysilicon film 36, a silicon oxide film 11 serving as the lower contactor sheath film is deposited. Next, by the photolithography technique and RIE method, the silicon oxide film 11 and the sacrificial polysilicon film 36 disposed at the location between the control electrode 37 of the each pixel and the vertical signal lines $B_{j-1}$, $B_j$, $B_{j+1}$, ... are selectively removed until the top surface of the silicon nitride film 34 is exposed so as to dig contact hole. Then, as the third level metallic interconnection, a metallic film such as aluminum alloy film (Al—Si, Al—Cu—Si) is deposited to an approximate thickness of 0.5 µm to 1 µm by sputtering technique or electron beam vacuum evaporation technique. Next, by the photolithography technique and RIE method, the pattern of the contactors $M_{i,j-1}$, $M_{i,j}$, $M_{i,j+1}$, ... is delineated. On the surface of the pattern of the contactors $M_{i,j-1}$, $M_{i,j}$, $M_{i,j+1}$, ... a silicon oxide film 12 serving as the upper contactor sheath film is deposited. And, by the photolithography technique and RIE method, a part of the surface of the sacrificial polysilicon film 36 is exposed as shown in FIGS. 21F-1 and 21F-2. Geometry of the contactors $M_{i,j}$ manifests a cantilever configuration having a support portion (a fulcrum) disposed between the pattern of the control electrode 37 and the vertical signal line $Bj_{+1}$. Similarly, the geometry of the adjacent contactors $M_{i,j-1}$, $M_{i,j}$, $M_{i,j+1}$, ... manifest respectively the cantilever configuration having corresponding support portions disposed between the patterns of control electrodes 37 of each pixel and the vertical signal lines $B_{j-1}$, $B_{j+1}$, $B_{j+2}$, $B_{j+3}$, ...

(g) Sequentially, the sacrificial polysilicon film 36 is removed by silicon etching solution, and thereafter, by removing a part of the surface of exposed silicon substrate 31 by the silicon etching solution, a cavity $Q_{i,j}$ is formed, and the infrared image sensor according to the first modification of the present invention is completed as shown in FIGS. 20A and 20B.

1.5 Second Modification of First Embodiment

Figure 22:
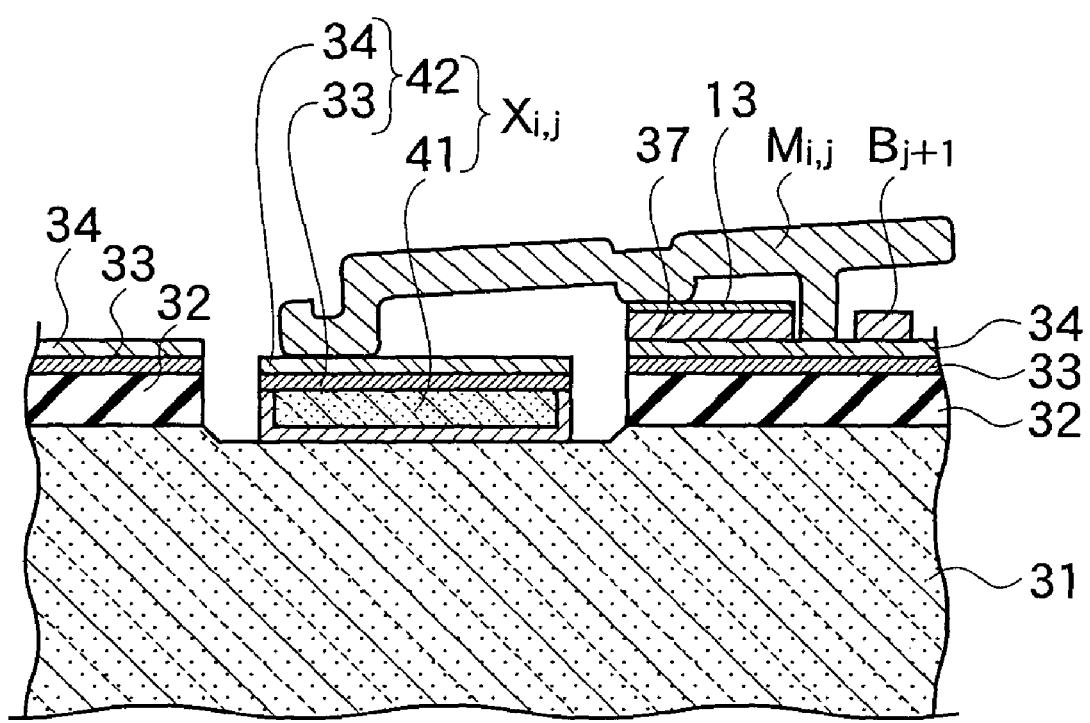
FIG. 22 is a cross-sectional view of a pixel of an infrared image sensor according to another modification (a second modification) of the first embodiment of the present invention.

An infrared image sensor according to another modification (a second modification) of the first embodiment is shown in FIG. 22, which corresponds to a cross-sectional view taken on line IIIB—IIIB in FIG. 2. Different from the configuration shown in FIGS. 3A and 3B, a cavity $Q_{i,j}$ is formed at the surface of and in a shallow location of the base body (31, 32), the base body embraces a silicon substrate 31 and a pad oxide film 32 disposed on the silicon substrate 31. Because of this configuration having the shallow cavity $Q_{i,j}$, in a contact state in which the contactors $M_{i,j-1}$, $M_{i,j}$, $M_{i,j+1}$, ..., implemented by cantilever configuration, being in contact with the detector portions $X_{i,j-1}$, $X_{i,j}$, $X_{i,j+1}$, ..., the detector portions $X_{i,j-1}$, $X_{i,j}$, $X_{i,j+1}$, ... moves downward by elastic deformation so that the bottom surface of the detector portions $X_{i,j-1}$, $X_{i,j}$, $X_{i,j+1}$, ... come into contact with the silicon substrate 31.

When a row-select pulse Vi is applied to one of the horizontal address line $W_i$ so as to elect corresponding detector portions $X_{i-1,j-1}$, $X_{i-1,j}$ ..., $X_{i,j-1}$, $X_{i,j}$, ... the contactors $M_{i,j-1}$, $M_{i,j}$, $M_{i,j+1}$, ... and the detector portions $X_{i,j-1}$, $X_{i,j}$, $X_{i,j+1}$, ... turn into the non-contact state. In this situation, the bottom surface of the detector portion $X_{i,j}$ leaves the silicon substrate 31 again, by elasticity, and the bottom surface of the detector portion $X_{i,j}$ and the silicon substrate 31 become the non-contact state.

That is to say, in the contact state as shown in FIG. 22, which can be achieved in the blanking period, thermal resistance is made so small that excellent heat flow can be achieved. Furthermore, because the stress deformation associated with the movements of the contactors $M_{i,j-1}$, $M_{i,j}$, $M_{i,j+1}$, ... and corresponding detector portions $X_{i,j-1}$, $X_{i,j}$, $X_{i,j+1}$, ... can be made small, a reasonable mechanical strength can be maintained, therefore the long operation life is achieved.

As shown in FIG. 22, the contactor $M_{i,j}$ of the second modification does not have the lower contactor sheath film 11 and the upper contactor sheath film 12 encapsulating the contactor $M_{i,j}$, which were shown in FIGS. 3A and 3B. However, on the control electrode 37, a cap insulator film 13 is stacked so as to protect against short-circuit failure when the contactor $M_{i,j}$ mechanically contacts the surface of control electrode 37. The cap insulator film 13 may be a silicon oxide film or silicon nitride film having a thickness of approximately 0.03 µm to 0.15 µm. The resistor $r_{bi,j}$ shown in FIG. 4 corresponds to the electrical resistance of the cap insulator film 13 when the contactor $M_{i,j}$ is in contact with the control electrode 37. Other structures and materials are similar to the structure and materials already explained with referring to FIGS. 3A and 3B, and overlapped or redundant description may be omitted in the second modification.

2. Second Embodiment

Figure 23:
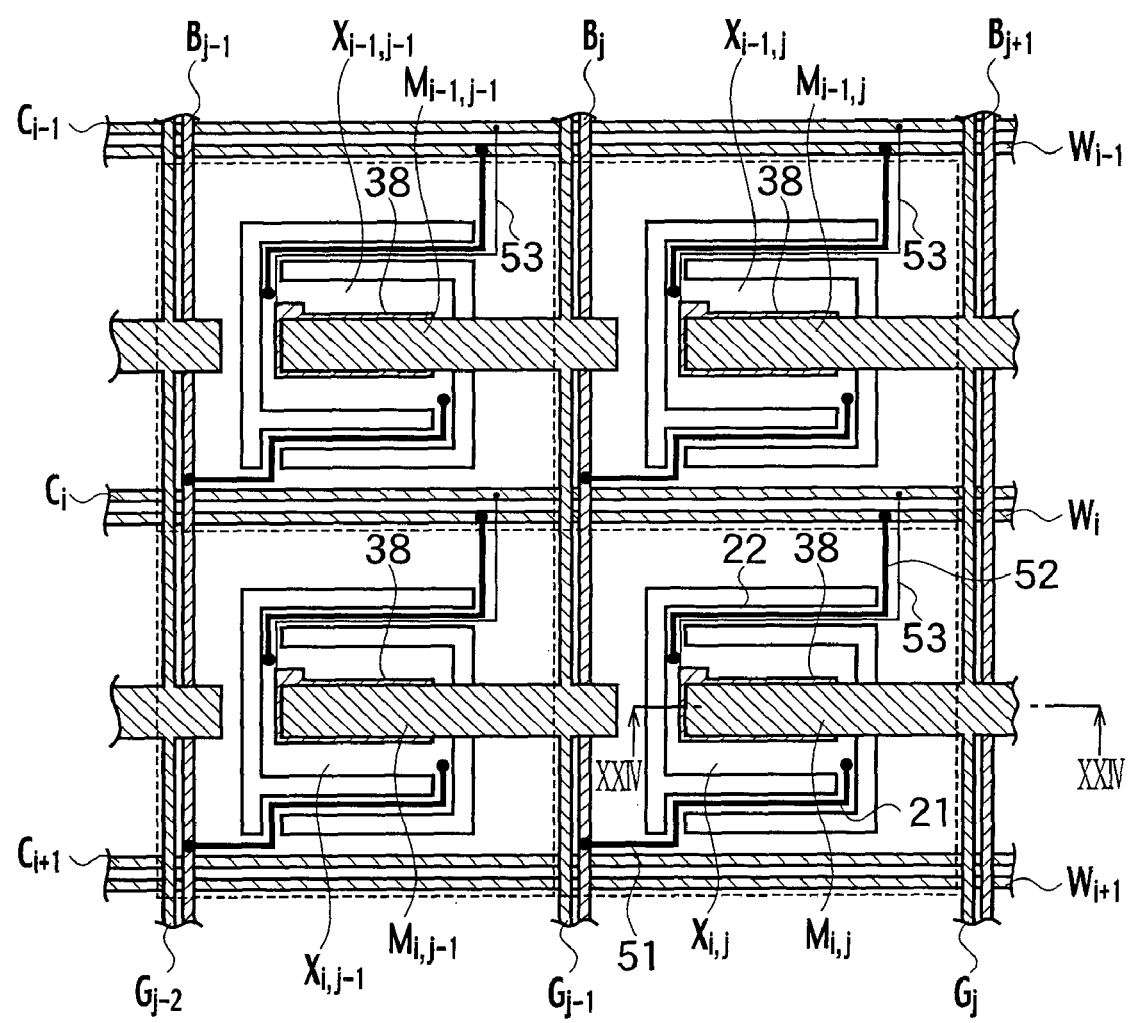
FIG. 23 is a plan view showing a part of the arrangement of pixels of an infrared image sensor according to a second embodiment of the present invention, the part of the arrangement corresponds to a 2×2 arrangement.
Figure 24:
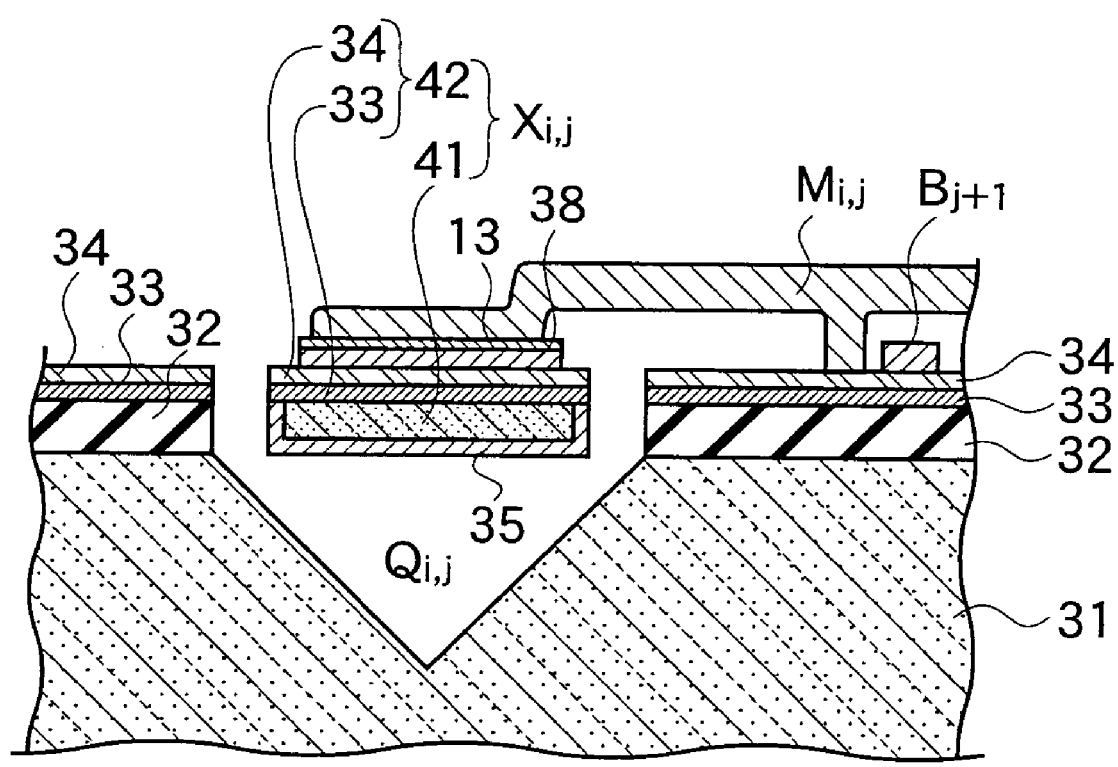
FIG. 24 is a cross-sectional view taken on line XXIV—XXIV in FIG. 23.

In the infrared image sensor according to the first embodiment, the control electrode 37 was disposed on the surface of the supporting substrate (the single crystalline silicon) 1, which surrounds the detector portions $X_{i-1,j-1}$, $X_{i-1,j}$, ..., $X_{i,j-1}$, $X_{i,j}$, .... However, in an infrared image sensor according to the second embodiment of the present invention, the configuration of the control electrode 38 is different from the infrared image sensor according to the first embodiment, because the control electrode 38 is disposed in the inside of the detector portions $X_{i-1,j-1}$, $X_{i-1,j}$, ..., $X_{i,j-1}$, $X_{i,j}$, ... as shown in FIGS. 23 and 24. Although, in the second embodiment, the case in which a base body (31, 32) is implemented by a silicon substrate 31 and a pad oxide film 32 disposed on the silicon substrate 31 is described, but the base body (31, 32) can be implemented by SOI architecture, of course.

That is to say, the mechanical switch of the infrared image sensor according to the second embodiment encompasses contactors $M_{i-1,j-1}$, $M_{i-1,j}$ ..., $M_{i,j-1}$, $M_{i,j}$, ..., delineated in the cantilever configuration, being connected electrically to contactor wirings $G_{j-2}$, $G_{j-1}$, $G_j$, ... which are disposed on the top surface of the base body (31, 32). Each of the contactors $M_{i-1,j-1}$, $M_{i-1,j}$ ..., $M_{i,j-1}$, $M_{i,j}$, ... has a pillar fixed to the base body (31, 32) and a free edge extending from the pillar on the respective detector portions $X_{i-1,j-1}$, $X_{i-1,j}$, ..., $X_{i,j-1}$, $X_{i,j}$, .... A control electrode 38 is disposed on the top surface of each of the detector portions $X_{i-1,j-1}$, $X_{i-1,j}$ ..., $X_{i,j-1}$, $X_{i,j}$, ..., and the control electrode 38 is connected electrically with one of the corresponding control electrode wirings $C_{i-1}$, $C_i$, $C_{i+1}$, ..., which are disposed at the top surface-of the base body (31, 32). By adjusting the voltage being supplied to the contactors $M_{i-1,j-1}$, $M_{i-1,j}$ ..., $M_{i,j-1}$, $M_{i,j}$, ... through the contactor wirings $G_{j-2}$, $G_{j-1}$, $G_j$, . . . and the voltage being supplied to the control electrode 38 through the control electrode wirings $C_{i-1}$, $C_i$, $C_{i+1}$, . . . each of the free edges of contactors $M_{i-1,j-1}$, $M_{i-1,j}$ . . . , $M_{i,j-1}$, $M_{i,j}$, . . . contacts to or approaches one of the corresponding detector portions $X_{i-1,j-1}$, $X_{i-1,j}$, . . . , $X_{i,j-1}$, $X_{i,j}$, . . . by electrostatic attraction.

In the inside of the second supporting beam 22, a second detector wiring 52 configured to connect the thermoelectric conversion portion 41 with corresponding one of horizontal address lines $W_{i-1}$, $W_i$, $W_{+1}$, . . . , and an auxiliary control electrode wiring 53 configured to connect the control electrode 38 with corresponding one of control electrode wirings $C_{i-1}$, $C_i$, $C_{i+1}$, . . . are embedded.

By disposing the control electrode 38 in the area of the detector portions $X_{i-1,j-1}$, $X_{i-1,j}$, . . . , $X_{i,j-1}$, $X_{i,j}$, . . . , because an effective occupying area for each of the electrode portions including the control electrode 38 and the contactors $M_{i,j-1}$, $M_{i,j}$, $M_{i,j+1}$, . . . facing to the control electrode 38, serving as a mechanical switch, increases, the switching operation for the heat dissipation can be achieved at lower voltages.

As shown in FIG. 24, the contactor $M_{i,j}$ of the second embodiment does not have the lower contactor sheath film 11 and the upper contactor sheath film 12 encapsulating the contactor $M_{i,j}$, which were shown in FIGS. 3A and 3B. However, on the control electrode 38, a cap insulator film 13 is stacked so as to protect against short-circuit failure when the contactor $M_{i,j}$ mechanically contacts the surface of control electrode 38. The cap insulator film 13 may be a silicon oxide film or silicon nitride film having a thickness of approximately 0.03 µm to 0.15 µm. The resistor $r_{bi,j}$ shown in FIG. 4 corresponds to the electrical resistances of the cap insulator film 13 when the contactor $M_{i,j}$ is in contact with the control electrode 37.

Other structures and materials are similar to the structure and materials already explained in the infrared image sensor according to the first embodiment, and overlapped or redundant description may be omitted in the second embodiment.

3. Third Embodiment

Figure 25:
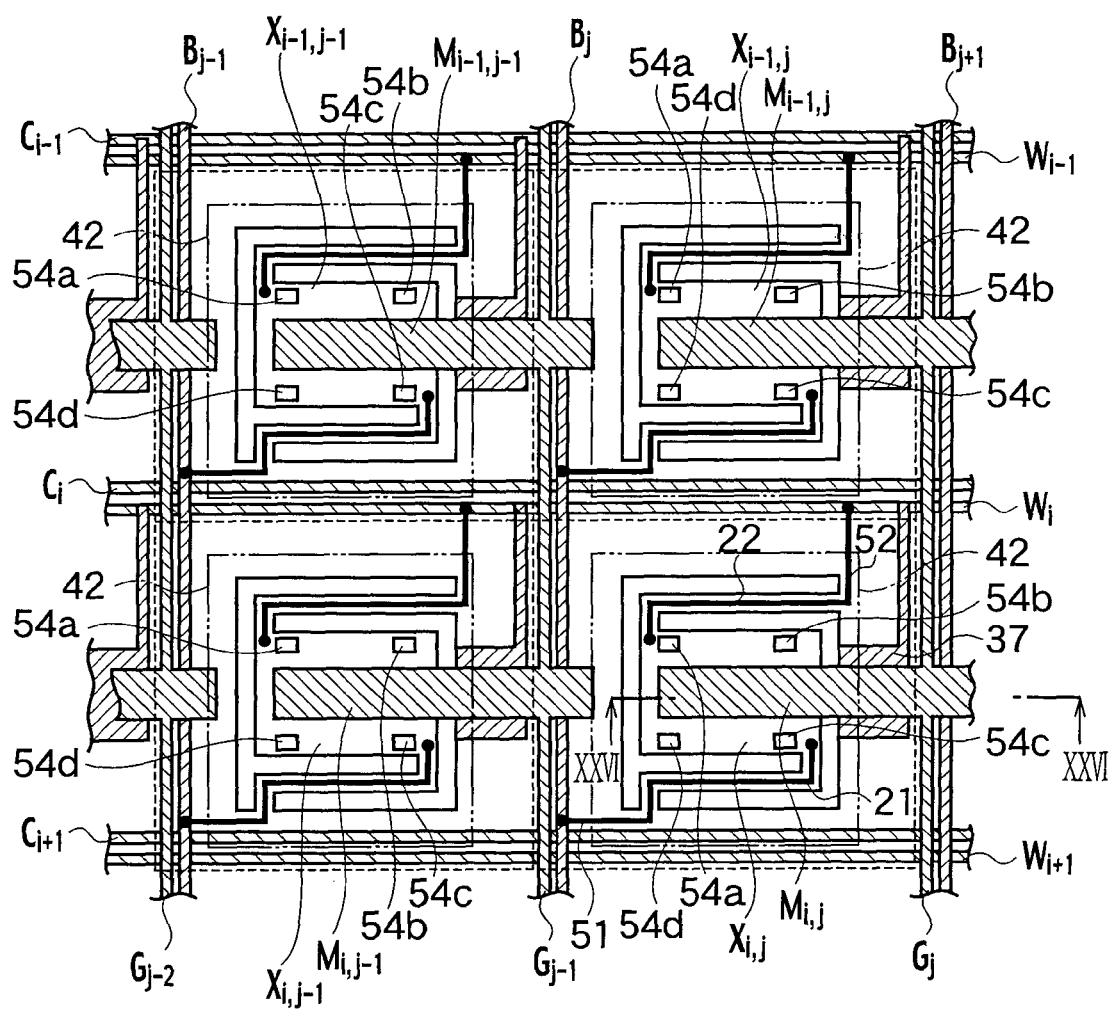
FIG. 25 is a plan view showing a part of the arrangement of pixels of an infrared image sensor according to a third embodiment of the present invention, the part of the arrangement corresponds to a 2×2 arrangement.

As shown in FIG. 25, a planar configuration of an infrared image sensor according to the third embodiment of the present invention, similar to the infrared image sensor according to the first embodiment, represents a plurality of control electrodes 37 being disposed on the top surface of the silicon substrate 31 surrounding a plurality of detector portions $X_{i-1,j-1}$, $X_{i-1,j}$, . . . , $X_{i,j-1}$, $X_{i,j}$, . . . That is to say, a plurality of mechanical switches of the infrared image sensor according to the third embodiment embrace respectively contactors $M_{i-1,j-1}$, $M_{i-1,j}$ . . . , $M_{i,j-1}$, $M_{i,j}$, . . . , delineated in the cantilever configuration being connected electrically to corresponding contactor wirings $G_{j-2}$, $G_{j-1}$, $G_j$, . . . disposed on the top surface of the base body (31, 32), each of the contactors $M_{i-1,j-1}$, $M_{i-1,j}$ . . . , $M_{i,j-1}$, $M_{i,j}$, . . . has a pillar fixed to the base body (31, 32) and a free edge extending from the pillar's side on the detector portions $X_{i-1,j-1}$, $X_{i-1,j}$, . . . , $X_{i,j-1}$, $X_{i,j}$, . . . ; and the control electrodes 37 being connected electrically with the control electrode wirings $C_{i-1}$, $C_i$, $C_{i+1}$, . . . disposed at the top surface of the base body (31, 32), each of the control electrodes 37 is disposed between the pillar and the free edge on the top surface of the base body (31, 32).

Figure 26:
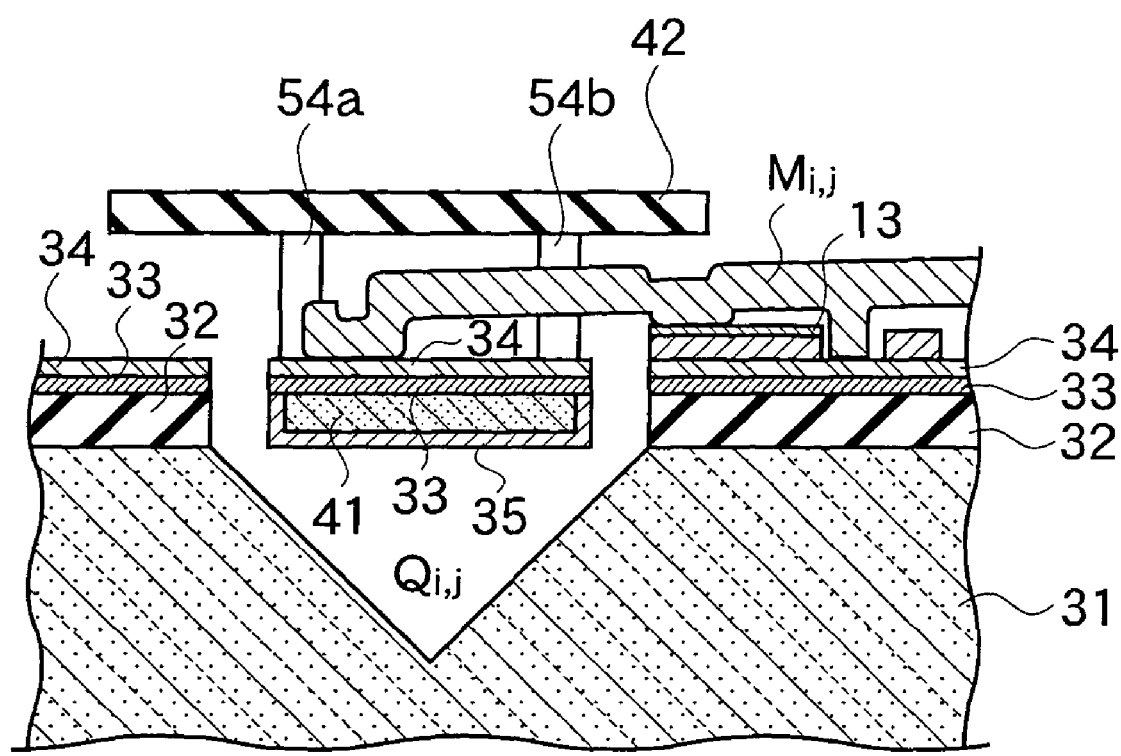
FIG. 26 is a cross-sectional view taken on line XXVI—XXVI in FIG. 25.

However, as is apparent from the cross-sectional structure shown in FIG. 26, taken along line xxVI—xxVI in FIG. 25, the detector portions $X_{i-1,j-1}$, $X_{i-1,j}$, . . . , $X_{i,j-1}$, $X_{i,j}$, . . . encompass infrared absorption layers 42 disposed on the contactors $M_{i-1,j-1}$, $M_{i-1,j}$ . . . , $M_{i,j-1}$, $M_{i,j}$, . . . for absorbing infrared-rays; thermoelectric conversion portions 41 configured to convert the heat generated in the infrared absorption layers 42 to an electrical signal, the thermoelectric conversion portions 41 are disposed beneath the contactors $M_{i-1,j-1}$, $M_{i-1,j}$ . . . , $M_{i,j-1}$, $M_{i,j}$, . . . ; and four supporting members 54a, 54b, 54c, 54d thermally connecting each of the infrared absorption layer 42 to corresponding thermoelectric conversion portion 41. The four supporting members 54a, 54b, 54c, 54d are configured to mechanically support one of the infrared absorption layers 42 to the corresponding thermoelectric conversion portion 41. That is to say, the infrared absorption layer 42 of each pixel manifests an umbrella configuration being supported by four supporting members 54a, 54b, 54c, 54d. But, in FIG. 26, two of supporting members 54a, 54b among four supporting members 54a, 54b, 54c, 54d are shown, and the illustration of other supporting members 54c, 54d lying deep in the cross section (or the top surface of paper) is omitted. Tuning back to FIG. 25, each of the infrared absorption layers 42 is represented by a two-dot chained line so that the configuration of the four supporting members 54a, 54b, 54c, 54d connected under the infrared absorption layer 42 can be shown clearly.

The infrared absorption layer 42 is connected through four supporting members (electrically conductive supporting members) 54a, 54b, 54c, 54d, each having high thermal conductivity to the thermoelectric conversion portion 41. In the infrared image sensor according to the third embodiment, the composite film made of the silicon oxide film 33 and the silicon nitride film 34 disposed on the thermoelectric conversion portion 41, merely serves as an inter-layer insulation film. As apparent from FIG. 26, the contactor $M_{i,j}$ of the cantilever configuration is disposed between the infrared absorption layer 42 and the thermoelectric conversion portion 41.

In the first and second embodiments, because the metallic contactors $M_{i-1,j-1}$, $M_{i-1,j}$ . . . , $M_{i,j-1}$, $M_{i,j}$, . . . are disposed on the infrared absorption layer 42, the irradiated infrared radiation is reflected back by the contactors $M_{i-1,j-1}$, $M_{i-1,j}$ . . . , $M_{i,j-1}$, $M_{i,j}$, . . . and the infrared absorption efficiency has decreases. In the configuration of the third embodiment shown in FIG. 25 and FIG. 26, because the respective infrared absorption layers 42 are located above the contactors $M_{i-1,j-1}$, $M_{i-1,j}$ . . . , $M_{i,j-1}$, $M_{i,j}$, . . . , each of the infrared absorption layers 42 can absorb all of the irradiated infrared radiation. Therefore, the infrared absorption efficiency of the infrared image sensor according to the third embodiment is extremely high. In addition, as shown by the two-dot chained line in FIG. 25, the configuration in which the contour of the infrared absorption layer 42 projects outwardly from the area just above the silicon substrate 31 facilitates a wide area in a plan view. Therefore, the Window portion rate for absorbing the infrared ray in each pixel of the infrared image sensor according to the third embodiment is efficiently increased from the rate achieved by the configuration of the first and the second embodiments. In FIG. 25, if the occupying area of the infrared absorption layer 42 is so increased such that the adjacent two contours defined by the two-dots-chained line contact each other, the dead space for the sensing of the infrared-rays can be reduced.

Other structures and materials are similar to the structure and materials already explained in the infrared image sensor according to the first and second embodiment, and overlapped or redundant description may be omitted in the third embodiment.

4. Fourth Embodiment

In the infrared image sensor according to the second embodiment shown in FIG. 23 and FIG. 24, the control electrode 38 was disposed in the detector portions $X_{i-1,j-1}$, $X_{i-1,j}$, ..., $X_{i,j-1}$, $X_{i,j}$, ... so that the effective area of the electrode portion of the control electrode 38 and the corresponding contactors $M_{i-1,j-1}$, $M_{i-1,j}$ ..., $M_{i,j-1}$, $M_{i,j}$, ... facing the control electrode 38, serving as the mechanical switch, could be increased, thereby achieving the electric switching operation for the heat dissipation at lower voltages. However, as clear in FIG. 23, the shadow area for the control electrode 38 decreases the Window portion rate of the infrared absorption for each pixel.

Figure 27:
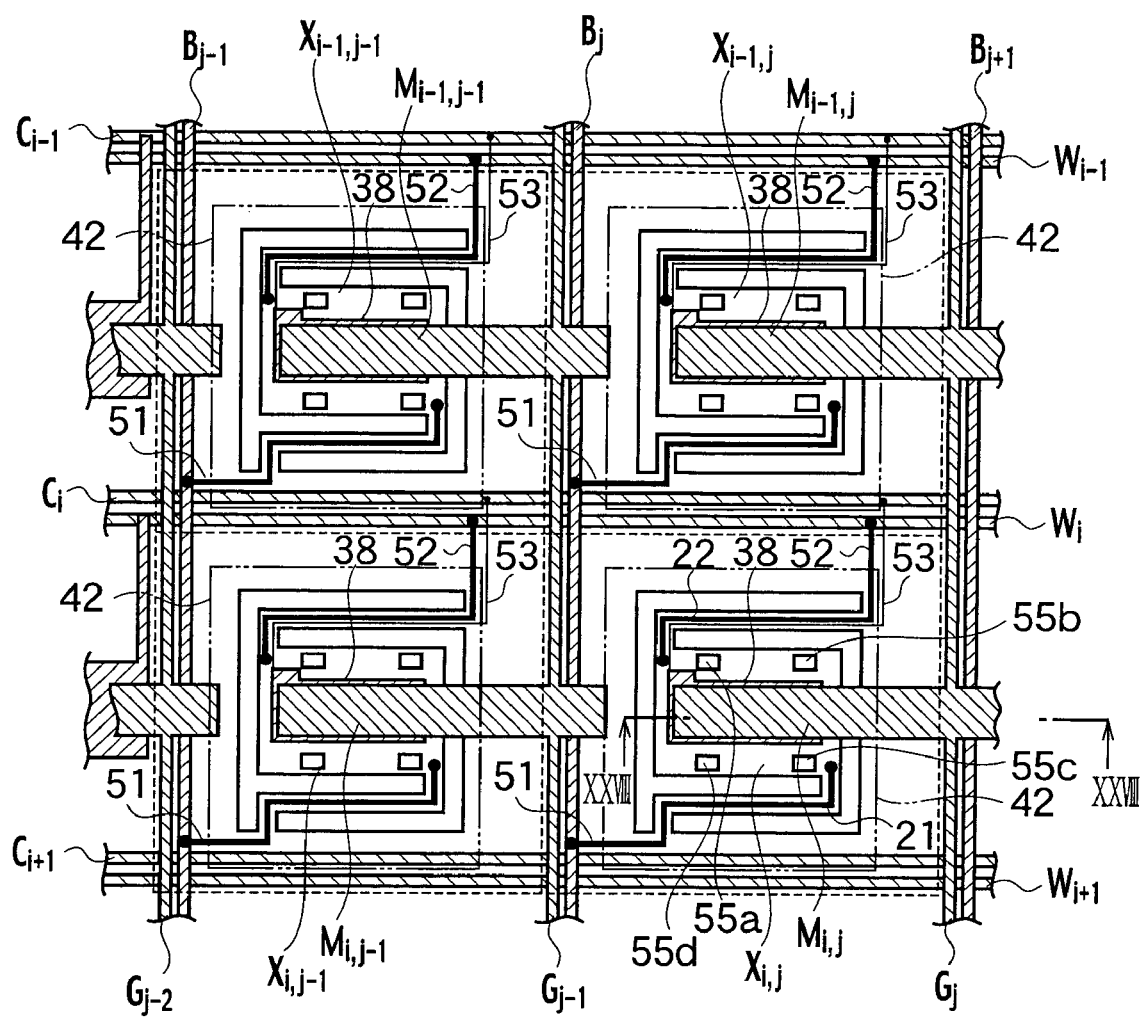
FIG. 27 is a plan view showing a part of the arrangement of pixels of an infrared image sensor according to a fourth embodiment of the present invention, the part of the arrangement corresponds to a 2×2 arrangement.
Figure 28:
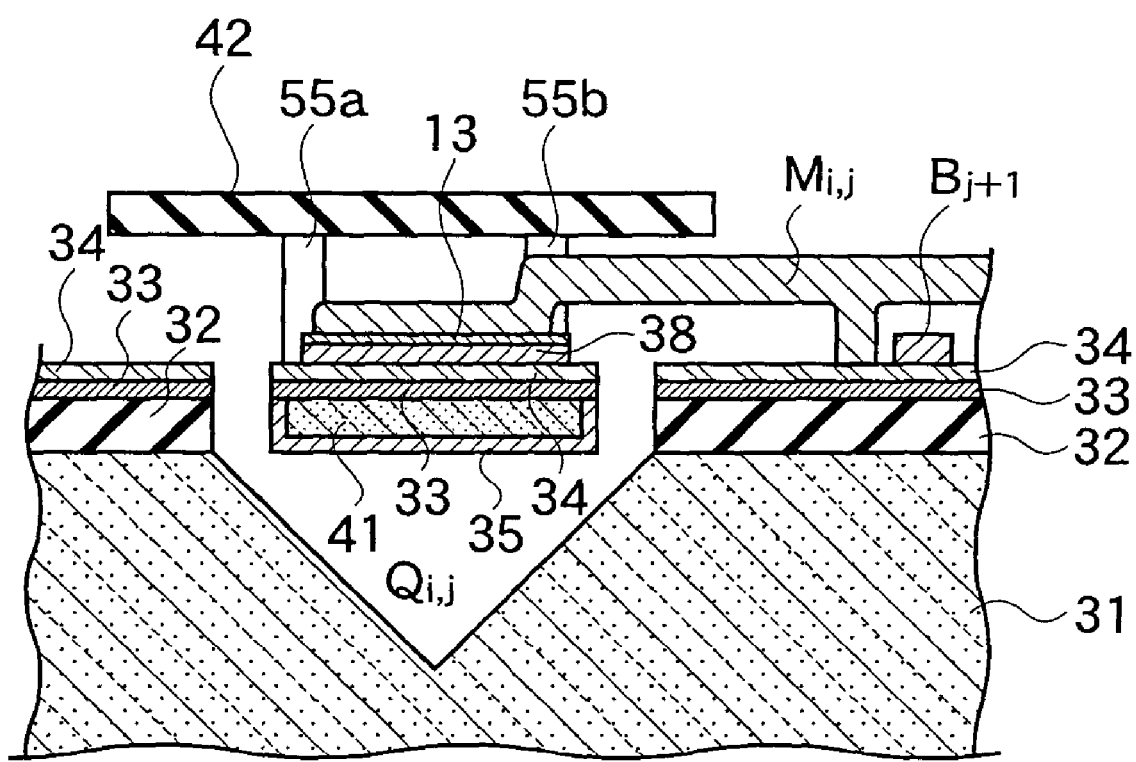
FIG. 28 is a cross-sectional view taken on line XXVIII—XXVIII in FIG. 27.

In an infrared image sensor according to a fourth embodiment of the present invention shown in FIGS. 27 and 28, similar to the infrared image sensor according to the second embodiment, the control electrode 38 is disposed in the area of the detector portions $X_{i-1,j-1}$, $X_{i-1,j}$, ..., $X_{i,j-1}$, $X_{i,j}$, .... However, the infrared absorption layer 42 of each pixel has the umbrella configuration supported by four supporting members 54a, 54b, 54c, 54d, the same as in the third embodiment. In FIG. 28, two of supporting member 53a and 53b are shown among four supporting members 54a, 54b, 54c, 54d, and illustration of the supporting members 54c, 54d disposed on this side of the cross-section (the top surface of paper) is omitted. The area shown by the two-dot chained line in FIG. 27 corresponds to the infrared absorption layer 42.

As explained in the third embodiment, the infrared absorption layer 42 is connected through the four supporting members 54a, 54b, 54c, 54d made of high thermal conductivity (the electrically conductive) material to the thermoelectric conversion portion 41. And the contactor $M_{i,j}$ of the cantilever configuration is disposed between the infrared absorption layer 42 and the thermoelectric conversion portion 41 as shown in FIG. 28. In other words, all of the irradiated infrared radiation can be absorbed by the infrared absorption layer 42, because the infrared absorption layer 42 is located above the contactor $M_{i,j}$. Because of this configuration, the infrared image sensor according to the fourth embodiment achieves technical advantages such that the infrared absorption rate is high and that the electric switching operation for heat dissipation is possible at low voltage.

Other structures and materials are similar to the structure and materials already explained in the infrared image sensor according to the first to third embodiments, and overlapped or redundant description may be omitted in the fourth embodiment.

5. Fifth Embodiment

Figure 31:
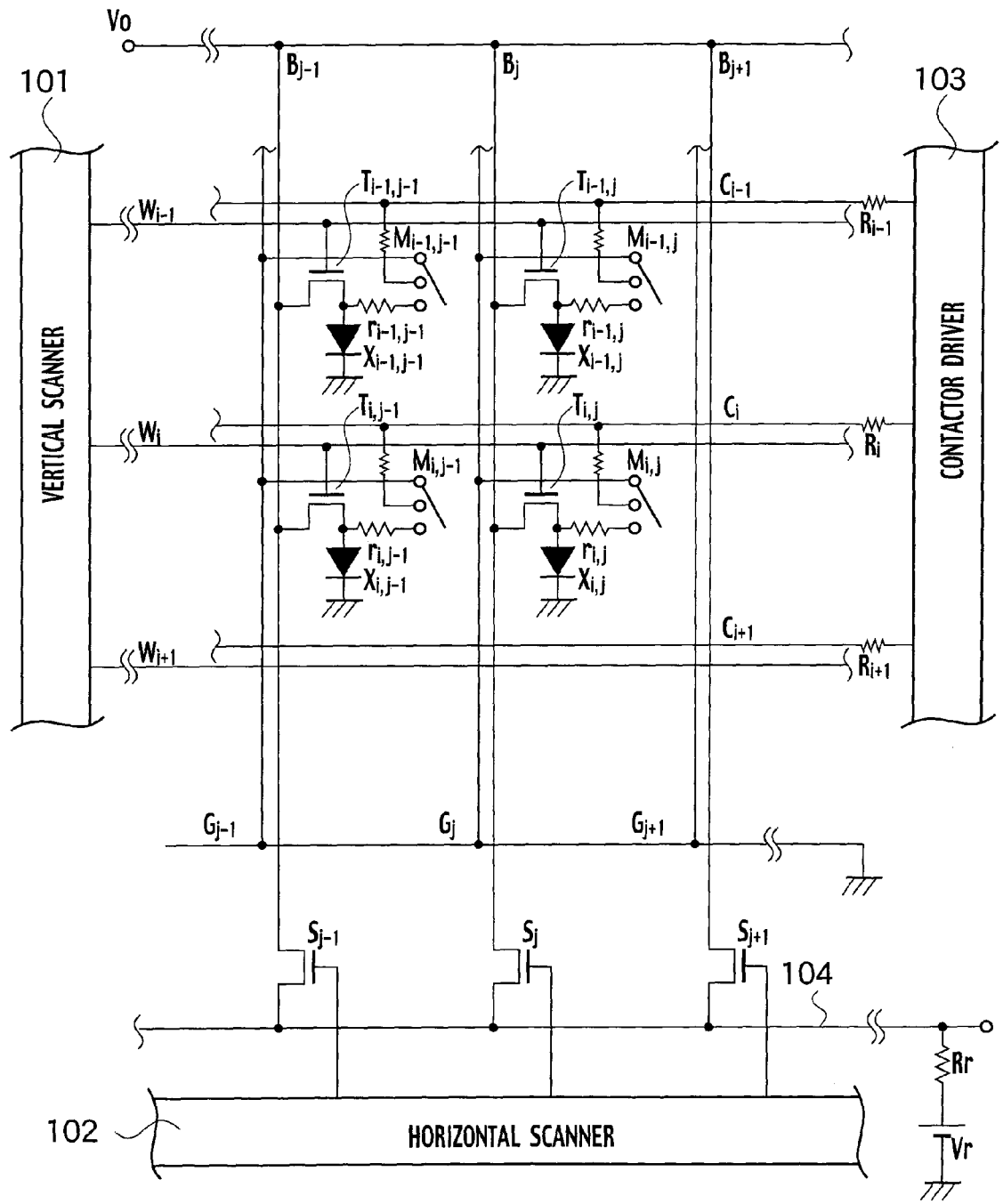
FIG. 31 is a simplified equivalent circuit including peripheral circuitry of the infrared image sensor according to the fifth embodiment of the present invention.

An infrared image sensor according to the fifth embodiment of the present invention encompasses a matrix embracing a plurality of vertical signal lines $B_{j-1}$, $B_j$, $B_{j+1}$, ... and a plurality of horizontal address lines $W_{i-1}$, Wi, $W_{i+1}$, ... intersecting perpendicularly to the vertical signal lines $B_{j-1}$, Bj, $B_{j+1}$, ... and detector portions $X_{i-1,j-1}$, $X_{i-1,j}$, ..., $X_{i,j-1}$, $X_{i,j}$, ... implementing respective pixels, which are disposed at the cross points of the matrix so as to establish a two dimensional configuration as shown in FIG. 29. The detector portions $X_{i-1,j-1}$, $X_{i-1,j}$ ..., $X_{i,j-1}$, $X_{i,j}$, ... of each pixel are connected respectively to corresponding vertical switching transistors $T_{i-1,j-1}$, $T_{i-1,j}$ ..., $T_{i,j-1}$, $T_{i,j}$, ... shown in FIG. 31, through corresponding second detector wirings 52 respectively. That is to say, one of the electrodes of the detector portions $X_{i-1,j-1}$, $X_{i-1,j}$ ..., $X_{i,j-1}$, $X_{i,j}$, ... of each pixel is connected to drain electrode of corresponding vertical switching transistors $T_{i-1,j-1}$, $T_{i-1,j}$ ..., $T_{i,j-1}$, $T_{i,j}$, ... respectively. For example, as shown in FIG. 31, supposing that each of the detector portions $X_{i-1,j-1}$, $X_{i-1,j}$ ..., $X_{i,j-1}$, $X_{i,j}$, ..., of the respective pixels is implemented by a p-n junction diode, one of electrodes of the p-n junction diodes (anode electrode) is connected to the drain electrode of corresponding vertical switching transistors $T_{i-1,j-1}$, $T_{i-1,j}$ ..., $T_{i,j-1}$, $T_{i,j}$, ... through the second detector wiring 52, respectively. The other electrode of the corresponding detector portions $X_{i-1,j-1}$, $X_{i-1,j}$, ..., $X_{i,j-1}$, $X_{i,j}$, ... of each pixel is connected to common potential (for example, ground potential). Each of the gate electrodes of the vertical switching transistors $T_{i-1,j-1}$, $T_{i-1,j}$ ..., $T_{i,j-1}$, $T_{i,j}$, ... is connected to the corresponding horizontal address line $W_{i-1}$, $W_i$, $W_{i+1}$, ... in each row. Each of the source electrodes of the vertical switching transistors $T_{i-1,j-1}$, $T_{i-1,j}$ ..., $T_{i,j-1}$, $T_{i,j}$, ... is connected to the vertical signal lines $B_{j-1}$, $B_j$, $B_{j+1}$, ... in each column. Furthermore, in parallel with the vertical signal lines $B_{j-1}$, $B_j$, $B_{j+1}$, ... a plurality of contactor wirings $G_{j-2}$, $G_{j-1}$, Gj, ... extend straightforwardly. In addition, in parallel with horizontal address lines $W_{i-1}$, Wi, $W_{i+1}$, ... a plurality of control electrode wirings $C_{i-1}$, $C_i$, $C_{i+1}$, ... extend straightforwardly. As shown in FIG. 31, the controlling electrode wirings $C_{i-1}$, $C_i$, $C_{i+1}$, ... are connected to a contactor driver 103 through protective resistors $R_{i-1}$, $R_i$, $R_{i+1}$, ... respectively, and the horizontal address lines $W_{i-1}$, $W_i$, $W_{i+1}$, ... are connected to a vertical scanner 101. The vertical signal lines $B_{j-1}$, $B_j$, $B_{j+1}$, ... are connected to the horizontal scanner 102 through the gates of horizontal select transistors $S_{j-1}$, $S_j$, $S_{j+1}$, ....

Figure 30A:
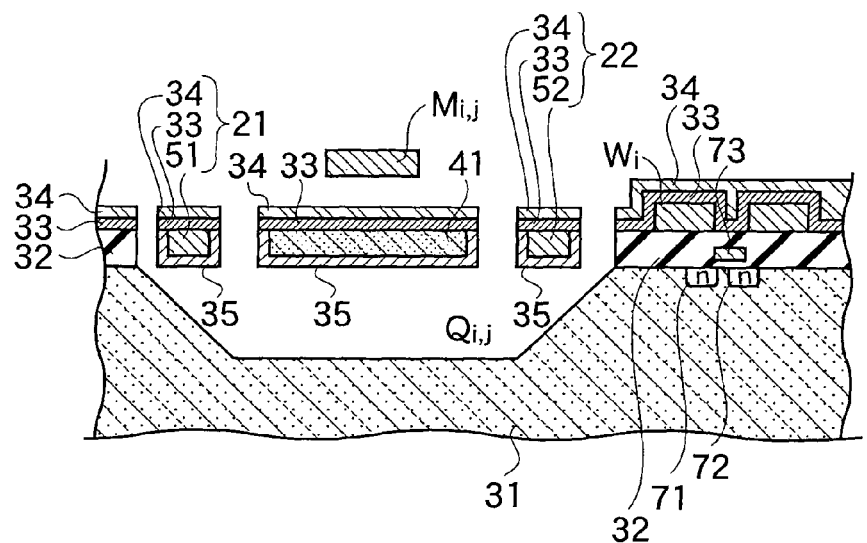
FIG. 30A is a cross-sectional view taken on line XXXA—XXXA in FIG. 29.
Figure 30B:
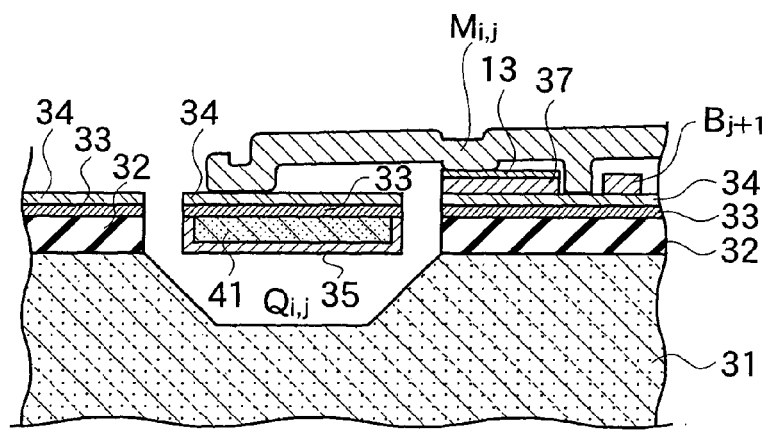
FIG. 30B is a cross-sectional view taken on line XXXB—XXXB in FIG. 29.

FIG. 30A is a cross-sectional view taken along line XXXA–XXXA in FIG. 29, and FIG. 30B is a cross-sectional view taken along line XXXB—XXXB in FIG. 29. The detector portion $X_{i,j}$ is suspended in an air-bridge configuration in the inside of the cavity $Q_{i,j}$. The air-bridge configuration facilitates the detector portion $X_{i,j}$ being thermally isolated from the silicon substrate 31. As shown in FIG. 29 and FIG. 30A, the detector portions $X_{i-1,j-1}$, $X_{i-1,j}$ ..., $X_{i,j-1}$, $X_{i,j}$, ... disposed in each pixel are supported to the silicon substrate 31 and the pad oxide film 32 disposed on the silicon substrate 31 in the air-bridge configuration through the first supporting beam 21 and the second supporting beam 22 having a large thermal resistance so as to achieve and to keep the quasi-thermal isolation state. Each of the cavity $Q_{i-1,j-1}$, $Q_{i-1,j}$ ..., $Q_{i,j-1}$, $Q_{i,j}$, ... is implemented by reverse pyramid geometry at the bottom surface of the concavity, which is established by removing a part of the silicon substrate 31 selectively as shown FIGS. 30A and 30B. The source region and the drain region of the respective vertical switching transistors $T_{i-1,j-1}$, $T_{i-1,j}$ ... $T_{i,j-1}$, $T_{i,j}$, ... are formed in the corresponding limited area defined on the top surface of the silicon substrate 31. The gate electrode of each of the vertical switching transistors $T_{i-1,j-1}$, $T_{i-1,j}$ ..., $T_{i,j-1}$, $T_{i,j}$, ... is buried in the pad oxide film 32 between the source region and the drain region. Each of the detector portions $X_{i-1,j-1}$, $X_{i-1,j}$ ..., $X_{i,j-1}$, $X_{i,j}$, ... shown in FIG. 29 encompasses, an infrared absorption layer 42 configured to absorb and convert the incident infrared ray into heat, and a thermoelectric conversion portion 41 configured to convert the temperature change due to the heat generated by the infrared absorption layer 42 to the electrical signal as shown respectively in FIGS. 30A and 30B. The thermoelectric conversion portion 41 is implemented by a p-n junction diode merged in the polysilicon layer. The p-n junction diode can be established by selective doping of impurity atoms in the polysilicon layer 41. A sheath layer 35 made of a silicon oxide film encapsulates the bottom and side surfaces of the polysilicon layer, respectively. Instead of the p-n junction diode, bolometer implemented by doped polysilicon, $VO_2$, Ti can be adopted. On the thermoelectric conversion portion 41, a silicon oxide film 33 serving as the inter-layer insulation film is disposed.

A silicon nitride film 34 is laminated on the silicon oxide film 33. The composite film made of the silicon oxide film 33 and the silicon nitride film 34 stacked on the silicon oxide film 33 implements the infrared absorption layer 42. The infrared absorption layer 42 is delineated in a geometry substantially the same as the thermoelectric conversion portion 41.

As shown in FIG. 29 and FIG. 30A, in the inside of the first supporting beam 21, a first detector wiring 51 configured to connect the thermoelectric conversion portion 41 to a common potential (grounding potential) is buried, and in the inside of the second supporting beam 22, a second detector wiring 52 configured to connect the thermoelectric conversion portion 41 to the drain electrode of one of the corresponding vertical switching transistors $T_{i-1,j-1}$, $T_{i-1,j}$ ..., $T_{i,j-1}$, $T_{i,j}$, ... is buried. The first detector wiring 51 and the second detector wiring 52 can be made of refractory metals such as W, Ti, Co, Mo, the silicide made of these refractory metals, or polycide using these silicide.

Furthermore, as shown in FIG. 29 and FIG. 30B, a control electrode 37 is disposed on each pixel. The control electrode 37 of each pixel is connected to the control electrode wirings $C_{i-1}$, $C_i$, $C_{i+1}$, ... respectively, through an auxiliary control electrode wiring 53, and voltage is applied via the control electrode wirings $C_{i-1}$, $C_i$, $C_{i+1}$, .... As shown in FIG. 30B, facing the control electrode 37 of each pixel, a contactor $M_{i,j}$ in a cantilever configuration is established, and the contactor $M_{i,j}$ is connected to the contactor wiring Gj. The contactor $M_{i,j}$ encompasses a pillar fixed to the layered structure made of pad oxide film 32, silicon oxide film 33, and silicon nitride film 34 stacked above the top surface of the silicon substrate 31 and a free edge extending from the pillar's side above the detector portion $X_{i,j}$. The control electrode 37 and the contactor $M_{i,j}$ implement a mechanical switch. Electrically conductive materials such as Al, Cu, Ti, Ti N, W, ... are suitable for the contactor $M_{i,j}$. Each of the protective resistors $R_{i-1}$, $R_i$, $R_{i+1}$, ... shown in FIG. 31 serves as a protective element for limiting the flow of the overcurrent, when short-circuit failure between the contactor $M_{i,j}$ and the control electrode 37 occurs.

FIG. 30 shows a selected state of the detector portion $X_{i,j}$ in which a row-select pulse $V_i$ is applied to the horizontal address line $W_i$. In the blanking state just before the row-select pulse $V_i$ is applied to the horizontal address line Wi, by applying control voltage $V_{Li}$ shown in FIG. 5 to the control electrode wiring $C_i$ the contactors $M_{i,j-1}$, $M_{i,j}$, ... in the cantilever configuration bends so that the free edge of the contactors $M_{i,j-1}$, $M_{i,j}$, ... and the detector portions $X_{i-1,j-1}$, $X_{i,j}$, ... are respectively turned into the contact states, and thereby heat accumulated in the detector portions $X_{i-1,j-1}$, $X_{i,j}$, ... are transported away by thermal conduction. When the free edge of the contactors $M_{i,j-1}$, $M_{i,j}$, ... and the detector portions $X_{i-1,j-1}$, $X_{i,j}$, ... are respectively turned into the contact states, the heat accumulated in the detector portions $X_{i-1,j-1}$, $X_{i,j}$, ... conduct to the silicon substrate 31 by thermal conduction through the respective free edges of the contactors $M_{i,j-1}$, $M_{i,j}$, ... instantly, and the temperature of the detector portions $X_{i-j-1}$, $X_{i,j}$, ... is clamped to an initial temperature before self-heating starts. In a selected state in which the contact state between the respective free edges of the contactors $M_{i,j-1}$, $M_{i,j}$, ... and the detector portions $X_{i-1,j-1}$, $X_{i,j}$, ... is released, when infrared radiation is irradiated respectively on the infrared absorption layers 42, the temperatures of the corresponding infrared absorption layers 42 rise in correspondence with the infrared-rays strength.

In the equivalent circuit shown in FIG. 31, the contactors $M_{i-1,j-1}$, $M_{i-1,j}$ ..., $M_{i,j-1}$, $M_{i,j}$, ... represent the mechanical switch. Each of the resistors $r_{i-1,j-1}$, $r_{i-1,j}$ ..., $r_{i,j-1}$, $r_{i,j}$, ... shown in FIG. 31 manifests the sum of the thermal resistance associated with the infrared absorption layer 42 shown in FIGS. 30A and 30B and the thermal contact resistance between the contactors $M_{i-1,j-1}$, $M_{i-1,j}$ ..., $M_{i,j-1}$, $M_{i,j}$, ... and the infrared absorption layer 42, when the contactors $M_{i-1,j-1}$, $M_{i-1,j}$ ..., $M_{i,j-1}$, $M_{i,j}$, ... and the infrared absorption layer 42, ... are turned into the contact state. When the contactors $M_{i-1,j-1}$, $M_{i-1,j}$ ..., $M_{i,j-1}$, $M_{i,j}$, ... are turned into the contact state with the infrared absorption layer 42, as shown in FIG. 30B, most of heat flows to the base body (31, 32) through the silicon nitride film 34 and the silicon oxide film 33, but illustration of the heat flow is omitted in the equivalent circuit shown in FIG. 31. In the equivalent circuit of FIG. 31, it is assumed that, the row-select pulse $V_i$ is applied to the horizontal address line $W_i$ for 20μ second, with an interval of 1/60 second, for example. Until 10μ second before the row-select pulses $V_1$, $V_2$, ..., $V_{i-1}$, $V_i$, $V_{i+1}$, ... are applied to the horizontal address lines $W_1$, $W_2$, ... $W_{i-1}$, $W_i$, $W_{i+1}$, ..., the control voltage $V_{L1}$ is applied to the control electrode wirings $C_1$, $C_2$, ..., $C_{i-1}$, $C_i$, $C_{i+1}$, ..., so that the contactors $M_{i-1,j-1}$, $M_{i-1,j}$ ..., $M_{i,j-1}$, $M_{i,j}$, ... and the detector portions $X_{i-1,j-1}$, $X_{i-1,j}$ ..., $X_{i,j-1}$, $X_{i,j}$, ..., ... are turned into the contact state so as to clamp the temperature of the detector portions $X_{i-1,j-1}$, $X_{i-1,j}$ ..., $X_{i,j-1}$, ... to an initial value before self-heating starts.

And, ahead of 10μ second before the row-select pulse for the I-th row is applied to the horizontal address line $W_i$, by applying 0V to the control electrode wiring $C_i$, being connected with the control electrode 37, the contact state between the contactors $M_{i,j-1}$, $M_{i,j}$, ... and the detector portions $X_{i,j-1}$, $X_{i-j}$, ... is released. A constant voltage of 0V is applied to the contactor wirings $G_{j-2}$, $G_{j-1}$, $G_j$, ... being connected to the contactors $M_{i,j-1}$, $M_{i,j}$, .... And, by irradiating infrared-rays to the detector portions $X_{i-1,j-1}$, $X_{i-1,j}$, ..., $X_{i,j-1}$, $X_{i,j}$, ..., the temperature of the detector portions $X_{i-1,j-1}$, $X_{i-1,j}$ ..., $X_{i,j-1}$, $X_{i,j}$, ... rises. In the released state, when the row-select pulse $V_j$ is applied to the horizontal address line $W_j$ so that the horizontal scanner 102, through the vertical signal lines $B_{j-1}$, $B_j$, $B_{j+1}$, ..., selects one of the corresponding horizontal select transistors $S_{j-1}$, $S_j$, $S_{j+1}$, ..., sequentially, signals of the detector portions $X_{i,j-1}$, $X_{i,j}$, ... are read sequentially by the horizontal signal line 104.

In this way, according to the infrared image sensor of the fifth embodiment, by using the mechanical switch, when pulse voltage is applied to the thermoelectric conversion portion 41, the temperature rise of the detector portions $X_{i-1,j-1}$, $X_{i-1,j}$ ..., $X_{i,j-1}$, $X_{i,j}$, ..., ascribable to the self-heating, can be reset to the initial value. Therefore, it is possible to increase the frame rate, and the infrared image sensor having high response speed can be provided with high sensitivity. In addition, even if the frame rate is raised, because the heat accumulated in the detector portions $X_{i-1,j-1}$, $X_{i-1,j}$, ..., $X_{i,j-1}$, $X_{i,j}$, ... generated by the self-heating phenomenon can be dissipated sufficiently in the blanking period, the thermal breakdown phenomenon can be suppressed, too.

6. Other Embodiments

Various modifications will become possible for those skilled in the art after receiving the teaching of the present disclosure without departing from the scope thereof. In description of the first to fifth embodiments already described, metallic materials were used for the contactors $M_{i-1,j-1}$, $M_{i-1,j}$ ..., $M_{i,j-1}$, $M_{i,j}$, .... However, any configuration of the contactors $M_{i-1,j-1}$, $M_{i-1,j}$ ..., $M_{i,j-1}$, $M_{i,j}$, ... can be employed, as long as at least a part of the contactors $M_{i-1,j-1}$, $M_{i-1,j}$ ..., $M_{i,j-1}$, $M_{i,j}$, ..., material can facilitate the establishment of the attractive force through the control electrode 37 or 38. In addition, a voltage of 0V was applied to contactors $M_{i-1,j-1}$, $M_{i-1,j}$ ..., $M_{i,j-1}$, $M_{i,j}$, ..., but the potential of the contactors $M_{i-1,j-1}$, $M_{i-1,j}$ ..., $M_{i,j-1}$, $M_{i,j}$, ... may be floating. If the mechanical switch can facilitate the same operation as the first to fifth embodiments, any combinations of voltages configured to apply the control electrode 37 or 38 and the contactors $M_{i-1,j-1}$, $M_{i-1,j}$ ..., $M_{i,j-1}$, $M_{i,j}$, ... can be allowed.

In description of the first to fifth embodiments already described, in the blanking state, the contactors $M_{i-1,j-1}$, $M_{i-1,j}$ ..., $M_{i,j-1}$, $M_{i,j}$, ... in the cantilever configuration are respectively bent so that the contactors $M_{i-1,j-1}$, $M_{i-1,j}$ ..., $M_{i,j-1}$, $M_{i,j}$, ... and the corresponding detector portions $X_{i-1,j-1}$, $X_{i-1,j}$ ..., $X_{i,j-1}$, $X_{i,j}$, ..., ... are turned into the contact state, and the heat accumulated in the detector portions $X_{i-1,j-1}$, $X_{i-1,j}$ ..., $X_{i,j-1}$, $X_{i,j}$, ... are transported away by thermal conduction. However, the contactors $M_{i-1,j-1}$, $M_{i-1,j}$ ..., $M_{i,j-1}$, $M_{i,j}$, ... and the detector portions $X_{i-1,j-1}$, $X_{i-1,j}$ ..., $X_{i,j-1}$, $X_{i,j}$, ..., ... are not always required to be turned into a complete contact state, but a mechanical switch facilitating a quasi-contact state in which the respective contactors $M_{i-1,j-1}$, $M_{i-1,j}$ ..., $M_{i,j-1}$, $M_{i,j}$, ... approach to the corresponding detector portions $X_{i-1,j-1}$, $X_{i-1,j}$ ..., $X_{i,j-1}$, $X_{i,j}$, ... with a minute gap of approximately 0.5–0.1 μm or less than this value, can be employed, because the heat flow can be implemented by radiations between contactors $M_{i-1,j-1}$, $M_{i-1,j}$ ..., $M_{i,j-1}$, $M_{i,j}$, ... and detector portions $X_{i-1,j-1}$, $X_{i-1,j}$ ..., $X_{i,j-1}$, $X_{i,j}$, .... Because the heat flow associated with radiation is small compared with that by thermal conduction, the values of thermal resistance shown in FIG. 4 and FIG. 31 becomes large. However, because physical fatigue due to the phenomena, in which the respective contactors $M_{i-1,j-1}$, $M_{i-1,j}$ ..., $M_{i,j-1}$, $M_{i,j}$, ... mechanically contact to the corresponding detector portions $X_{i-1,j-1}$, $X_{i-1,j}$ ..., $X_{i,j-1}$, $X_{i,j}$, ... is not generated, it is effective for long life operation of the infrared image sensor. In order to keep a micro-gap between the contactors $M_{i-1,j-1}$, $M_{i-1,j}$ ..., $M_{i,j-1}$, $M_{i,j}$, ... and the detector portions $X_{i-1,j-1}$, $X_{i-1,j}$ ..., $X_{i,j-1}$, $X_{i,j}$, ..., spacer having a predetermined height will be inserted between the contactors $M_{i-1,j-1}$, $M_{i-1,j}$ ..., $M_{i,j-1}$, $M_{i,j}$, ... and the top surface of the supporting substrate 1 (a single crystalline silicon).

In description of the first to fifth embodiments already described, two dimensional configurations of the infrared image sensors (the area-type infrared image sensor) were explained, which is implemented by vertical signal lines $B_{j-1}$, $B_j$, $B_{j+1}$, ... and horizontal address lines $W_{i-1}$, $W_i$, $W_{i+1}$, ..., ... so as to establish the X-Y matrix. However, employing a single horizontal address line $W_i$, a one dimensional infrared image sensor (a line-type infrared image sensor) can be implemented, of course. Thus, the present invention of course includes various embodiments and modifications and the like which are not detailed above. Therefore, the scope of the present invention will be defined in the following claims.

What is claimed is:

1. An infrared detector comprising:
    a base body having a cavity provided at a top surface thereof;
    a detector portion disposed above the base body, configured to detect infrared-ray;
    a supporting beam supporting the detector portion above the cavity; and
    a contactor configured to contact the detector portion with the base body thermally so as to transport thermal energy to be accumulated in the detector portion toward the base body, wherein the contactor comprises a cantilever including:
        a pillar being fixed to the base body, and
        a free edge extending from the pillar over the detector portion, the free edge configured to be contacted thermally with a top surface of the detector portion.

2. The infrared detector of claim 1, wherein at least a part of the contactor disposed between the pillar and the free edge is made of electrically conductive material.

3. The infrared detector of claim 2, further comprising a control electrode disposed on the base body so that the free edge of the contactor contacts thermally with the top surface of the detector portion by electrostatic attractive force between the part made of electrically conductive material and the control electrode.

4. The infrared detector of claim 2, further comprising a control electrode disposed on the detector portion so that the free edge of the contactor contacts thermally with the top surface of the detector portion by electrostatic attractive force between the part made of electrically conductive material and the control electrode.

5. An infrared detector comprising:
    a base body;
    a detector portion disposed above the base body, configured to detect infrared-ray, the detector portion comprising:
        an infrared absorption layer configured to absorb the infrared-ray to generate heat; and
        a thermoelectric conversion portion disposed under the infrared absorption layer, configured to convert the heat generated by the infrared absorption layer into an electrical signal; and
        a supporting member configured to support the infrared absorption layer above the thermoelectric conversion portion;
    a supporting beam supporting the detector portion above the base body; and
    a contactor configured to contact the detector portion with the base body thermally so as to transport thermal energy to be accumulated in the detector portion toward the base body, the contactor being interposed between the infrared absorption layer and the thermoelectric conversion portion.

6. The infrared detector of claim 5, wherein the infrared absorption layer is laminated on the thermoelectric conversion portion.

7. An infrared image sensor comprising:
    a base body;
    a plurality of signal lines disposed on the base body;
    a plurality address lines intersecting the signal lines;
    a plurality of detector portions provided in cross regions of the signal lines and the address lines, each of the detector portions being connected between the corresponding signal line and the address line, each of the detector portions configured to detect infrared-ray;

a plurality of supporting beams supporting each of the detector portions above the base body; and a plurality of contactors configured to contact each of the detector portions with the base body thermally so as to transport thermal energy to be accumulated in each of the detector portions toward the base body, wherein each of the contactors comprises a cantilever including:
 a pillar fixed to the base body, and
 a free edge extending from the pillar over the corresponding detector portion, the free edge configured to be contacted thermally with a top surface of the corresponding detector portion.

8. The infrared image sensor of claim 7, wherein a plurality of cavities are arranged at a top surface of the base body, and each of the detector portions is supported by the supporting beam above the cavities respectively.

9. The infrared image sensor of claim 7, wherein at least a part of the contactor disposed between the pillar and the free edge is made of electrically conductive material.

10. The infrared image sensor of claim 9, further comprising a plurality of control electrodes disposed on the base body so that the free edge of each of the contactors contacts thermally with the top surface of the corresponding detector portion by electrostatic attractive force between the part made of electrically conductive material and the corresponding control electrode.

11. The infrared image sensor of claim 9, further comprising a plurality of control electrodes disposed respectively on the corresponding detector portion so that the free edge of each of the contactors contacts thermally with the top surface of the corresponding detector portion by electrostatic attractive force between the part made of electrically conductive material and the corresponding control electrode.

12. An infrared image sensor comprising:
 a base body;
 a plurality of signal lines disposed on the base body;
 a plurality address lines intersecting the signal lines;
 a plurality of detector portions provided in cross regions of the signal lines and the address lines, each of the detector portions being connected between the corresponding signal line and the address line, each of the detector portions configured to detect infrared-ray, and wherein each of the detector portions comprises:
  an infrared absorption layer configured to absorb the infrared-ray to generate heat;
  a thermoelectric conversion portion disposed under the infrared absorption layer, configured to convert the heat generated by the infrared absorption layer into an electrical signal; and
  a supporting member configured to support the infrared absorption layer above the thermoelectric conversion portion;
 a plurality of supporting beams supporting each of the detector portions above the base body; and
 a plurality of contactors configured to contact each of the detector portions with the base body thermally so as to transport thermal energy to be accumulated in each of the detector portions toward the base body, the contractor being interposed between the infrared absorption layer and the thermoelectric conversion portion.

13. The infrared image sensor of claim 12, wherein the infrared absorption layer is laminated on the thermoelectric conversion portion.

14. The infrared image sensor of claim 12, wherein each of the contactors contacts thermally with a top surface of the corresponding detector portion in a blanking period for resetting temperature of the corresponding detector portion at an initial value, and leaves from the top surface of the corresponding detector portion in a selecting period for detecting the infrared-ray by the corresponding detector portion.

15. The infrared image sensor of claim 12, wherein the contour of the infrared absorption layer covers a larger area than an area occupied by the thermoelectric conversion portion.

\* \* \* \* \*